(12) United States Patent
Deckman et al.

(10) Patent No.: US 9,034,079 B2
(45) Date of Patent: May 19, 2015

(54) METHODS OF REMOVING CONTAMINANTS FROM HYDROCARBON STREAM BY SWING ADSORPTION AND RELATED APPARATUS AND SYSTEMS

(75) Inventors: Harry W. Deckman, Clinton, NJ (US); Robert A. Johnson, Yardley, PA (US); Bruce T. Kelley, Porter, TX (US); Peter I. Ravikovitch, Princeton, NJ (US); Thomas N. Anderson, Mobile, AL (US)

(73) Assignee: ExxonMobil Upstream Research Company, Houston, TX (US)

( * ) Notice: Subject to any disclaimer, the term of this patent is extended or adjusted under 35 U.S.C. 154(b) by 144 days.

(21) Appl. No.: 13/984,911

(22) PCT Filed: Feb. 27, 2012

(86) PCT No.: PCT/US2012/026801
§ 371 (c)(1),
(2), (4) Date: Aug. 12, 2013

(87) PCT Pub. No.: WO2012/118758
PCT Pub. Date: Sep. 7, 2012

(65) Prior Publication Data
US 2014/0033919 A1 Feb. 6, 2014

Related U.S. Application Data

(60) Provisional application No. 61/448,121, filed on Mar. 1, 2011.

(51) Int. Cl.
*B01D 53/047* (2006.01)
*C10L 3/10* (2006.01)
*B01D 53/02* (2006.01)

(52) U.S. Cl.
CPC .............. *B01D 53/047* (2013.01); *B01D 53/02* (2013.01); *B01D 53/0473* (2013.01);
(Continued)

(58) Field of Classification Search
CPC .. B01D 53/02; B01D 53/047; B01D 53/0473; B01D 2256/245; B01D 2257/304; B01D 2257/502; B01D 2259/40041; B01D 2259/40049; B01D 2259/4063; C10L 3/104; Y02C 10/08
USPC ........................ 95/96, 98, 100, 103, 136, 139
See application file for complete search history.

(56) References Cited

U.S. PATENT DOCUMENTS 1,868,138 A 7/1932 Fisk
3,124,152 A 3/1964 Payne
(Continued)

FOREIGN PATENT DOCUMENTS

CA 2 234 924 4/1998
CA 2 224 471 6/1998
(Continued)

OTHER PUBLICATIONS (2008), "Rapid Cycle Pressure Swing Adsorption (RCPSA)," QuestAir, 4 pgs.
(Continued)

*Primary Examiner* — Frank Lawrence
(74) *Attorney, Agent, or Firm* — ExxonMobil Upstream Research Company Law Department

(57) ABSTRACT

A pressure swing adsorption process for removal of CO2 from natural gas streams through a combination of a selective adsorbent material containing an effective amount of a non-adsorbent filler, adsorbent contactor design, and adsorption cycle design. The removal of contaminants from gas streams, preferably natural gas streams, using rapid-cycle swing adsorption processes, such as rapid-cycle pressure swing adsorption (RC-PSA). Separations at high pressure with high product recovery and/or high product purity are provided through a combination of judicious choices of adsorbent material, gas-solid contactor, system configuration, and cycle designs. For example, cycle designs that include steps of purge and staged blow-down as well as the inclusion of a mesopore filler in the adsorbent material significantly improves product (e.g., methane) recovery. An RC-PSA product with less than 10 ppm H2S can be produced from a natural gas feed stream that contains less than 1 mole percent H2S.

54 Claims, 22 Drawing Sheets

(52) U.S. Cl.
CPC .... *B01D 2256/245* (2013.01); *B01D 2257/304* (2013.01); *B01D 2257/502* (2013.01); *B01D 2259/40041* (2013.01); *B01D 2259/40049* (2013.01); *B01D 2259/4063* (2013.01); *C10L 3/104* (2013.01); *Y02C 10/08* (2013.01)

(56) References Cited

U.S. PATENT DOCUMENTS

| | | | |
|---|---|---|---|
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,689,062 A * | 8/1987 | MacLean et al. | 62/624 |
| 4,711,968 A | 12/1987 | Oswald et al. | |
| 4,784,672 A | 11/1988 | Sircar | |
| 4,790,272 A | 12/1988 | Woolenweber | |
| 4,816,039 A | 3/1989 | Krishnamurthy et al. | |
| 4,877,429 A | 10/1989 | Hunter | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,354,346 A | 10/1994 | Kumar | 95/101 |
| 5,370,728 A | 12/1994 | LaSala et al. | |
| 5,565,018 A | 10/1996 | Baksh et al. | |
| 5,700,310 A | 12/1997 | Bowman et al. | |
| 5,735,938 A * | 4/1998 | Baksh et al. | 95/101 |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,906,673 A | 5/1999 | Reinhold, III et al. | |
| 5,924,307 A | 7/1999 | Nenov | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,053,966 A | 4/2000 | Moreau et al. | |
| 6,063,161 A | 5/2000 | Keefer et al. | |
| 6,099,621 A | 8/2000 | Ho | |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,660,065 B2 | 12/2003 | Byrd et al. | |
| 6,712,087 B2 | 3/2004 | Hill et al. | |
| 6,746,515 B2 | 6/2004 | Wegeng et al. | |
| 6,752,852 B1 | 6/2004 | Jacksier et al. | |
| 6,802,889 B2 | 10/2004 | Graham et al. | |
| 6,835,354 B2 | 12/2004 | Woods et al. | |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 7,025,801 B2 | 4/2006 | Monereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,311,763 B2 | 12/2007 | Neary | |
| RE40,006 E | 1/2008 | Keefer et al. | |
| 7,314,503 B2 | 1/2008 | Landrum et al. | |
| 7,390,350 B2 | 6/2008 | Weist, Jr. et al. | |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |
| 7,819,948 B2 | 10/2010 | Wagner | |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,034,164 B2 | 10/2011 | Lomax, Jr. et al. | |
| 8,071,063 B2 | 12/2011 | Reyes et al. | |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,262,783 B2 | 9/2012 | Stoner et al. | |
| 8,268,043 B2 | 9/2012 | Celik et al. | |
| 8,272,401 B2 | 9/2012 | McLean | |
| 8,361,200 B2 | 1/2013 | Sayari et al. | |
| 8,444,750 B2 | 5/2013 | Deckman et al. | |
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,529,665 B2 | 9/2013 | Manning et al. | |
| 8,545,602 B2 | 10/2013 | Chance et al. | |
| 8,591,627 B2 | 11/2013 | Jain | |
| 2001/0047824 A1 | 12/2001 | Hill et al. | |

(56) References Cited

U.S. PATENT DOCUMENTS

| | | |
|---|---|---|
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0170527 A1 | 9/2003 | Finn et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0289497 A1 | 11/2008 | Barclay et al. |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0211441 A1 | 8/2009 | Reyes et al. |
| 2009/0241771 A1 | 10/2009 | Manning et al. |
| 2009/0308248 A1 | 12/2009 | Siskin et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0332442 A1 | 12/2010 | Goel et al. |
| 2011/0031103 A1 | 2/2011 | Deckman et al. |
| 2011/0146494 A1 | 6/2011 | Desai et al. |
| 2011/0217218 A1 | 9/2011 | Gupta et al. |
| 2011/0277629 A1 | 11/2011 | Manning et al. |
| 2011/0315009 A1* | 12/2011 | Ambriano et al. ............ 95/26 |
| 2012/0024152 A1 | 2/2012 | Yamawaki et al. |
| 2012/0031144 A1 | 2/2012 | Northrop et al. |
| 2012/0067216 A1 | 3/2012 | Corma Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |

FOREIGN PATENT DOCUMENTS

| | | |
|---|---|---|
| CA | 2 228 206 | 7/1998 |
| CA | 2 297 590 | 8/2000 |
| CA | 2 297 591 | 8/2000 |
| CA | 2 237 103 | 12/2001 |
| CA | 2 357 356 | 3/2002 |
| EP | 0257493 | 2/1988 |
| EP | 0426937 | 5/1991 |
| EP | 1 004 341 | 5/2000 |
| EP | 1004341 | 5/2000 |
| EP | 1 018 359 | 7/2000 |
| EP | 1413348 | 8/2002 |
| EP | 1577561 | 9/2005 |
| EP | 1 203 610 | 12/2005 |
| EP | 1798197 | 6/2007 |
| EP | 1045728 | 11/2009 |
| JP | 59-232174 | 12/1984 |
| JP | 2000024445 | 8/2001 |
| JP | 2002348651 | 12/2002 |
| JP | 2006016470 | 1/2006 |
| JP | 2006036849 | 2/2006 |
| WO | WO 99/43418 | 9/1999 |
| WO | WO00/35560 | 6/2000 |
| WO | WO2012/118755 | 9/2002 |
| WO | WO2005/032694 | 4/2005 |
| WO | WO2005/070518 | 8/2005 |
| WO | WO2006/017940 | 2/2006 |
| WO | WO2006/074343 | 7/2006 |
| WO | WO 2007/111738 | 10/2007 |
| WO | WO 2010/123598 | 10/2010 |
| WO | WO 2010/130787 | 11/2010 |
| WO | WO 2011/139894 | 11/2011 |
| WO | WO2012/118757 | 9/2012 |
| WO | WO2012/118758 | 9/2012 |
| WO | WO2012/118759 | 9/2012 |
| WO | WO2012/118760 | 9/2012 |
| WO | WO2012/161826 | 11/2012 |
| WO | WO2012/161828 | 11/2012 |
| WO | WO2013/022529 | 2/2013 |

OTHER PUBLICATIONS (2008), "Rapid Cycle Pressure Swing Adsorption," ExxonMobil Research and Engineering, 2 pgs.

U.S. Appl. No. 13/602,750, filed Sep. 4, 2012, Sundaram, N. et al.

Conviser, (1964) "Removal of CO2 from Natural Gas With Molecular Sieves," *Publication*, pp. 1F-12F.

GE Oil & Gas (2007) "Dry Gas Seal Retrofit," Florene, Italy, www.ge,com/oilandgas.

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1.

Herrmann, et al. (2008) "Curvelet-Based Seismic Data Processing: A Multiscale and Nonlinear Approach," *Geophysics*, v73.1, pp. A1-A5.

Hopper, et al. (2008) "World's First 10,000 psi Sour Gas Injection Compressor," *Proceedings of the 37th Turbomachinery Symosium*, pp. 73-95.

Kikkinides, et al., "*Natural Gas Desulfurization by Adsorption: Feasibility and Multiplicty of Cyclic Steady States*", Ind. Eng. Chem. Res. 1995, 34(1), pp. 255-262.

Reyes, et al. (1997) "Frequency Modulation Methods for Diffusion and Adsorption Measurements in Porous Solids," *J. Phys. Chem. B*. v101, pp. 614-622.

Sahni, et al. (2005) "Multiresolution Wavelet Analysis for Improved Reservoir Description," SPE-87820, *Soc. of Petroleum Eng.-Reservoir Evaluation & Engineering*, pp. 53-69 (XP-002550569).

Stahley, (2003) "Design, Operation, and Maintenance Considerations for Improved Dry Gas Seal Reliability in Centrifugal Compressors," pp. 1-15.

Suzuki, (1985) "Continuous-Countercurrent-Flow Approximation for Dynamic Steady State Profile of Pressure Swing Adsorption" *AIChE Sym. Ser*. v81 (242) pp. 67-73.

* cited by examiner

Bed/Time

Bed
| | | | | | | | | | | | | | | | | | | | | |
|---|---|---|---|---|---|---|---|---|---|---|---|---|---|---|---|---|---|---|---|---|
| | B2 | B2 | B2 | B2 | B2 | B3 | B3 | B3 | B3 | B3 | B3 | B3 | H | R2 | R2 | R2 | R1 | R1 | R1 | FR | FR | 1 |
| → | P | P | H | B1 | B1 | B1 | B2 | B2 | B2 | B2 | B3 | B3 | B3 | B3 | B3 | B3 | B3 | H | R2 | R2 | 2 |
| | E1 | E1 | E2 | E2 | E2 | P | P | P | H | B1 | B1 | B1 | B2 | B2 | B2 | B2 | B3 | B3 | B3 | B3 | B3 | 3 |
| → | FD | FD | FD | FD | H | E1 | E1 | E1 | E2 | E2 | E2 | P | P | P | H | B1 | B1 | B1 | B2 | B2 | B2 | 4 |
| | R1 | R1 | FR | FR | FD | FD | FD | FD | FD | FD | H | E1 | E1 | E1 | E2 | E2 | E2 | P | P | P | H | B1 | 5 |
| → | B3 | H | R2 | R2 | R2 | R1 | R1 | R1 | FR | FR | FD | FD | FD | FD | FD | FD | H | E1 | E1 | E1 | E2 | E2 | 6 |
| | B3 | B3 | B3 | B3 | B3 | B3 | B3 | H | R2 | R2 | R2 | R1 | R1 | R1 | FR | FR | FD | FD | FD | FD | FD | FD | 7 |

A ——

| | | | | | | | | | | | | | | | | | | | | |
|---|---|---|---|---|---|---|---|---|---|---|---|---|---|---|---|---|---|---|---|---|
| | B1 | B1 | B1 | B2 | B2 | B2 | B2 | B3 | B3 | B3 | B3 | B3 | B3 | B3 | H | R2 | R2 | R2 | R1 | R1 | 1 |
| → | E2 | E2 | P | P | P | H | B1 | B1 | B1 | B2 | B2 | B2 | B2 | B3 | B3 | B3 | B3 | B3 | B3 | B3 | 2 |
| | FD | H | E1 | E1 | E1 | E2 | E2 | E2 | P | P | P | H | B1 | B1 | B1 | B2 | B2 | B2 | B2 | B3 | B3 | 3 |
| → | FR | FD | FD | FD | FD | FD | FD | H | E1 | E1 | E1 | E2 | E2 | E2 | P | P | P | H | B1 | B1 | B1 | B2 | 4 |
| | R2 | R2 | R1 | R1 | R1 | FR | FR | FD | FD | FD | FD | FD | FD | H | E1 | E1 | E1 | E2 | E2 | E2 | P | P | 5 |
| | B3 | B3 | B3 | B3 | H | R2 | R2 | R2 | R1 | R1 | R1 | FR | FR | FD | FD | FD | FD | FD | FD | H | E1 | E1 | 6 |
| → | B2 | B3 | B3 | B3 | B3 | B3 | B3 | B3 | H | R2 | R2 | R2 | R1 | R1 | R1 | FR | FR | FD | FD | FD | 7 |

| Time(s) | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 |
|---|---|---|---|---|---|---|---|---|---|---|---|---|---|---|---|---|---|---|---|---|---|---|---|---|---|---|---|---|---|---|
| Bed |  |  |  |  |  |  |  |  |  |  |  |  |  |  |  |  |  |  |  |  |  |  |  |  |  |  |  |  |  |  |
| 1 | FD | FD | FD | FD | FD | FD | FD | FD | FD | FD | FD | FD | H | E1 | E1 | H | E2 | E2 | H | E3 | H | H | E4 | E4 | H | E5 | E5 | H | B | B |
| 2 | H | R3 | H | H | R4 | R4 | H | R5 | R5 | H | FR | FR | FD | FD | FD | FD | FD | FD | FD | FD | FD | FD | FD | FD | H | E1 | E1 | H | E2 | E2 |
| 3 | P | P | P | P | P | P | P | P | P | P | R2 | R2 | H | R3 | R3 | H | R4 | R4 | H | R5 | R5 | H | FR | FR | FD | FD | FD | FD | FD | FD |
| 4 | H | E5 | E5 | H | E2 | E2 | H | E3 | E3 | H | P | E4 | H | E5 | E5 | H | B | B | H | B | B | H | P | P | H | R3 | R3 | H | R4 | R4 |
| 5 | H | E1 | E1 | H | P | P | H | P | P | H | P | E4 | H | R5 | R5 | H | FR | FR | H | E1 | E1 | H | P | P | H | P | P | H | P | P |
| 6 |  |  | B | B | B | B | B | B | H | P | P | P | P | P | B | B | H | P | H | R3 | R3 | H | R4 | P | H | R5 | R5 | H | FR | FR |
| 7 |  |  | H | E3 | H | E4 | H | E5 | H | H | B | B | H | B | B | E3 | H | P | H | P | P | H | P | P | B | B | B | H | P | R2 |
| 8 | FD | FD | FD | FD | FD | FD | FD | FD | H | H | E2 | H | FD | H | E3 | H | FD | H | FD | E1 | FD | H | E2 | E2 | H | E3 | E3 | H | P | P |
| 9 | H | R5 | R5 | H | R4 | FR | FR | R3 | H | R3 | R2 | R2 | H | P | R5 | P | E1 | FR | FR | FD | FD | H | FD | R2 | H | B | B | H | E4 | E4 |
| 10 | H | R1 | R1 | H | P | R2 | R2 | P | H | P | P | E4 | H | E5 | P | E3 | FD | E4 | FD | FD | FD | H | P | P | H | FD | FD | FD | FD | FD |

FIG. 15B

| Time(s) | 7.75 | 8.00 | 8.25 | 8.50 | 8.75 | 9.00 | 9.25 | 9.50 | 9.75 | 10.00 | 10.25 | 10.50 | 10.75 | 11.00 | 11.25 | 11.50 | 11.75 | 12.00 | 12.25 | 12.50 | 12.75 | 13.00 | 13.25 | 13.50 | 13.75 | 14.00 | 14.25 | 14.50 | 14.75 | 15.00 |
|---|---|---|---|---|---|---|---|---|---|---|---|---|---|---|---|---|---|---|---|---|---|---|---|---|---|---|---|---|---|---|
| Bed |  |  |  |  |  |  |  |  |  |  |  |  |  |  |  |  |  |  |  |  |  |  |  |  |  |  |  |  |  |  |
| 1 | B | B | H | P | P | P | P | P | P | P | P | B | H | R1 | R1 | H | R2 | R2 | H | R3 | R3 | H | R4 | R4 | H | R5 | R5 | H | FR | FR |
| 2 | H | E3 | E3 | H | E4 | E4 | H | E5 | E5 | H | B | B | H | P | P | H | P | P | H | P | P | H | P | P | H | R1 | R1 | H | R2 | R2 |
| 3 | FD | FD | FD | FD | FD | FD | FD | FD | FD | FD | FD | FD | H | E3 | E3 | H | E4 | E4 | H | E5 | E5 | H | FR | FR | H | B | B | H | P | P |
| 4 | H | R5 | R5 | H | FR | FR | H | R5 | R5 | H | P | P | H | R1 | R1 | H | R2 | R2 | H | R3 | R3 | H | R4 | R4 | H | R5 | R5 | H | E4 | E4 |
| 5 | H | R1 | R1 | H | R2 | R2 | H | R3 | R3 | H | FD | FD | H | E1 | E1 | H | E2 | E2 | H | FD | FD | H | FD | FD | H | FD | FD | H | FD | FD |
| 6 | B | B | H | P | P | P | P | P | P | P | P | B | H | P | P | H | E1 | E1 | H | E3 | E3 | H | E3 | E3 | H | E5 | E5 | H | B | B |
| 7 | H | E3 | E3 | H | R4 | R4 | H | R5 | R5 | H | B | B | H | B | B | H | FD | FD | H | FD | FD | H | FD | FD | H | E1 | E1 | H | E2 | E2 |
| 8 | FD | FD | FD | FD | FR | FR | FD | FD | FD | FD | FD | FD | H | FD | FD | H | FR | FR | H | P | P | H | FD | FD | H | FD | FD | H | FD | FD |
| 9 | H | E5 | E5 | H | R2 | R2 | H | R5 | R5 | H | H | H | H | R3 | R3 | H | R2 | R2 | H | R5 | R5 | H | FR | FR | H | R3 | R3 | H | R4 | R4 |
| 10 | H | E1 | E1 | H | P | P | H | P | P | H | E4 | E4 | H | E5 | E5 | H | E4 | E4 | H | FD | FD | H | P | P | H | P | P | H | P | P |

FIG. 16

| Time(s) | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 |
|---|---|---|---|---|---|---|---|---|---|---|---|---|---|---|---|---|---|---|---|---|---|---|---|---|---|---|---|---|---|---|
| Bed |  |  |  |  |  |  |  |  |  |  |  |  |  |  |  |  |  |  |  |  |  |  |  |  |  |  |  |  |  |  |
| 1 | FD | FD | FD | FD | FD | FD | H | E1 | E1 | H | E2 | E2 | H | P | P | H | B | B | B | B | B | H | R1 | R1 | H | R2 | R2 | H | FR | FR |
| 2 | H | R2 | R2 | H | H | FR | H | FD | FD | FD | FD | FD | FD | E1 | E1 | H | E2 | E2 | H | P | P | H | B | B | B | B | B | H | R1 | R1 |
| 3 | B | B | P | P | P | R1 | B | R2 | B | H | FR | FR | FD | FD | FD | FD | FD | FR | FD | FD | FD | FD | E2 | E2 | H | P | P | H | B | B |
| 4 | H | P | P | H | H | B | B | B | B | H | R1 | R1 | H | R2 | R2 | H | FR | FR | H | FD | FD | FD | FD | FD | H | E1 | E1 | H | E2 | E2 |
| 5 | H | E1 | E1 | H | E2 | E2 | H | P | P | H | B | B | B | B | B | H | R1 | R1 | R2 | R2 | H | H | FR | FR | FD | FD | FD | FD | FD | FD |
| 6 | H | B | B | B | B | B | H | R1 | R1 | H | R2 | R2 | H | FR | FR | H | FD | FD | FD | FD | FD | H | E1 | E1 | H | E2 | E2 | H | P | P |
| 7 | H | E2 | E2 | H | P | P | P | B | B | B | B | B | H | R1 | R1 | H | R2 | R2 | H | FR | FR | FD | FD | FD | FD | FD | FD | H | E1 | E1 |
| 8 | FD | FD | FD | H | E1 | E1 | E2 | E2 | FD | H | P | P | H | B | B | H | B | B | H | B | B | H | R2 | R2 | FD | FR | FR | FD | FD | FD |
| 9 | H | FR | FR | H | R2 | R2 | H | E2 | E2 | FD | E1 | E1 | FD | B | B | B | P | P | H | B | B | B | B | B | H | R1 | R1 | H | R2 | R2 |
| 10 | H | R1 | R1 | R2 | R2 | E2 | H | B | B | FD | H | FD | H | B | B | H | E1 | E1 | E2 | E2 | H | H | P | P | H | B | B | B | B | B |

FIG. 17

| Bed | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 1 | FD | FD | FD | FD | FD | FD | FD | H | E1 | H | E2 | H | E3 | H | E4 | H | E6 | H | P | P | P | P | P | P | H | B | B | B | H | R2 | H | H | FR |
| 2 | H | R6 | H | R4 | H | R3 | H | R2 | H | R1 | H | E6 | H | E4 | H | E3 | H | E2 | H | E1 | H | FR | FD | FD | FD | FD | FD | FD | FD | H | P | H | B |
| 3 | B | B | B | H | E2 | H | E4 | H | E6 | H | P | P | P | P | P | P | H | B | B | B | H | R1 | H | R2 | H | R3 | H | R4 | H | E6 | H | E4 | FD |
| 4 | H | E1 | H | E2 | H | E3 | H | E4 | H | E6 | H | P | P | P | P | P | P | H | B | B | B | H | R6 | H | R4 | H | R3 | H | R2 | H | E6 | FD | FD |
| 5 | FD | FD | FD | FD | FD | FD | FD | H | E1 | H | E2 | H | E3 | H | E4 | H | E6 | H | P | P | P | P | P | P | H | B | B | B | H | R2 | H | H | FR |
| 6 | H | R6 | H | R4 | H | R3 | H | R2 | H | R1 | H | E6 | H | E4 | H | E3 | H | E2 | H | E1 | H | FR | FD | FD | FD | FD | FD | FD | FD | H | P | H | B |
| 7 | B | B | B | H | E2 | H | E4 | H | E6 | H | P | P | P | P | P | P | H | B | B | B | H | R1 | H | R2 | H | R3 | H | R4 | H | E6 | H | E4 | FD |
| 8 | H | E1 | H | E2 | H | E3 | H | E4 | H | E6 | H | P | P | P | P | P | P | H | B | B | B | H | R6 | H | R4 | H | R3 | H | R2 | H | E6 | FD | FD |
| 9 | FD | FD | FD | FD | FD | FD | FD | H | E1 | H | E2 | H | E3 | H | E4 | H | E6 | H | P | P | P | P | P | P | H | B | B | B | H | R2 | H | H | FR |
| 10 | H | R6 | H | R4 | H | R3 | H | R2 | H | R1 | H | E6 | H | E4 | H | E3 | H | E2 | H | E1 | H | FR | FD | FD | FD | FD | FD | FD | FD | H | P | H | B |
| 11 | B | B | B | H | E2 | H | E4 | H | E6 | H | P | P | P | P | P | P | H | B | B | B | H | R1 | H | R2 | H | R3 | H | R4 | H | E6 | H | E4 | FD |
| 12 | H | E1 | H | E2 | H | E3 | H | E4 | H | E6 | H | P | P | P | P | P | P | H | B | B | B | H | R6 | H | R4 | H | R3 | H | R2 | H | E6 | FD | FD |
| 13 | FD | FD | FD | FD | FD | FD | FD | H | E1 | H | E2 | H | E3 | H | E4 | H | E6 | H | P | P | P | P | P | P | H | B | B | B | H | R2 | H | H | FR |
| 14 | H | R6 | H | R4 | H | R3 | H | R2 | H | R1 | H | E6 | H | E4 | H | E3 | H | E2 | H | E1 | H | FR | FD | FD | FD | FD | FD | FD | FD | H | P | H | B |
| 15 | B | B | B | H | E2 | H | E4 | H | E6 | H | P | P | P | P | P | P | H | B | B | B | H | R1 | H | R2 | H | R3 | H | R4 | H | E6 | H | E4 | FD |
| 16 | H | E1 | H | E2 | H | E3 | H | E4 | H | E6 | H | P | P | P | P | P | P | H | B | B | B | H | R6 | H | R4 | H | R3 | H | R2 | H | E6 | FD | FD |

Legend
- FD  Feed
- H   Hold
- B   Blowdown
- E   Equalization
- P   Product
- R   Rrpressure
- FR  Feed Repressure

| Bed | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | FD | FD | FD | FD | FD | FD | FD | FD | FD | FD | FD | FD | H | E1 | H | E2 | H | P | P | P | P | B | B | B | B | B | B | H | R2 | H | R1 | H | FR |
| 2 | H | B | B | B | B | B | B | H | R2 | H | R1 | H | FR | FD | FD | FD | FD | FD | FD | FD | FD | FD | FD | FD | FD | H | E1 | H | E2 | H | P | P |
| 3 | FD | FD | FD | H | E1 | H | E2 | H | P | P | P | P | B | B | B | B | B | B | H | R2 | H | R1 | H | FR | FD | FD | FD | FD | FD | FD | FD | FD |
| 4 | R2 | H | R1 | H | FR | FD | FD | FD | FD | FD | FD | FD | FD | FD | FD | FD | FD | H | E1 | H | E2 | H | P | P | P | P | B | B | B | B | B | B |
| 5 | H | E2 | H | P | P | P | P | B | B | B | B | B | B | H | R2 | H | R1 | H | FR | FD | FD | FD | FD | FD | FD | FD | FD | FD | FD | FD | H | E1 |

Legend

FD  Feed
H   Hold
B   Blowdown
E   Equalization
P   Product
R   Rrpressure
FR  Feed Repressure

| Time(s) | 0.2 | 0.4 | 0.6 | 0.8 | 1.0 | 1.2 | 1.4 | 1.6 | 1.8 | 2.0 | 2.2 | 2.4 | 2.6 | 2.8 | 3.0 | 3.2 | 3.4 | 3.6 | 3.8 | 4.0 | 4.2 | 4.4 | 4.6 | 4.8 | 5.0 | 5.2 | 5.4 | 5.6 | 5.8 | 6.0 | 6.2 | 6.4 | 6.6 | 6.8 | 7.0 | 7.2 | 7.4 | 7.6 | 7.8 | 8.0 | 8.2 | 8.4 | 8.6 | 8.8 | 9.0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Bed 1 | FD | FD | FD | FD | FD | FD | FD | FD | FD | FD | FD | FD | FD | FD | FD | H | E1 | E2 | H | E3 | E4 | H | E5 | P | P | P | P | P | P | H | B | B | B | B | B | B | H | R1 | R2 | H | R3 | R4 | H | R5 | FR |
| Bed 2 | B | B | B | B | B | B | H | R1 | R2 | H | R3 | R4 | H | R5 | FR | FD | FD | FD | FD | FD | FD | FD | FD | FD | FD | FD | FD | FD | FD | FD | H | E1 | E2 | H | E3 | E4 | H | E5 | P | P | P | P | P | P | H |
| Bed 3 | H | E1 | E2 | H | E3 | E4 | H | E5 | P | P | P | P | P | P | H | B | B | B | B | B | B | H | R1 | R2 | H | R3 | R4 | H | R5 | FR | FD | FD | FD | FD | FD | FD | FD | FD | FD | FD | FD | FD | FD | FD | FD |
| Bed 4 | FD | FD | FD | FD | FD | FD | FD | FD | FD | FD | FD | FD | FD | FD | FD | H | E1 | E2 | H | E3 | E4 | H | E5 | P | P | P | P | P | P | H | B | B | B | B | B | B | H | R1 | R2 | H | R3 | R4 | H | R5 | FR |
| Bed 5 | B | B | B | B | B | B | H | R1 | R2 | H | R3 | R4 | H | R5 | FR | FD | FD | FD | FD | FD | FD | FD | FD | FD | FD | FD | FD | FD | FD | FD | H | E1 | E2 | H | E3 | E4 | H | E5 | P | P | P | P | P | P | H |
| Bed 6 | H | E1 | E2 | H | E3 | E4 | H | E5 | P | P | P | P | P | P | H | B | B | B | B | B | B | H | R1 | R2 | H | R3 | R4 | H | R5 | FR | FD | FD | FD | FD | FD | FD | FD | FD | FD | FD | FD | FD | FD | FD | FD |
| Bed 7 | FD | FD | FD | FD | FD | FD | FD | FD | FD | FD | FD | FD | FD | FD | FD | H | E1 | E2 | H | E3 | E4 | H | E5 | P | P | P | P | P | P | H | B | B | B | B | B | B | H | R1 | R2 | H | R3 | R4 | H | R5 | FR |
| Bed 8 | B | B | B | B | B | B | H | R1 | R2 | H | R3 | R4 | H | R5 | FR | FD | FD | FD | FD | FD | FD | FD | FD | FD | FD | FD | FD | FD | FD | FD | H | E1 | E2 | H | E3 | E4 | H | E5 | P | P | P | P | P | P | H |
| Bed 9 | H | E1 | E2 | H | E3 | E4 | H | E5 | P | P | P | P | P | P | H | B | B | B | B | B | B | H | R1 | R2 | H | R3 | R4 | H | R5 | FR | FD | FD | FD | FD | FD | FD | FD | FD | FD | FD | FD | FD | FD | FD | FD |
| Bed 10 | FD | FD | FD | FD | FD | FD | FD | FD | FD | FD | FD | FD | FD | FD | FD | H | E1 | E2 | H | E3 | E4 | H | E5 | P | P | P | P | P | P | H | B | B | B | B | B | B | H | R1 | R2 | H | R3 | R4 | H | R5 | FR |
| Bed 11 | B | B | B | B | B | B | H | R1 | R2 | H | R3 | R4 | H | R5 | FR | FD | FD | FD | FD | FD | FD | FD | FD | FD | FD | FD | FD | FD | FD | FD | H | E1 | E2 | H | E3 | E4 | H | E5 | P | P | P | P | P | P | H |
| Bed 12 | H | E1 | E2 | H | E3 | E4 | H | E5 | P | P | P | P | P | P | H | B | B | B | B | B | B | H | R1 | R2 | H | R3 | R4 | H | R5 | FR | FD | FD | FD | FD | FD | FD | FD | FD | FD | FD | FD | FD | FD | FD | FD |

METHODS OF REMOVING CONTAMINANTS FROM HYDROCARBON STREAM BY SWING ADSORPTION AND RELATED APPARATUS AND SYSTEMS

CROSS REFERENCE TO RELATED APPLICATIONS

This application is the National Stage entry under 35 U.S.C. 371 of PCT/US2012/026801 that published as Intl. Patent App. Pub. No. 2012/118758 and was filed on 27 Feb. 2012, which claims the benefit of U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed on 1 Mar. 2011, each of which is incorporated by reference, in its entirety, for all purposes.

This application is related to U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. Patent Application No. 61/448,123 entitled APPARATUS AND SYSTEMS HAVING A ROTARY VALVE ASSEMBLY AND SWING ADSORPTION PROCESSES RELATED THERETO, filed Mar. 1, 2011; U.S. Patent Application No. 61/448,125 entitled APPARATUS AND SYSTEMS HAVING COMPACT CONFIGURATION MULTIPLE SWING ADSORPTION BEDS AND METHODS RELATED THERETO, filed Mar. 1, 2011, and U.S. Patent Application No. 61/594,824, entitled METHODS OF REMOVING CONTAMINANTS FROM A HYDROCARBON STREAM BY SWING ADSORPTION AND RELATED APPARATUS AND SYSTEMS, filed Feb. 3, 2012, each of which is herein incorporated by reference in its entirety.

FIELD OF THE INVENTION

This invention relates to a swing adsorption process for removal of contaminants, e.g., $CO_2$ and $H_2S$, from hydrocarbon streams through a combination of a selective features, such as system configurations, adsorbent structures and materials, and/or cycle steps.

BACKGROUND OF THE INVENTION

Gas separation is important in many industries and can be accomplished by conducting a mixture of gases over an adsorbent material that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of a microporous adsorbent material or within the free volume of a polymeric material. The higher the pressure, the greater the amount of target gas component that is adsorbed. When the pressure is reduced, the adsorbed target component is released, or desorbed. PSA processes can be used to separate gases within a gas mixture because different gases tend to fill the micropore or free volume of the adsorbent to different extents. If a gas mixture, such as natural gas, is passed under pressure through a vessel containing a polymeric or microporous adsorbent that is more selective towards carbon dioxide, for example, than it is for methane, at least a fraction of the carbon dioxide is selectively adsorbed by the adsorbent, and the gas exiting the vessel is enriched in methane. When the bed reaches the end of its capacity to adsorb carbon dioxide, it is regenerated by reducing the pressure, thereby releasing the adsorbed carbon dioxide. It is typically then purged and repressurized and ready for another adsorption cycle.

While there are various teachings in the art with respect to new adsorbent materials, new and improved parallel channel contactors, and improved rapid cycle PSA (RC-PSA) equipment, none of these to date present a viable solution to the problem of producing good recovery of methane when the feed gas is at high pressure. This is a critical issue because natural gas is often produced at high pressures (30-700 bar) and it is preferred to operate the separation system at high pressure to avoid additional compression before transportation to the market. One problem in extending PSA processes to high pressures, especially with those streams containing large amounts of $CO_2$, is that at the end of the adsorption step there can be significant amounts of product gas in the flow channels and void spaces. This can lead to poor recovery of the desired product and also to low purity product streams.

Achieving high recovery and high purity in separation processes at high pressures is especially beneficial in natural gas processing operations. Many natural gas fields contain significant levels of $CO_2$, as well as other contaminants, such as $H_2S$, $N_2$, $H_2O$ mercaptans and/or heavy hydrocarbons that have to be removed to various degrees before the gas can be transported to market. It is preferred that as much of the acid gas (e.g., $H_2S$ and $CO_2$) be removed from natural gas as possible, and some applications require high purity product gas with parts per million levels of contaminants to meet safety or operational specifications. In all natural gas separations, methane is the valuable component and acts as a light component in swing adsorption processes. Small increases in recovery of this light component can result in significant improvements in process economics and also serve to prevent unwanted resource loss.

Conventional commercial practices for removal of acid gases from natural gas are limited in reaching high recovery and high purity, especially when acid gas concentrations are greater than 30%, because these processes involve considerable energy input in the form of refrigeration, and they often require sizable equipment. For example, the conventional methods for removing up to 20 mole percent (mol %) to 30 mol % acid gases from natural gas streams include physical and chemical solvents. These processes require handling and inventory storage for solvent as well as significant energy consumption for recovering the solvent. For higher acid gas concentrations, some applications use bulk fractionation combined with technology like a Selexol physical solvent system which requires refrigeration and can result in extensive loss of heavy hydrocarbons to the acid gas stream.

Generally, simple PSA cycles can not take advantage of the kinetics of adsorption because the cycle times are long, and conventional PSA systems typically result in significant loss of methane with the acid gas stream. The relatively low product recovery along with the large size and cost of conventional PSA systems typically prohibits their use in large-scale natural gas processing applications. While various concepts have been proposed to enhance the performance of PSA systems, none have enabled separations at high pressure that provide the product purity and recovery required for natural gas processing. Therefore, a need exists in the art for improved processes to remove contaminants from feed streams, such as natural gas streams, at high pressure with high product purity and product recovery.

SUMMARY OF THE INVENTION

In accordance with the present invention there is provided a swing adsorption process for removing contaminants, e.g., $CO_2$, from hydrocarbon streams, such as natural gas streams, which process comprises: a) subjecting a natural gas stream comprising methane and $CO_2$ to an adsorption step by introducing it into the feed input end of an adsorbent bed comprised of an adsorbent material selective for adsorbing $CO_2$, which adsorbent bed having a feed input end and a product output end and which adsorbent bed is operated at a first pressure and at a first temperature wherein at least a portion of said $CO_2$ is adsorbed by the adsorbent bed and wherein a gaseous product rich in methane and depleted in $CO_2$ exits the product output end of said adsorbent bed, wherein said adsorbent material is porous and contains an effective amount of non-adsorbent mesopore filler material, and wherein the adsorption step is performed for a period of less than 10 seconds; b) stopping the introduction of said natural gas stream to said adsorbent bed before breakthrough of said target species from the product output end of said adsorbent bed; c) subjecting said adsorption bed to successive 1 to 10 equalization steps wherein the pressure of said bed is reduced by a predetermined amount with each successive step; d) conducting a high pressure gaseous stream rich in $CO_2$ through said adsorbent bed to remove hydrocarbons from the bed; e) subjecting the purged adsorbent bed to multiple successive blow-down steps wherein the pressure of the bed is reduced by a predetermined amount with each successive blow-down step; f) subjecting said adsorption bed to successive 1 to 10 equalization steps wherein the pressure of said bed is increased by a predetermined amount with each successive step; and g) repressurizing said adsorbent bed to feed pressure using feed.

BRIEF DESCRIPTION OF THE FIGURES

FIGS. 11a and 11b are charts showing the arrangement of the steps for fourteen adsorbents bed assemblies in a two-pressure equalization RC-PSA cycle.

FIGS. 12a and 12b are charts showing an arrangement of steps for sixteen adsorbent bed assemblies in a three-pressure equalization RC-PSA cycle.

FIGS. 15a and 15b shows an exemplary cycle schedule for the base RC-PSA system in FIG. 8.

FIG. 16 shows an exemplary cycle schedule for the rerun RC-PSA system in FIG. 8.

FIG. 17 shows an exemplary cycle schedule for the base RC-PSA system utilizing equalization tanks.

FIG. 18 shows an exemplary cycle schedule for the rerun RC-PSA system utilizing equalization tanks.

FIG. 20 shows an exemplary cycle schedule for the vacuum RC-PSA described in FIG. 9.

DETAILED DESCRIPTION OF THE INVENTION

Figure 1:
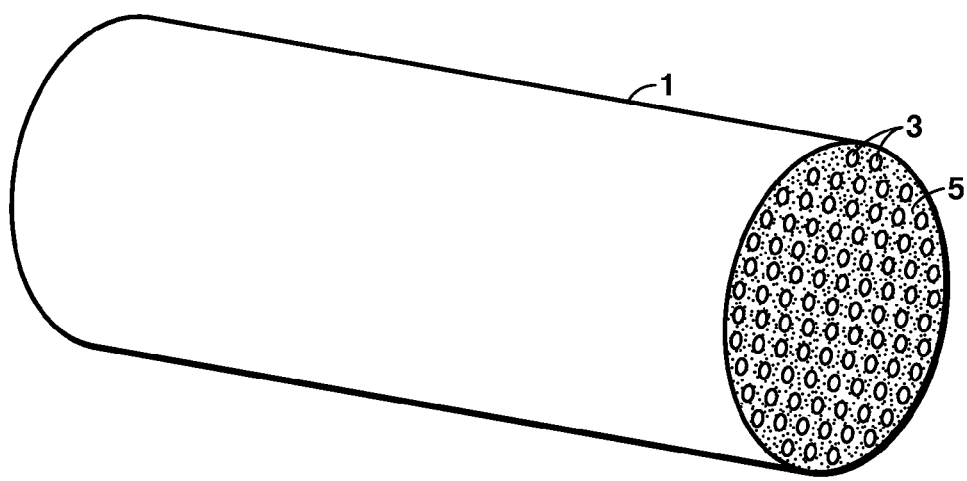
FIG. 1 hereof is a representation of one embodiment of a parallel channel adsorbent contactor that can be used in the present invention. This contactor is in the form of a monolith that is directly formed from a microporous adsorbent and containing a plurality of parallel gas channels.

All numerical values within the detailed description and the claims herein are modified by "about" or "approximately" the indicated value, and take into account experimental error and variations that would be expected by a person having ordinary skill in the art. Further, gas compositions are represented as mole percentages unless otherwise indicated.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present invention relates to the removal of contaminants from gas streams, preferably natural gas streams, using rapid-cycle swing adsorption processes, such as rapid-cycle pressure swing adsorption (RC-PSA). Separations at high pressure with high product recovery and/or high product purity are provided through a combination of judicious choices of adsorbent material, gas-solid contactor, system configuration, and cycle designs. For example, cycle designs that include steps of purge and staged blow-down as well as the inclusion of a mesopore filler in the adsorbent material significantly improves product (e.g., methane) recovery. When compared to conventional pressure swing adsorption technology for removing acid gas (e.g., $CO_2$ and $H_2S$) from natural gas streams, for example, the benefits of the certain embodiments of the present invention include: lower hydrocarbon losses to the acid gas stream, lower overall power consumption, and smaller footprint and equipment weight. In other combinations of features described herein, RC-PSA systems are provided that produce high purity product streams from high-pressure natural gas, while recovering over 99% of the hydrocarbons. For example, in one embodiment of an RC-PSA system, a product with less than 10 ppm $H_2S$ can be produced from a natural gas feed stream that contains less than 1 mole percent $H_2S$.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

The ability to remove contaminants from feed stream, such as a methane stream, at high pressure with high recovery is beneficial in natural gas processing. As an example, gas fields include methane and may also contain significant levels of $H_2O$, $H_2S$, $CO_2$, $N_2$, mercaptans and/or heavy hydrocarbons that have to be removed to various degrees before the gas can be transported to market. Natural gas is often produced at high pressures (30-700 bar absolute). It may be preferred to operate the separation system at high pressure to avoid additional compression before transportation to the market. That is, the processing may be more energy efficient, as it does not involve additional compression.

In addition, processing at higher pressures enhances the working capacity of the adsorbent and minimizes the size of the equipment. In natural gas separations, methane is a valuable component and acts as a light component in swing adsorption processes. Small increases in recovery of this light component can result in enhancements in process economics and serve to prevent unwanted resource loss (e.g., loss of methane or other target product). It is desirable to recover more than 90%, preferably more than 95% of the methane, more than 97% of the methane, or more than 99% of the methane in the contaminant removal process. Recovery is defined as the ratio of the number of moles of the desired or target gas in the product stream divided by the number of moles of the same desired or target gas in the feed stream.

Conventional PSA processes are not able to process higher pressure gases (greater than around 30 bar-a), while still providing high recovery of methane (e.g., >90%, >95%, or >97%). Typically, the methane is lost with the acid gas in these processes through two mechanisms. First, methane from the feed stream remains in the void spaces between adsorbent pellets and/or particles after the adsorption step (e.g., within the pores of the contactor). Void volumes can be quite significant in conventional PSA processes because they are typically operated with long cycle times, on the order of minutes or hours, and therefore the adsorbent and equipment volumes are large. Even for smaller conventional rapid cycle PSA processes, the void space is not managed properly and can still comprise a large portion of the overall system volume. Second, the methane is adsorbed onto the adsorbent material, because materials with relatively low selectivity are employed in conventional PSA systems and the swing capacity is such that the effective ratio for $CO_2$ versus methane molecules entering and leaving the absorbent materials is around 5-10. Through both of these mechanisms, significant quantities of methane may remain in the PSA system after the adsorption step and are lost with the acid gas in the regeneration steps of the cycle. Because of the low methane recovery, conventional PSA systems are not widely employed for large-scale acid gas removal from natural gas.

In addition to high recovery, some natural gas processing applications require the production of a high purity product stream at high pressure. To produce gas that can be ultimately sold to residential and commercial fuel markets, contaminants, such as $N_2$, Hg, mercaptans, and acid gases (e.g., $CO_2$ and $H_2S$), has to be removed to acceptable levels. Most commonly, $H_2S$ has to be removed to low levels in the product offered for sale due to health and safety concerns, with product concentrations of $H_2S$ less than 16 ppm, less than 10 ppm, less than 4 ppm, or even less than 1 ppm. For pipeline sales to meet flammability and burner requirements, it may be preferred that the $N_2$ and $CO_2$ in the product be less than 5 mol %, less than 2 mol %, or preferably less than 1.5 mol %. Further, when the purified product is converted to liquefied natural gas (LNG), it may be preferred that the $CO_2$ be less than 100 ppm, less than 75 ppm or preferably less than 50 ppm to prevent fouling of the cryogenic heat exchanger by solid $CO_2$. Product purity is defined as the ratio of the number of moles of the desired gases in the product stream divided by the total number of moles of gas in the product stream.

Conventional PSA processes are not able to remove contaminants, such as $H_2S$, from high pressure feed streams, such as natural gas, down to parts per million levels, while achieving high recovery. For example, Kikkinides, et al. were able to simulate a PSA process that purified natural gas at around 30 bar-a containing 1000 ppm $H_2S$ and 5% $CO_2$ and produced a product stream containing 1 ppm $H_2S$ and 3% $CO_2$ while achieving over 95% recovery. See E. S. Kikkinides, V. I. Sikavitsas, and R. T. Yang, "*Natural Gas Desulfurization by Adsorption: Feasibility and Multiplicity of Cyclic Steady States*", Ind. Eng. Chem. Res. 1995, 34(1), p. 255-262. Vacuum regeneration at pressures around 0.1 bar-a were required to obtain low levels of $H_2S$ in the product. Another conventional PSA system has been demonstrated commercially for removal of $CO_2$ and $H_2S$ to low levels in a system designed to remove nitrogen from natural gas at pressures less than around 8 bar-a. See Product Brochures from Guild Associates, http://www.moleculargate.com/landfill-gas-purification/MolecularGate Introduction.pdf. Vacuum regeneration is also required, and methane recovery of 93% is reported. While both of these processes demonstrated high recovery and high purity, performance can not be maintained at higher pressures as required for most large-scale natural gas processing facilities. Product recovery and product purity both decrease when conventional processes are operated with higher pressure feed streams. In addition, these conventional PSA processes can not be operated with rapid cycles, thus significantly limiting the productivity of the PSA system, which results in larger and more expensive separation equipment. Many factors limit the ability to decrease cycle time with conventional PSA processes, and as a result the achievable product recovery and purity is limited. For example, the high velocities of feed gas through the adsorbent bed or contactor in rapid cycle processes negatively affect performance of the conventional PSA processes, as noted above in Kikkinides et al. where the $H_2S$ concentration in the product increases by one hundred fold when the gas velocity is increased by 25%.

The present invention enables PSA processes for high-pressure feed streams, such as natural gas, that provide high product recovery and/or high product purity using combinations of various features related to A) cycle steps (e.g., adsorption cycle steps, timing, and pressure levels); B) adsorbent structures and materials; and C) adsorption system configurations. The unique combination of features described herein results in performance not previously achieved with PSA processes and as a result the present invention can be used for economic processing of high-pressure natural gas at a large scale. To begin, cycle steps may include one or more of adsorption cycle steps, timing, and pressure levels, which are described above as feature A. These cycle steps may include A1) rapid cycle times; A2) purge with exhaust (referred to as recovery purge); A3) purge with product; A4) vacuum regeneration; A5) selection of proper purge pressures; and A6) multiple blow-down steps. By operating PSA systems with cycle times on the order of seconds, rather than minutes or hours as in conventional PSA systems, the amount of adsorbent and overall system size can be significantly reduced. That is, the weight, cost, and footprint of rapid cycle PSA systems are significantly lower than conventional PSA processes. In addition, the small volume of adsorbent and vessels in an RC-PSA system enables various purges to be conducted that improve recovery and/or product purity. For example, a portion of the contaminant-rich exhaust from the depressurization of one adsorbent bed can be used to purge another adsorbent bed, displacing methane trapped in void spaces between adsorbent particles or methane remaining in channels of the adsorbent contactors. The methane displaced during this recovery purge step can be recycled and captured, thereby increasing the methane recovery of the RC-PSA system. For higher product purity, the adsorbent bed can be purged using a portion of the product gas, which exposes the adsorbent bed to a low partial pressure of contaminant (e.g., $H_2S$) and provides further desorption of $H_2S$ from the adsorbent bed. As a result, high purity methane can be produced during the subsequent adsorption step.

Alternatively, the partial pressure of $H_2S$ in the adsorbent bed can be reduced by exposing the unit to vacuum during regeneration steps to further desorb $H_2S$ from the adsorbent bed. Again, high purity methane can be produced on the subsequent adsorption step. For any type of purge step in an adsorption cycle, the pressure levels should be selected to lessen the volume of gas flow required along with any compression requirements, while maintaining the desired result of the purge step. Finally, depressurization of the adsorbent bed to desorb the contaminants can be performed using a number of blow-down steps with pressure levels selected to correspond to inlet pressures of associated compression equipment to lessen the number of stages required and associated power consumption.

Further, the various steps in the cycle may involve an initial pressure and a final pressure once the step is complete. For instance, the feed stream may be provided at a feed pressure, while depressurization steps may reduce the pressure within an adsorbent bed from a depressurization initial pressure to a depressurization final pressure. Similarly, the blow-down steps may also each reduce the pressure within the adsorbent bed from a blow-down initial pressure to a blow-down final pressure. To re-pressurize the adsorbent bed, re-pressurization steps may increase the pressure within the swing adsorption vessel from re-pressurization initial pressure to a re-pressurization final pressure.

Additional features may include the adsorbent structures and materials, which are described above as feature B. These adsorbent structure and material features include B1) selection of adsorbent material; B2) structured adsorbent contactors; B3) arrangement of adsorbent material within the contactor; and B4) utilization of a mesopore filler to reduce macropore and mesopores within the contactor. An adsorbent material should have a high selectivity for the component or components to be removed as compared to the target product. Furthermore, rapid cycle processes enable kinetic separations in which the selectivity is enhanced by utilizing the differences in diffusion speeds for contaminants relative to target product, which may be methane. As a result, high recovery can be achieved because only a small fraction of the target product (e.g., methane for a natural gas feed stream) is adsorbed and lost with the contaminants (e.g., acid gas for a natural gas feed stream). For $H_2S$ removal, materials that are selective for $H_2S$ are chosen to lessen both $CO_2$ and methane adsorption. In RC-PSA processes, gas velocities within the adsorbent beds may also be quite high due to the high volume flow and short step duration. Therefore, structured adsorbent contactors with a plurality of substantially parallel channels lined with adsorbent material are utilized to minimize pressure drop.

Further, the arrangement of the adsorbent material within the adsorbent contactor is also beneficial. For example, both $H_2S$ and $CO_2$ can be removed to low levels by providing a contactor with a first section containing an adsorbent material selective to remove $H_2S$ and a second section containing an adsorbent material selective to remove $CO_2$ (e.g., a composite adsorbent bed). During regeneration of the composite adsorbent bed, the $CO_2$ desorbed from the second section flows through the first section and provides a purge to remove $H_2S$ from the first section of the adsorbent bed, which may include substantially all of the adsorbed $H_2S$. As a result, the methane product may be provided with less than 4 ppm or less than 10 ppm $H_2S$ and less than 1.5% $CO_2$ on the subsequent adsorption step from the RC-PSA system.

Moreover, void spaces between adsorbent particles within the structured adsorbent contactor can be filled using various types of materials that allow diffusion into and out of the adsorbent particles, but substantially reduce the volume of void space in the overall system. As a result of using a mesopore filler, less methane remains trapped in the adsorbent layer of the contactor after the adsorption step, and therefore less methane is lost with the acid gas resulting in higher overall methane recovery.

Yet even more additional features include adsorption system configuration features, which are described above as feature C. These features include one or more of C1) a series RC-PSA arrangement and C2) dedicated equalization tanks for each equalization step. In addition to or as an alternative to certain features described above, multiple RC-PSA systems can be utilized in series to enhance recovery. The first RC-PSA system processes a feed stream (e.g., natural gas) to produce a high purity product, and the exhaust from the first RC-PSA system is directed to a second RC-PSA system to remove product from the acid gas stream so that the loss of product to the acid gas stream is lessened and the overall product recovery is increased. Further, an additional enhancement may include the use of equalization tanks in a RC-PSA system. For example, each adsorbent bed in an RC-PSA system may include an equalization tank for each equalization step to manage the regeneration of the process in a more efficient manner. That is, the equalization tanks may be utilized to reduce the time associated with depressurization and re-pressurization of the adsorbent bed during the cycle. As a result, the cycle time can be reduced, thereby improving the productivity of the RC-PSA system and reducing the size.

The features described above can be combined in different configurations to enhance performance of a RC-PSA system for high-pressure separations. For example, a PSA system with high recovery can be achieved by a combination of features, such as rapid cycle times; purge with exhaust; selection of adsorbent material; structured adsorbent contactors; and utilization of a mesopore filler to reduce macropore and mesopores within contactor. The performance could be further enhanced by adding features selection of proper purge pressures; multiple blow-down steps and equalization tanks. As another example, a high purity PSA system can be designed by combining features, such as rapid cycle times and purge with product; vacuum regeneration; selection of adsorbent material; structured adsorbent contactors; and arrangement of adsorbent material within the contactor. Performance could be further enhanced by adding features multiple blow-down steps and equalization tanks. As another example, both high recovery and high purity could be achieved by combining features, such as rapid cycle times; purge with exhaust; purge with product; selection of adsorbent material; structured adsorbent contactors; arrangement of adsorbent material within the contactor; and utilization of a mesopore filler to reduce macropore and mesopores within contactor. Performance could be further enhanced by adding factors multiple blow-down steps and/or a series RC-PSA arrangement and/or dedicated equalization tanks for each equalization step. As another example, both high recovery and high purity could be achieved by combining factors rapid cycle times; purge with exhaust; vacuum regeneration; selection of adsorbent material; structured adsorbent contactors; arrangement of adsorbent material within the contactor; and utilization of a mesopore filler to reduce macropore and mesopores within contactor. Performance could be further enhanced by adding factors, such as multiple blow-down steps and/or a series RC-PSA arrangement and/or dedicated equalization tanks for each equalization step Further details of the specific features are provided in figures and the following paragraphs.

In particular, further details regarding the cycle step features are provided in FIGS. 1-6 and the associated paragraphs. The swing adsorption processes of the present invention are preferred to be performed in rapid cycle times or mode, as referenced above as feature A1. Conventional pressure swing adsorption systems are expensive to operate and require a large footprint to be able to remove sufficient amounts of $CO_2$ from natural gas streams. Also, conventional pressure swing adsorption units have cycle times in excess of one minute, typically in excess of two to four minutes. In contrast, the total cycle times for RC-PSA systems are typically less than 90 seconds, preferably less than 30 seconds, less than 20 seconds, more preferably less than 15 seconds, and even more preferably less than 10 seconds. One advantage of RC-PSA technology is a significantly more efficient use of the adsorbent material. The quantity of adsorbent required with RC-PSA technology can be only a fraction of that required for conventional PSA technology to achieve the same separation performance. As a result, the footprint, capital investment, and the amount of active adsorbent required for RC-PSA is typically significantly lower than that for a conventional PSA system processing an equivalent amount of gas. For example, an RC-PSA unit with a three second adsorption time interval for the cycle may utilize only 5% by weight of the adsorbent used for a conventional PSA with a one minute adsorption time interval for the cycle. U.S. Pat. Nos. 6,406,523; 6,451, 095; 6,488,747; 6,533,846 and 6,565,635, describe various aspects of RC-PSA technology.

The smaller equipment volumes associated with RC-PSA technology facilitate flexibility in the operation, which may be utilized to further enhance the process. For example, purge steps may be utilized with a RC-PSA system to enhance the performance of system. A purge step may include using exhaust gas, which is noted above as feature A2, to enhance the methane recovery for the RC-PSA system. In this step, referred to as a recovery purge, a gaseous stream with low concentrations of the product gases may be used to purge the adsorbent bed after the adsorption and equalization steps of the cycle. This contaminant-rich purge stream sweeps methane from the flow channels and void spaces between adsorbent particles and/or the contactor structure, so that the methane can be recycled or captured and other process, thereby reducing the loss of the product gases to the exhaust stream. This purge step substantially increases the recovery of the product gases.

Further, the pressure of the purge may also be optimized, which is as noted above as feature A5, so that the pressure is low enough to reduce the flow rate of the purge feed for effectively sweeping the channels, but is high enough to prevent desorption of the contaminants from the adsorbent bed into the purge stream. The preferred source for the recovery purge is to extract a portion of the exhaust from the blow-down steps, which is then compressed to the required pressure for the purge step. Alternate sources for the purge may also be envisioned, such as $N_2$ or other gases substantially free of methane that are available from other process units. Exemplary purge pressures may include 50 bar a to 1 bar a, which may depend on various factors.

Another type of purge that can be used in RC-PSA systems to enhance the product purity is a product purge, which is noted above as feature A3, in which a clean gas substantially free of the contaminants (e.g., $CO_2$ and $H_2S$) is used to clean the adsorbent bed during regeneration. The reduced partial pressure of contaminants in the flow channels of the adsorbent bed creates a driving force that assists in desorption of contaminants, allowing the adsorbent material to be cleaned to a greater extent than possible with a simple pressure swing to atmospheric pressure. As a result, breakthrough of the contaminants into the product stream is lessened during the subsequent adsorption cycle and higher product purity is obtained. Non-limiting examples of such gases (i.e., "clean gas") include methane and nitrogen that are maintained flowing through the parallel channels in a direction counter-current to the feed direction during at least a portion of the desorption steps of the process. The preferred source for the clean gas is to utilize a portion of the product stream, which is let down to the appropriate pressure to use for the purge. The pressure of the purge is selected typically at the lowest depressurization pressure, although any pressure level between the lowest depressurization pressure and feed pressure can be used. The purge pressure is primarily selected to lessen the flow rate required for the purge.

Another method for enhancing the product purity from an RC-PSA system is the use of vacuum regeneration (as noted above as feature A4). In some embodiments, the adsorbent bed may be exposed to vacuum at a pressure greater than or equal to 0.1 bar-a, greater than or equal to 0.25 bar-a, or greater than or equal to 0.5 bar-a, during a blow-down step to further reduce the partial pressure of contaminants in the flow channels. This creates an increased driving force, which assists in desorbing the contaminants, further reducing the concentration of contaminants in the adsorbent bed at the end of the blow-down step. As a result, high purity product gas is produced during the subsequent adsorption cycle.

If the contaminant exhaust stream from an RC-PSA system has to be compressed prior to subsequent use or disposal, then the use of multiple blow-down steps, as noted in feature A6, may be preferred during regeneration. In an embodiment, depressurization of the adsorbent bed is conducted in multiple blow-down steps, where each step reduces the pressure of the adsorbent bed from an initial pressure to a final pressure. Pressure levels for the blow-down steps are selected to lessen compression power of the exhaust stream, while still depressurizing to the minimum system pressure to allow for maximum desorption of contaminants. For example, an RC-PSA system with a minimum blow-down pressure of 1 bar-a, the final blow-down pressures can be selected around 1 bar-a, 3 bar-a, and 9 bar-a because typical $CO_2$ compressors operate with pressure ratios around 3. With this configuration, the overall power consumption for compressing the blow-down streams is much lower than the power required for compressing the entire stream from 1 bar-a. In other embodiments that include a vacuum blow-down step to obtain high product purity, the use of multiple blow-down steps reduces the size of the vacuum system because a large portion of the contaminants are exhausted at pressures above atmospheric pressure (1 bar a). For example, in an RC-PSA system with a minimum pressure of 0.5 bar-a, much of the contaminants are exhausted through blow-down steps at 1.5 bar-a and 4.5 bar-a so that the overall compression power is minimized and the size of the vacuum system for the 0.5 bar-a exhaust is minimized.

As a further enhancement of the blow-down steps in an adsorption cycle, depressurization during the blow-down steps may be performed from both the feed and the product sides of the adsorbent bed. When compared to depressurizing from only one end of the adsorbent bed, this lessens the time required for the blow-down steps. As a result, the overall cycle time decreases as the productivity of the RC-PSA system increases. Alternatively, for a fixed blow-down time, depressurization using both ends of the adsorbent bed allows lower pressure levels to be reached, which cleans the bed further and provides higher purity product on the subsequent adsorption step.

Depressurization from both ends also enhances recovery and purity of the product when a composite adsorbent bed is used in the adsorption system. In an example, the blow-down step may be performed from both the feed and the product sides of a composite adsorbent bed containing a first portion of bed having an amine functionalized adsorbent material for $H_2S$ removal and a second portion of the bed having DDR adsorbent bed for $CO_2$ removal from natural gas. During the adsorption step, the gas of the feed stream, which may be referred to as feed gas, contacts the amine functionalized adsorbent bed first and breakthrough of $H_2S$ occurs before the feed gas contacts the DDR adsorbent bed where breakthrough of $CO_2$ occurs. During the blow-down step, the blow-down stream from the product end of the adsorbent bed is substantially free from $H_2S$ and may be used for the recovery purge step to improve recovery of the desired product without reintroducing $H_2S$ into the system, which also enables production of methane during the subsequent adsorption step which is substantially free from $H_2S$. In addition, because the product side of the adsorbent bed is substantially free from $H_2S$, the product stream during the subsequent adsorption step may be substantially free from $H_2S$. The blow-down stream from the feed end of the adsorbent bed contains substantial amounts of the adsorbed $H_2S$ and may form the exhaust.

In addition to the cycle step features, various adsorbent structure and material features may be utilized to enhance the process. For example, selection of the appropriate adsorbent material for an RC-PSA system, which is noted above as feature B1, is one of the primary considerations in obtaining a system with high product recovery, high product purity, or both. To obtain substantially complete removal of contaminants, such as acid gas, from natural gas streams, an adsorbent material is selected that is selective for the contaminants to be removed, but has a low capacity for product. For example, the adsorbent material may be selective to one or more acid gas components, but has a low capacity to both methane and heavier hydrocarbons (e.g., hydrocarbons with carbon contents equal to or above about two).

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, these materials do not catalyze undesirable reactions with hydrocarbons that occur on acidic zeolites. Accordingly, functionalized mesoporous adsorbents may be preferred, wherein their affinity toward hydrocarbons is further reduced compared to unfunctionalized smaller pore materials, such as zeolites. Alternatively, adsorption of heavy hydrocarbons can be kinetically suppressed by using small-pore functionalized adsorbent materials, in which diffusion of heavy hydrocarbons is slow compared to $H_2S$ and $CO_2$. Non-limiting examples of functional groups suitable for use herein include primary, secondary, tertiary and other non-protogenic basic groups, such as amidines, guanidines and biguanides. Furthermore, these materials can be functionalized with two or more types of functional groups.

Other non-limiting examples of preferred selective adsorbent materials for use in embodiments herein include microporous materials, such as zeolites, AlPOs, SAPOs, MOFs (metal organic frameworks), ZIFs (zeolitic imidazolate frameworks, such as ZIF-7, ZIF-9, ZIF-8, ZIF-11, etc.) and carbons, as well as mesoporous materials, such as the amine functionalized MCM materials, SBA, KIT materials. For the acid gases such as $H_2S$ and $CO_2$ which are typically found in natural gas streams, adsorbents such as cationic zeolites, amine-functionalized mesoporous materials, stannosilicates, carbons are also preferred.

As an example, for $CO_2$ removal from natural gas, certain embodiments may formulate the adsorbent with a specific class of 8-ring zeolite materials that has a kinetic selectivity for $CO_2$ over methane. The kinetic selectivity of this class of 8-ring zeolite materials allows $CO_2$ to be rapidly transmitted (diffused) into zeolite crystals while hindering the transport of methane so that it is possible to selectively separate $CO_2$ from a mixture of $CO_2$ and methane. For the removal of $CO_2$ from natural gas, this specific class of 8-ring zeolite materials has a Si/Al ratio from about 2 to about 1000, preferably from about 10 to about 500, and more from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients of $CO_2$ and methane (i.e., $D_{CO2}/D_{CH4}$) is greater than 10, preferably greater than about 50, and more preferably greater than about 100 and even more preferably greater than 200. A preferred adsorbent material is Deca-Dodecasil 3R (DDR) which is a zeolite.

In equilibrium controlled swing adsorption processes, most of the selectivity is imparted by the equilibrium adsorption properties of the adsorbent, and the competitive adsorption isotherm of the light product (such as methane) in the micropores or free volume of the adsorbent is not favored. In kinetically controlled swing adsorption processes, most of the selectivity is imparted by the diffusional properties of the adsorbent, and the transport diffusion coefficient in the micropores and free volume of the adsorbent of the light species is less than that of the heavier species (such as $CO_2$ or $H_2S$). Also, in kinetically controlled swing adsorption processes with microporous adsorbents, the diffusional selectivity can arise from diffusion differences in the micropores of the adsorbent or from a selective diffusional surface resistance in the crystals or particles that make-up the adsorbent.

When a kinetically selective adsorbent is used, it is preferred to form the adsorbent layer out of substantially uniform sized adsorbent particles. In a preferred embodiment, the particles have a size distribution as determined by a scanning electron microscope such that the standard deviation of the characteristic size is less than 90% of the mean size. In a more preferred embodiment the standard deviation may be less than 50% of the mean size, and most preferably less than 25% of the mean size. Also, when the adsorbent is kinetically selective, a characteristic diffusional time constant can be used to characterize the performance of the adsorbent. For purposes of the present disclosure, the following time constant is chosen: tau(i) of $L^2/D(i)$ to characterize the kinetic behavior of the adsorbent, where L is a characteristic dimension (meters) of each adsorbent particle or crystal and $D(i)$ (meters$^2$/second) is the diffusion coefficient of each molecular species (i) in the adsorbent. It is preferred that tau for the target gas (such as $CO_2$) be less than $1/20^{th}$ of tau for the primary components in the feed stream from which it is separated. More preferably tau may be less than $1/50^{th}$ of that for the primary components in the feed stream from which it is separated. Most preferably tau is less than $1/50^{th}$ of that for the primary components in the feed stream from which it is separated. When the adsorbent has kinetic selectivity it is also preferred that the characteristic dimensions of the adsorbent particles are chosen so that tau is less than $1/4$ of the time of the adsorption step and greater than $1/40000$ of the time of the adsorption step. More preferably tau is less than $1/10$ of the time of the adsorption step and greater than $1/4000$ of the time of the adsorption step.

Another adsorbent structure and material feature may include the adsorbent bed being a structured adsorbent contactor, which is noted above as feature B2. The structured adsorbent contactor may be utilized to provide high surface area for mass transfer between the gases in the various streams and adsorbent material, while lessening fluid resistance to reduce pressure drop across the adsorbent bed for the high flow velocities encountered during rapid steps in the adsorption cycle. Several non-limiting types of adsorbent structures can be used in the practice of the present invention, including monolithic, spiral wound, and hollow fiber. Exemplary embodiments of contactors are provided in FIGS. 1 through 6. Advantageously, these structures can be constructed directly from a mixed matrix of adsorbent, mesopore filler, and thermal mass using a structural material such as ceramic, glass, or metal which is coated with a matrix of adsorbent and mesopore filler. The mesopore filler and thermal mass may not be required for some certain applications. Monolithic structures are typically made by extrusion of materials through dies to form the micro-channels although other methods, such as diffusion bonding of etched metal plates are possible. The construction methods could include extrusion of the mixed matrix of adsorbent, mesopore filler, and thermal mass or extrusion of a structural material such as ceramic, metal, or plastic with subsequent wash-coating of a mixed matrix of adsorbent and mesopore filler materials on the inside of the monolith micro-channels. Additionally, a monolithic structure could be constructed by diffusion bonding a stack of metal plates in which flow channels have been etched prior to bonding and then wash-coating the inside of the flow channels with a matrix of adsorbent and mesopore filler.

In a preferred embodiment, the adsorbent is incorporated into a parallel channel contactor. "Parallel channel contactors" are defined herein as a subset of adsorbent contactors comprising structured (engineered) contactors in which substantially parallel flow channels are incorporated into the structure. Parallel flow channels are described in detail in United States Patent Application Nos. 2008/0282892 and 2008/0282886, both of which are incorporated herein by reference. These flow channels may be formed by a variety of means and in addition to the adsorbent material, the structure can contain components such as support materials, heat sink materials, and void reduction components.

A wide variety of monolith shapes can be formed directly by extrusion processes. An example of a cylindrical monolith is shown schematically in FIG. 1 hereof. The cylindrical monolith 1 contains a plurality of parallel flow channels 3 than runs the entire length of the monolith. These flow channels 3 can have diameters (channel gap) from about 5 to about 1,000 microns, preferably from about 50 to about 250 microns, as long as all channels of a given contactor have substantially the same size channel gap. The channels could have a variety of shapes including, but not limited to, round, square, triangular, and hexagonal. The space between the channels is occupied by the adsorbent 5. As shown in FIG. 1, the channels 3 occupy about 25% of the volume of the monolith and the adsorbent 5 occupies about 75% of the volume of the monolith. The adsorbent 5 can occupy from about 50% to about 98% of the volume of the monolith. The effective thickness of the adsorbent can be defined from the volume fractions occupied by the adsorbent 5 and channel structure as:

$$\text{Effective Thickness Of Adsorbent} = \frac{1}{2} \text{Channel Diameter} \frac{\text{Volume Fraction Of Adsorbent}}{\text{Volume Fraction Of Channels}}$$

Figure 2:
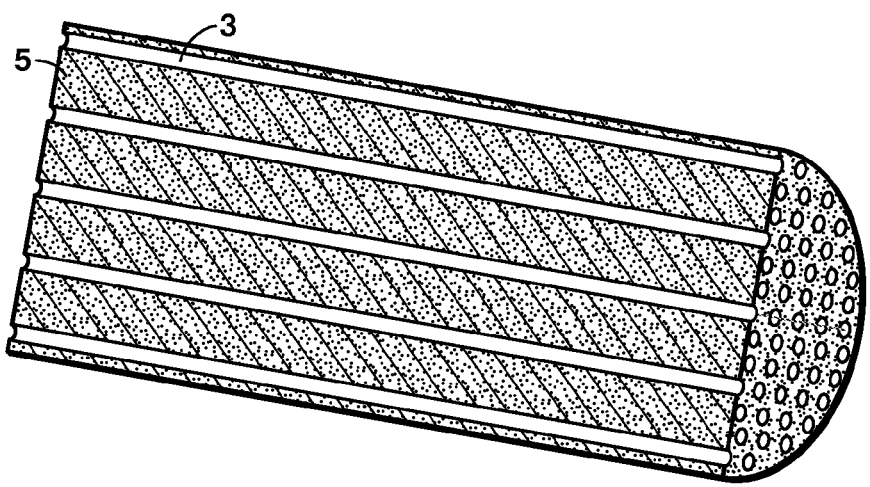
FIG. 2 hereof is a cross-sectional representation along the longitudinal axis of the contactor of FIG. 1 hereof.

FIG. 2 hereof is a cross-sectional view along the longitudinal axis showing feed channels 3 extending through the length of the monolith with the walls of the flow channels formed entirely from adsorbent 5 plus binder, mesopore filler, and heat sink material.

Figure 3:
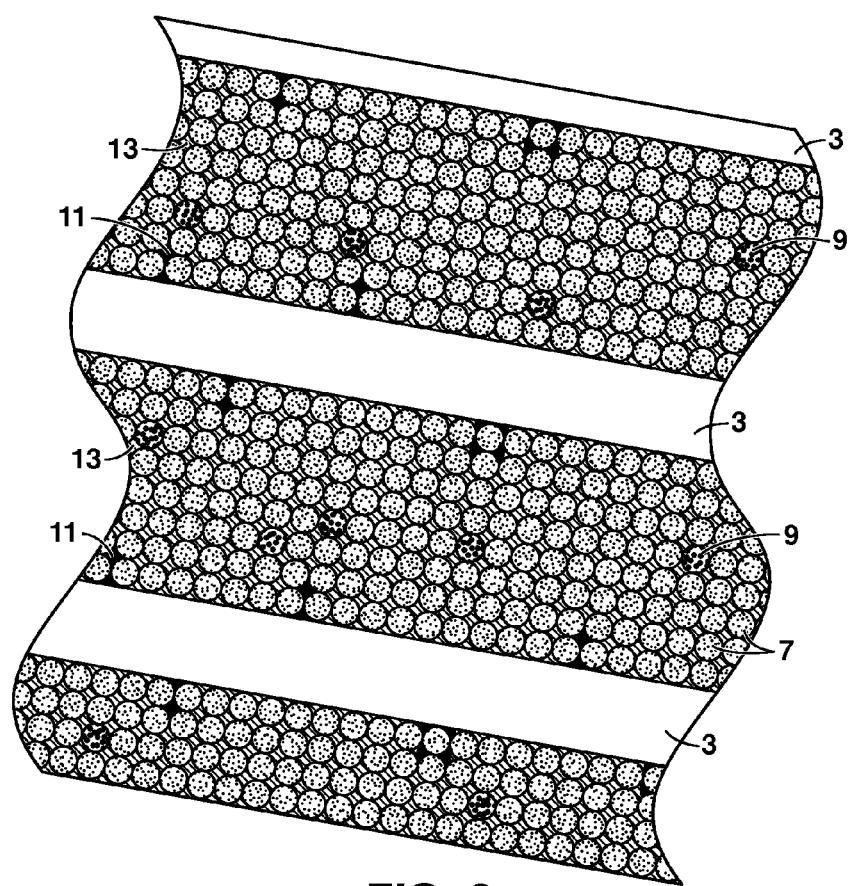
FIG. 3 hereof is a representation of a magnified section of the cross-sectional view of the monolith of FIG. 2 showing the detailed structure of the adsorbent layer along with a blocking agent occupying some of the mesopores and macropores.

A schematic diagram enlarging a small cross section of adsorbent layer 5 is shown in FIG. 3 hereof. The adsorbent layer 5 is comprised of microporous adsorbent or polymeric particles 7; solid particles (thermal mass) 9; that act as heat sinks, a blocking agent 13 and open mesopores and macropores 11. As shown, the microporous adsorbent or polymeric particles 7 occupy about 60% of the volume of the adsorbent layer and the particles of thermal mass 9 occupy about 5% of the volume. With this composition, the voidage (flow channels) is about 55% of the volume occupied by the microporous adsorbent or polymeric particles. The volume of the microporous adsorbent 5 or polymeric particles 7 can range from about 25% of the volume of the adsorbent layer to about 98% of the volume of the adsorbent layer. In practice, the volume fraction of solid particles 9 used to absorb thermal energy and limit temperature rise ranges from about 0% to about 75%, preferably about 5% to about 75%, and more preferably from about 10% to about 60% of the volume of the adsorbent layer. A mesoporous non-adsorbing filler, or blocking agent 13 fills the desired amount of space or voids left between particles so that the volume fraction of open mesopores and macropores 11 in the adsorbent layer 5 is less than about 30% by volume, or less than about 20% by volume, or less than 10% by volume.

When the monolith contactor is used in a gas separation process that relies on a kinetic separation (predominantly diffusion controlled) it is advantageous for the microporous adsorbent, or polymeric, particles 7 to be substantially the same size. It is preferred that the standard deviation of the volume of the individual microporous adsorbent, or polymeric, particles 7 be less than 100% of the average particle volume for kinetically controlled processes. In a more preferred embodiment, the standard deviation of the volume of the individual microporous adsorbent, or polymeric, particles 7 is less than 50% of the average particle volume, and even more preferred less than 25% of the average particle volume. The particle size distribution for zeolite adsorbents can be controlled by the method used to synthesize the particles. It is also possible to separate pre-synthesized microporous adsorbent particles by size using methods such as a gravitational settling column.

Figure 4:
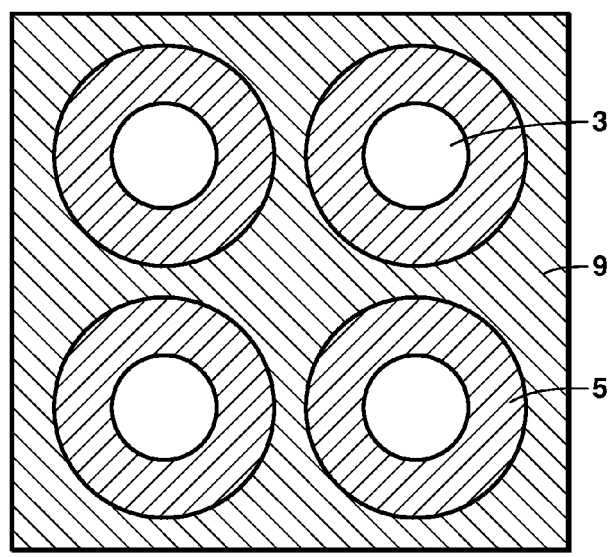
FIG. 4 hereof is an enlarged view of a small area of a cross-section of the contactor of FIG. 1 hereof showing adsorbent layered channel walls.

FIG. 4 hereof shows a cross-sectional view of a small enlarged area of the parallel channel contactor. This figure shows adsorbent material of an adsorbent layer 5 coating the interior of the adsorbent bed structure 9 to form gas flow channels 3. The adsorbent layer 5 may or may not contain mesopore filler and other materials.

Figure 5:
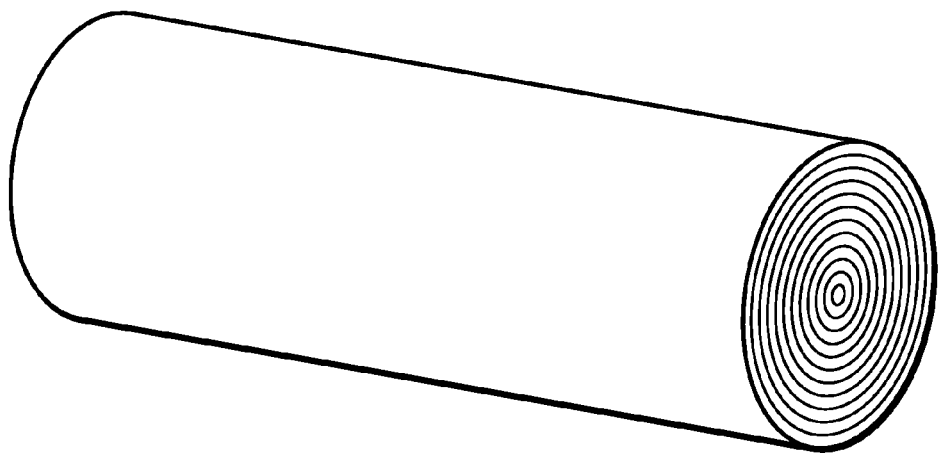
FIG. 5 hereof is a representation of a spiral wound adsorbent contactor for use in the present invention.

FIG. 5 hereof shows a spiral wound form of an adsorbent contactor suitable for use in the present invention. Spiral wound structures are typically made by rolling a single flat sheet into an assembly. It is preferred that no flow passes through the sheet. Spacing between the layers of the spiral wound sheet can be established by any suitable method. The following non-limiting methods can be used: the use of longitudinal spacer wires; dimpling or corrugating the sheet; and adhering particles of uniform size to the sheet. Non-limiting construction methods include spiral winding a single sheet made from a mixed matrix of adsorbent, mesopore filler and thermal mass; wash-coating a mixed matrix of adsorbent and mesopore filler to a thin metal sheet and then spiral winding the sheet; spiral winding a thin metal sheet or mesh and then wash-coating a mixed matrix of adsorbent and mesopore filler to the spiral wound assembly.

Figure 6:
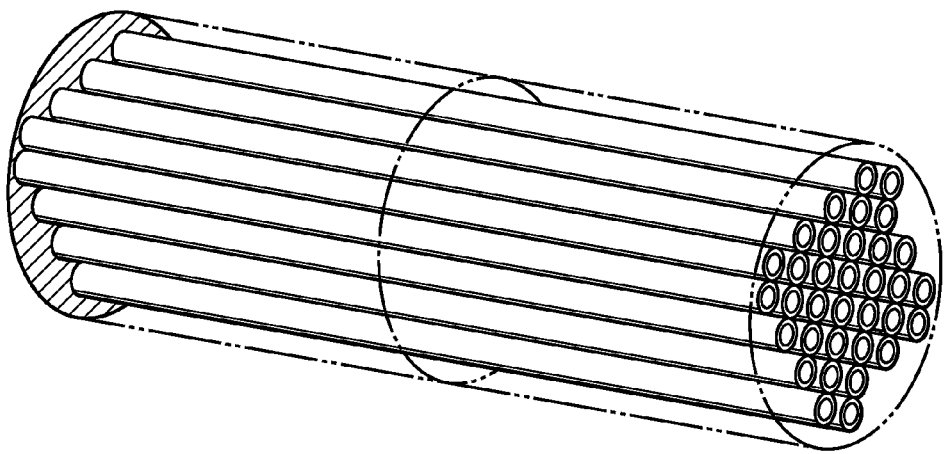
FIG. 6 hereof is a representation of another configuration of an adsorbent contactor of the present invention that is comprised of a bundle of hollow tubes.

FIG. 6 hereof shows an adsorbent contactor comprised of hollow fibers. Hollow-fiber structures can be made by bundling a plurality of hollow tubes in a bundle similar to the tube bundle of a shell and tube heat exchanger to create an assembly. The hollow fibers can be terminated at either end by a potting material, such as an epoxy that is compatible with the hollow-fiber material. Gas flow can be either on the inside or the outside of the hollow fibers, but in either case parallel to the longitudinal axis of the assembly. It is preferred that there is no gas flow through the walls of the hollow fibers.

One preferred method of making the hollow-fiber adsorbent structure is by first fabricating the hollow fibers from a mixed matrix of adsorbent, mesopore filler, and thermal mass, followed by bundling the hollow fibers, then filling in the space around the outside of the fibers with potting material such that gas can only flow through the inside of the fibers.

Another method may be by first fabricating the hollow fibers from a mixed matrix of adsorbent, mesopore filler and thermal mass, then bundling the hollow fibers and terminating both ends of the fibers in potting material such that gas can flow on both the inside and the outside of the fibers.

Yet another method of making the hollow-fiber structures is by wash-coating a mixed matrix of adsorbent and mesopore filler onto the inside of small diameter hollow tubes constructed of a non-limiting material selected from the group consisting of metal (e.g. hypodermic needles), ceramic, plastic, etc.; then filling the space around the outside of the fibers with potting material such that gas can only flow on the inside of the fibers.

Still yet another method of making the structure is by constructing an assembly of small hollow tubes comprised of a material selected from metal, ceramic, plastic, etc. and then terminating both ends in a potting material or by a welded termination, then wash-coating the inside of the tubes with a mixed matrix of adsorbent and mespore filler.

Further, another method is by constructing an assembly the same as noted in the preceding method above, but with the exception that the mixed matrix of adsorbent and mesopore filler is wash-coated to both the inside and outside of the hollow fibers.

These structured contactors can be used to form a single adsorbent bed for an RC-PSA system in a variety of ways. In one method, the adsorbent bed is comprised of a single structured adsorbent contactor that is manufactured the length of the adsorbent bed. In another method, the adsorbent bed can be comprised of multiple shorter segments of structured contactors that are stacked together to provide the full length of the adsorbent bed. In this method, the segments of structured contactors can be installed with or without a gap between adjacent segments. Providing a small gap between adjacent segments, preferably less than 1000 µm, or preferably less than 500 µm, and even more preferably less than 200 µm, allows for redistribution of gas between segments, which may lessen any effects of maldistribution within the flow channels of the structured contactors.

For embodiments that utilize more than one adsorbent material, the arrangement of different adsorbent materials within the structured adsorbent bed, which is noted above as feature B3, may affects the performance of the RC-PSA system. In these embodiments, a composite adsorbent bed may be used with two or more adsorbents, each of which preferentially adsorbs different contaminants from the feed stream. The composite adsorbent bed may be constructed in several different ways, such as using segmented structured contactors each with different adsorbent materials applied to them. As an example, for $CO_2$ and $H_2S$ removal from natural gas, a composite adsorbent bed may be used where the first segment of the bed contains an amine functionalized adsorbent on KIT-6 support for $H_2S$ removal and the remaining segments that comprise the adsorbent bed contain DDR adsorbent for $CO_2$ removal. In this embodiment, $H_2S$ is removed from the feed stream as it passes through the first segment and then $CO_2$ is removed from the feed stream as it passes through the remaining segments of the adsorbent bed. A benefit of using composite beds in this fashion is that the desorbing contaminant from one adsorbent bed segment may provide a partial pressure purge for the other adsorbent bed segments to enhance removal of other contaminants from the respective adsorbent beds. Relating to the previous example, during the blowdown step the $CO_2$ desorbed from the segments of the bed containing DDR may be flowed in a countercurrent direction through the first segment containing amine functionalized adsorbent to provide a partial pressure purge that is substantially free of $H_2S$ to desorb $H_2S$ from the first segment of the composite adsorbent bed. In this manner, the first segment of the composite bed can be cleaned to low levels of $H_2S$ and as a result a high purity product stream with parts per million levels of $H_2S$ can be produced during the subsequent adsorption steps. Note that this effective purge of the $H_2S$ adsorbing segment of the composite bed may be more effective if $H_2S$ is not allowed to breakthrough into the DDR segments of the bed during the adsorption step so that the $CO_2$ in the DDR segments of the bed are substantially free of $H_2S$.

Two adsorbent materials within an adsorbent bed can also be arranged by uniformly dispersing the materials throughout the adsorbent beds provided that the amount of one adsorbent material is substantially more than the amount of the other adsorbent material. For example, for $H_2S$ and $CO_2$ removal from natural gas as described above, around ten times more DDR is required than amine functionalized material. In a preferred embodiment the amount of $H_2S$ selective absorbent is less than five times the amount of $CO_2$ selective absorbent. If these materials are uniformly mixed and distributed along the adsorbent contactor, then the same result is achieved wherein the $CO_2$ provides a partial pressure purge of the amine functionalized material distributed in the adsorbent bed and substantially cleans $H_2S$ to allow high purity methane to the produced on the subsequent adsorption step.

The product recovery of an RC-PSA system can also be enhanced by use of a mesopore filler, as above noted in feature B4, which may be used to reduce the void space in the adsorbent bed. As a result, the amount of product gases trapped in the void space is reduced, so less product gas is lost with the contaminants during regeneration, thereby improving the recovery of product gases. Use of a mesopore filler is described in U.S. Patent Application Publication Nos. 2008/0282892, 2008/0282885 and 2008/028286, each of which is herein incorporated by reference in its entirety. The non-sweepable void space present within the adsorbent channel wall can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the adsorbent that are between 20 angstroms and 10,000 angstroms (1 micron) in diameter divided by the total volume of the contactor that is occupied by the adsorbent material including associated mesopores and macropores in the adsorbent structure. The non-sweepable void space, hereafter referred to collectively as mesopores, can be reduced by filling the mesopores between the particles to reduce the open volume while allowing rapid gas transport throughout the adsorbent layer. This filling of the non-sweepable void space is desired to reduce to acceptable levels the quantity of desired product lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another method is by filling the void space with inert solids of smaller sizes, or by filling the void space with a replenishable liquid through which the desired gases rapidly diffuse (such as water, solvents, or oil). Preferably, the void space within the adsorbent wall is reduced to less than about 40 volume percent (vol. %), preferably to less than 30 vol. %, and more preferably to less than 20 vol. %., and even more preferably to less than 10 vol. %, and most preferably less than about 5 vol % of the open pore volume.

In addition to the adsorbent structure and material features, various adsorption system configuration features may be utilized in addition to the other features or as an alternative enhancement to the process. One such embodiment may include a series arrangement of RC-PSA units to improve recovery from an RC-PSA system, as noted above as feature C1. As an example, a series arrangement of RC-PSA units may be utilized to enhance recovery and purity of a target gas or product by passing a non-product stream from a first RC-PSA unit to a second RC-PSA unit to remove product from the non-product stream of the first RC-PSA unit. As an example, acid gas may be removed from a natural gas stream to produce a high purity methane stream in the first RC-PSA unit of this system. Acid gas from the first RC-PSA unit may contain a fraction of methane, which can be removed using a second RC-PSA unit. The methane product from the second RC-PSA unit may be recycled or utilized elsewhere in the facility and the acid gas may be exhausted from the second RC-PSA unit or conducted away for disposal. By capturing the methane using the second RC-PSA unit, the overall RC-PSA system achieves high product recovery and high product purity even for high pressure natural gas.

Also, as another feature equalization vessels or tanks may be utilized to enhance the productivity of any RC-PSA system, as noted above for feature C2, and to reduce the overall cycle time required. As described in U.S. Patent Application No. 61/594,824, which is incorporated by reference herein, one or more independent pressure vessels may be provided for each equalization step for each adsorbent bed in an RC-PSA system. That is, the dedicated pressure vessels, called equalization vessels or tanks, are connected directly to one of the adsorbent beds. Gases withdrawn from the adsorbent bed during the depressurization step are temporarily stored in the equalization tank and then used later in the cycle for re-pressurization of the same adsorbent bed. Because the distances for piping and valves is lessened with dedicated equalization vessels, the time interval for equalization steps between an adsorbent bed and an equalization tank is typically shorter than the time required for equalization between two adsorbent beds, and therefore the total cycle time can be decreased. As a result, the amount of adsorbent material utilized within an adsorbent bed is reduced and the overall size and weight of the swing adsorption system can be reduced, while the performance may be enhanced (e.g., lower purge flow rates, lower recycle compression, etc.). Further, the amount of piping and valves for the RC-PSA system is reduced because bed to bed connections are not required for the equalization steps.

Figure 7:
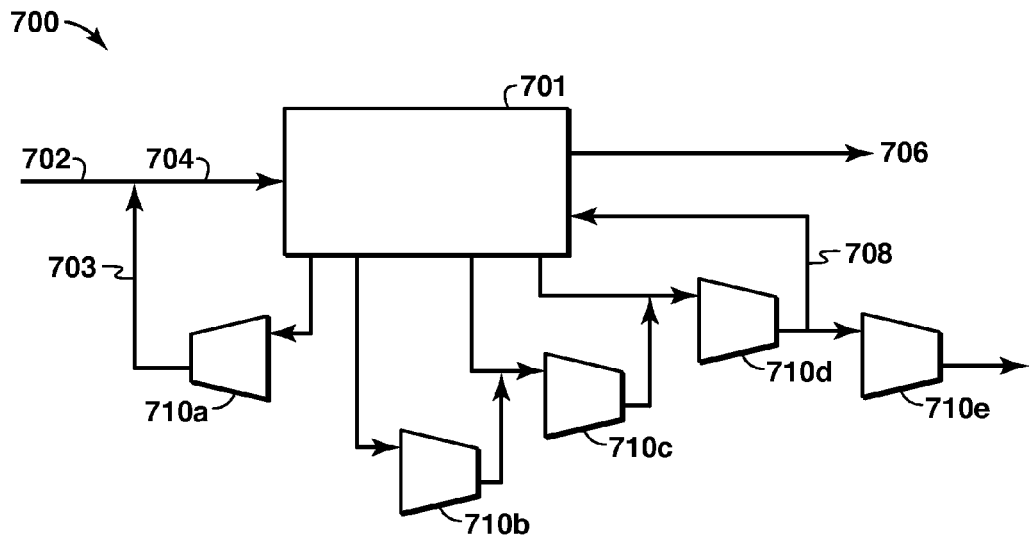
FIG. 7 hereof is a flow scheme of an exemplary embodiment of the present invention showing a blow-down sequence for one adsorbent bed.
Figure 8:
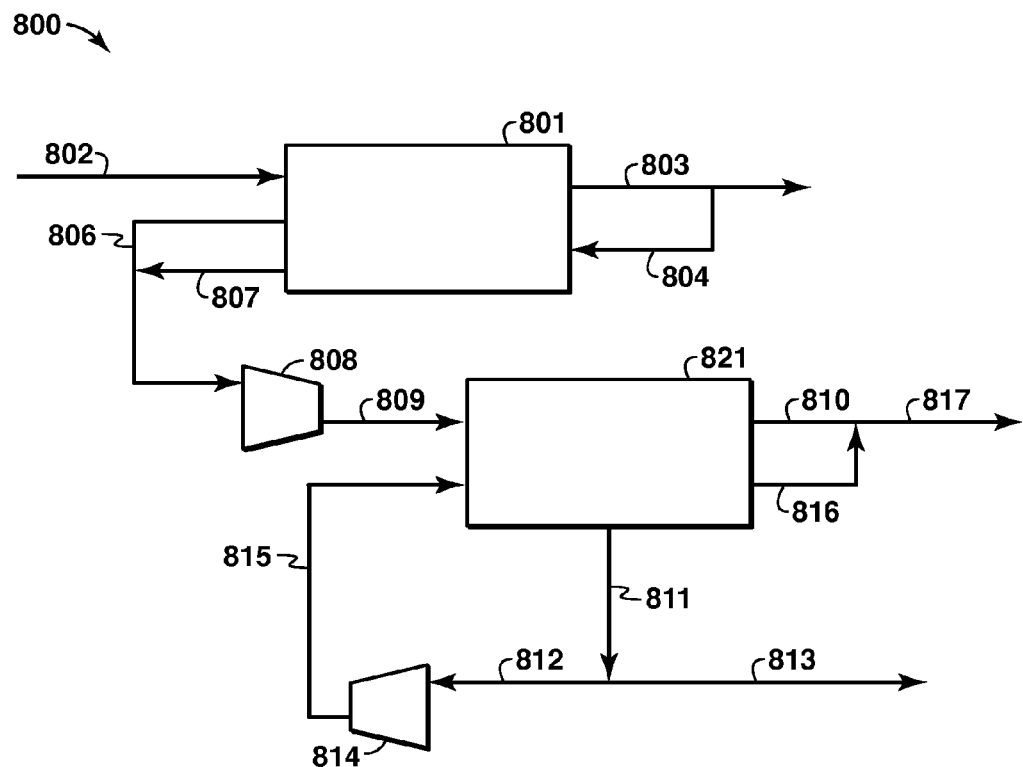
FIG. 8 is a process flow diagram of an exemplary embodiment of a rerun RC-PSA system that can achieve high product purity and recovery.
Figure 9:
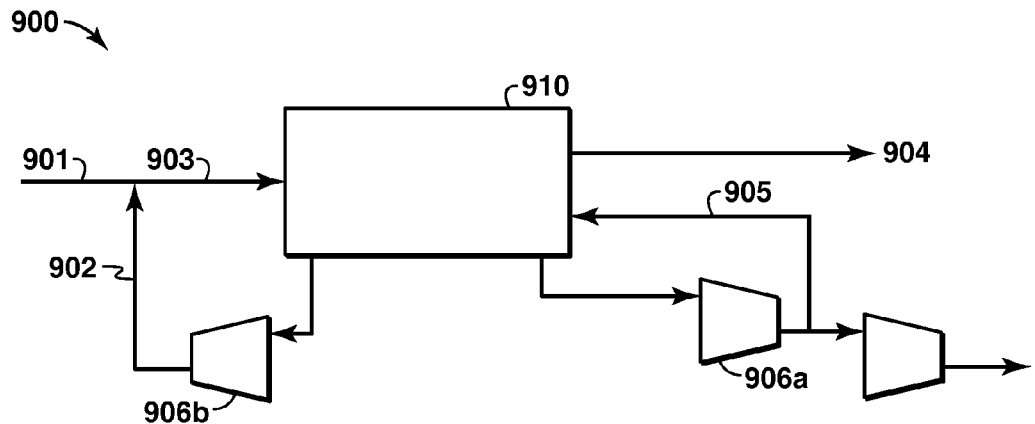
FIG. 9 is a process flow diagram of an exemplary vacuum RC-PSA system that can achieve high product purity and recovery.

The features described above can be incorporated into PSA systems to enhance the performance for high-pressure natural gas processing to enable separations with high recovery, high purity, or both high recovery and high purity. FIGS. 7 through 9 are diagrams of exemplary PSA systems illustrating how the features described herein can be combined for separations. In FIG. 7, high methane recovery is provided by operating the PSA system 700 in rapid cycles (feature A1) with a recovery purge (feature A2) at an appropriate intermediate pressure (feature A5) and using multiple blow-down steps (feature A6). A structured contactor (feature B2) coated with a zeolite with kinetic selectivity for $CO_2$ (feature B1) is used and the void space is reduced through the use of a mesopore filler (feature B4). The exemplary embodiments of the RC-PSA system 700 is further described in Examples 1 and 2 for processing natural gas at 55 bar with 30% acid gas to achieve over 97% methane recovery.

In another embodiment shown in FIG. 8, both high methane recovery and high product purity are achieved using a series of two PSA units in the system 800. The PSA units 801 and 821 utilize features described herein including rapid cycles (feature A1), recovery purge (feature A2), product purge (feature A3), selection of purge pressures (feature A5), structured adsorbent contactors (feature B2) with separate materials for kinetic separation of $CO_2$ and equilibrium adsorption of $H_2S$ (feature B1) arranged in the contactor in two separate segments (feature B3) and incorporating mesopore filler to reduce void volume (feature B4) and improve recovery. The methane recovery is increased by utilizing two PSA units in series (feature C1) to capture methane lost into the acid gas stream from the first PSA unit 801 using a second PSA unit 821. The PSA system can also utilize equalization tanks (feature C2) to reduce the cycle time and enhance the productivity. Performance and details of the RC-PSA system 800 are described in Examples 3 and 4 for processing natural gas with 12% $CO_2$ and 0.01-0.1% $H_2S$ to produce methane with less than 1.5% $CO_2$ and less than 4 ppm $H_2S$ while achieving over 99% recovery.

In yet another embodiment shown in FIG. 9, both high methane recovery and high product purity are achieved in a single PSA unit 900. This PSA unit is operated in rapid cycle mode (feature A1) with a recovery purge (feature A2) at an appropriate intermediate pressure (feature A5) followed by blow-down to vacuum pressure (feature A4) to achieve high product purity. A structured adsorbent contactor (feature B2) is used with two specific materials for kinetic separation of $CO_2$ and equilibrium adsorption of $H_2S$ (feature B1) arranged in the contactor in two separate segments (feature B3) and incorporating mesopore filler to reduce the void volume (feature B4) and enhance recovery. Equalization tanks (feature C2) can also be utilized to reduce the cycle time required and thereby enhance the productivity of the system. Performance and details of the RC-PSA system 900 are described in Example 5 for processing natural gas with 12% $CO_2$ and 0.01-0.1% $H_2S$ to produce methane with less than 1.5% $CO_2$ and less than 4 ppm $H_2S$ while achieving over 99% recovery.

The present invention can better be understood with reference to the following examples that are presented for illustrative purposes and not to be taken as limiting the invention.

Example 1

This example illustrates $CO_2$ and $H_2S$ removal from natural gas at high-pressure using the RC-PSA system 700 from FIG. 7, wherein 98% recovery is predicted through simulation. With reference to the simplified process flow diagram in FIG. 7, the RC-PSA unit 701 is utilized along with various compressors 710a-710e to remove contaminants from a feed stream. The RC-PSA unit 701 includes multiple adsorbent beds connected via valves and piping as described in more detail below. To operate, the feed stream is passed to the RC-PSA unit 701 via conduit 702 and 704. The feed stream preferably comprises natural gas, which may be blended with the recycle stream from the recovery purge outlet conduit 703 associated with compressor 710a. A purified product stream rich in methane exits the RC-PSA unit 701 via conduit 706 at a slightly reduced pressure due to pressure drop across the adsorbent beds, valves and piping internal to the RC-PSA unit 701. In this example, the feed gas entering through conduit 702 contains 30% acid gas ($CO_2+H_2S$) and 70% $CH_4$. The pressure of the feed stream and recycle stream is about 55 bar a. The product stream exiting through conduit 706 contains around 6% acid gas and 94% $CH_4$, and the pressure is around 54 bar a.

A recovery purge stream may be passed to the RC-PSA unit 701 via conduit 708. This purge stream is rich in acid gas ($CO_2$ and/or $H_2S$) and may be composed of the effluent from the blow-down steps in the RC-PSA cycle described in more detail below. The purpose of the recovery purge stream is to sweep methane and other hydrocarbons from the adsorbent contactor channels and the void spaces in the adsorbent layer. The outlet from this purge is compressed in compressor 710a and recycled back to the feed of the RC-PSA unit via conduit 703. In this manner, methane is captured instead of being lost with the acid gas, and therefore the recovery of the RC-PSA system is improved.

Acid gas desorbed from the RC-PSA unit 701 exits at three different pressure levels to minimize power consumption required to compress the acid gas for disposal. The minimum pressure is set around 1 bar a to increase desorption of contaminants and provide enhanced product purity on subsequent adsorption steps. Pressure levels for the remaining two blow-down steps were selected to optimize integration with the acid compressor and lessen power consumption. Typical acid gas compressors operate at pressure ratios around 3, and therefore the blow-down pressure levels are 3 bar a and 9 bar a. The pressure ratio is the discharge pressure divided by the suction pressure. As shown in FIG. 7, the low-pressure exhaust at 1 bar a is compressed in compressor 710b and combined with the intermediate-pressure exhaust at around 3 bar a to be compressed in compressor 710c. The discharge from compressor 710c is combined with the high-pressure exhaust at around 9 bar a and compressed in compressor 710d. The output of compressor 710d may be at around 19 bar a, which may have a portion passed to conduit 708 as a purge stream and to compressor 710e to be further compressed before further processing (e.g., acid gas to injection into disposal wells, pipelines and/or the like).

Each RC-PSA unit 701 is comprised of fourteen adsorbent beds, each of which is comprised of a structured contactor with a plurality of gas flow channels. Hydraulic diameters of the gas flow channels range from 20 to 1000 microns, preferably from 25 to 400 microns, and even more preferably from 40 to 125 microns. The total length of gas flow channels through the contactor range from 0.2 to 3 meters, preferably from 0.5 to 1.5 meters and most preferably range from 0.75 to 1.25 meters. The structured contactor may be segmented along its length so that each segment has a plurality of flow channels and the gas passes sequentially from flow channels in one segment to flow channels in a separate segment. There may be from 1 to 10 segments along the length of the contactor. The physical flow velocity of gas through the flow channels on the inlet side of the adsorbent bed is in a range from 1 to 10 meter/second, preferably in a range from 2 to 5 meter/second. The fluid resistance of gas through the flow channels causes a pressure drop during the adsorption step of less than 8 bar a, preferably less than 4 bar a and more preferably less than 2 bar a, as calculated through a combination of feed pressure, feed viscosity, hydraulic channel diameter and total channel length, and inlet feed velocity.

Gas flow channels in the structured adsorbent contactor are formed from a layer containing adsorbent material selective for $CO_2$ and $H_2S$, which may be on or part of at least a fraction of the structured contactor walls. The layer may also contain a mesopore filler material, which decreases the void space in the layer to less than 30% by volume, or more preferably 20% by volume, or even more preferably 10% by volume, or most preferably less than 4% by volume. The average thickness of the layer may be in a range from 25 to 450 microns, preferably in a range from 30 to 200 microns, and most preferably 50 to 125 microns. In a preferred embodiment, the adsorbent material is a zeolite and has a kinetic selectivity ratio for $CO_2$ greater than 50, preferably greater than 100 and even more preferably greater than 200. The kinetic selectivity ratio is the rate of diffusion for the contaminant, such as $CO_2$, divided by the rate of diffusion for the product, such as methane. During the adsorption step, the change in average loading of $CO_2$ and $H_2S$ in the adsorbent along the length of the channels is preferably greater than 0.2 millimoles per gram (mmole/gram), more preferably greater than 0.5 mmole/gram, and most preferably greater than 1 mmole/gram, where average loading is represented as the millimoles of contaminant adsorbed per gram of the adsorbent.

The RC-PSA unit 701 is operated by rapidly cycling through a series of steps that include adsorption followed by multiple steps to regenerate the adsorbent bed prior to the adsorption step on the subsequent cycle. The same series of steps are executed continuously by each adsorbent bed and the timing of the cycle for each bed may be synchronized with other beds to provide continuous flow of feed stream, product, and purge streams. Selection of the precise steps and cycle timing depends on the gas composition of the feed stream, product specifications, contaminant disposition, and overall hydrocarbon recovery. For the RC-PSA unit 701 in this example, fourteen adsorbent beds are required to complete the cycle for continuous flow operation.

Figure 10:
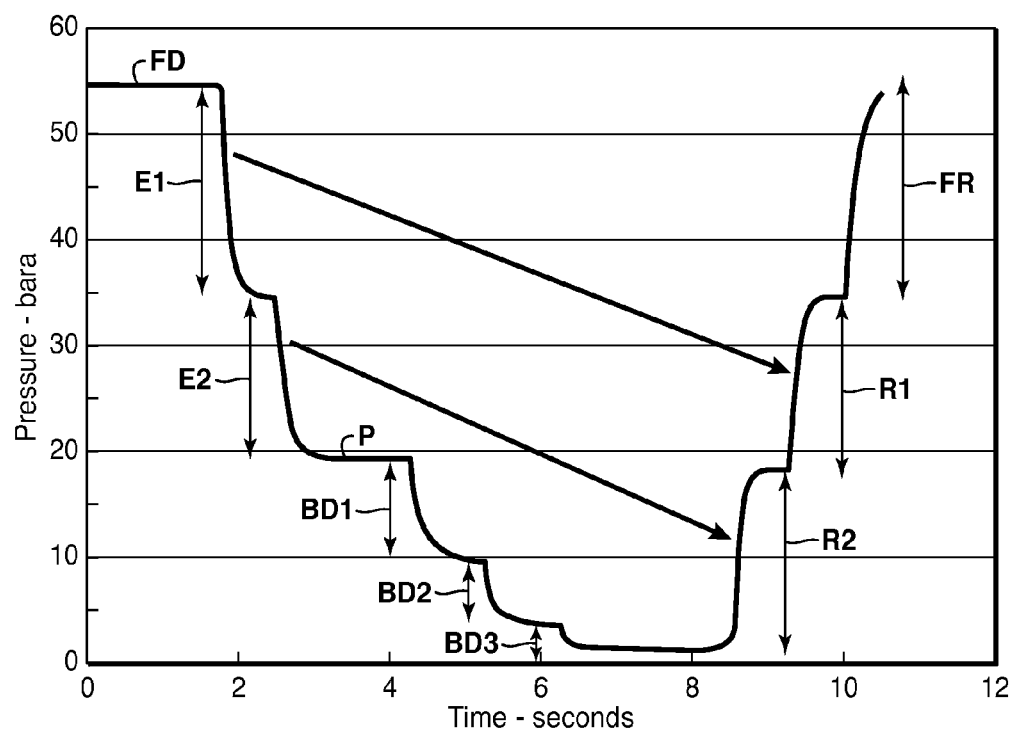
FIG. 10 is a chart showing the pressure of the adsorbent bed of an embodiment of the present invention wherein fourteen adsorbent bed assemblies are used to complete a two-pressure equalization adsorption cycle.

The cycle steps for a single adsorbent bed are illustrated using the pressure of the adsorbent bed versus time, which is shown in FIG. 10. During the adsorption step, which is noted as FD (for feed stream), acid gas is adsorbed in the adsorbent bed and a purified methane product is produced. Feed stream flow is stopped before significant breakthrough of acid gas into the product stream, and the bed is depressurized through two equalization steps, noted as E1 and E2. Significant breakthrough of the acid gas into the product stream, which occurs when the adsorbent bed is more than 50% loaded, preferably more than 75% loaded. A brief hold is included after each step, which is not shown. After the equalization steps, the recovery purge step is performed, which is noted as P, to recover methane remaining in the flow channels and void space in the adsorbent layer. Then, the adsorbent bed is depressurized through three blow-down steps to lessen pressure to desorb acid gas from the adsorbent bed, which is noted as BD. After desorbing acid gas to the extent possible, the adsorbent bed is re-pressurized through two re-pressurization steps, which are noted as R1 and R2, and a feed re-pressurization step, which is noted as FR. The source of gas for the two re-pressurization steps R1 and R2 is from another adsorbent bed undergoing depressurization steps E1 and E2 at the same time. Gas for the feed re-pressurization step is obtained from the feed stream into the RC-PSA unit via conduit 704 in FIG. 7.

The timing for each of the fourteen adsorbent beds is synchronized so that the feed, product, and purge flows are continuous. A cycle schedule for all fourteen adsorbent beds is shown in FIGS. 11a and 11b. The reference characters in FIGS. 11a and 11b are the same as those indicated for FIG. 10, with the addition of a hold step, which is noted as H. In FIGS. 11a and 11b, two groups of adsorbent beds 1101 and 1102 are shown with the adsorbent beds in the first group 1101 labeled 1 to 7 in the top portion of the sequence graph and adsorbent beds in the second group 1102 labeled 8 to 14 in the bottom portion of the sequence graph. FIG. 11a is a portion of the sequence that is continued in FIG. 11b, as indicated by reference character A. During steady state operation, two adsorbent beds are undergoing the adsorption step wherein acid gas is removed from the feed stream to produce a purified methane product. The timing of the cycle for each adsorbent bed is staged so that continuous feed and product flow is achieved. For example, bed 2 in FIG. 11a begins the adsorption step (noted FD) immediately after bed 1 stops the adsorption step, and so forth. In a similar manner, a continuous flow is provided for the purge step and blow-down streams to the acid gas compressors. The timing of cycles between adsorbent beds is also synchronized such that the first equalization step E1 for one bed coincides with the re-pressurization step R1 for another bed so that the gas withdrawn during the depressurization step is used to re-pressurize another bed. For example, adsorbent bed 7 in FIG. 11a undergoes the equalization step E1 at the same time that adsorbent bed 2 is undergoing the re-pressurization step R1.

Pressure levels, flow directions, and durations for each of the steps in the cycle are described further below. In the following cycle descriptions, the term co-current refers to flow of gas from the feed side of the bed to the product side and counter-current refers to flow in the opposite direction. The following is one preferred cycle, wherein:

FD: Adsorption of $CO_2$ and production of purified methane at 55 bar a (co-current flow) from a first adsorbent bed;

E1: Depressurize the first adsorbent bed from about 55 bar a to about 35.5 bar a sending gas to another adsorbent bed to pressurize from about 19 bar a to about 35.5 bar a (co-current flow);

E2: Depressurize the first adsorbent bed from about 35.5 bar a to about 19 bar a sending gas to another adsorbent bed to pressurize from about 1.2 bar a to about 19 bar a (co-current flow);

P: Purge the first adsorbent bed at about 19 bar a with a portion of the gas from step BD1 at 9 bar a, which is compressed to purge pressure. Gas displaced from the adsorbent bed during the purge step is compressed to 55 bar a and recycled to the feed conduit (co-current flow);

BD1: Blow-down or depressurize the first adsorbent bed from about 19 bar a to about 9 bar a. Gas desorbed is exhausted to the third stage of the acid gas compressor (counter-current flow);

BD2: Blowdown or depressurize the first adsorbent bed from about 9 bar a to about 3 bar a. Gas desorbed is exhausted to the second stage of the acid gas compressor (counter-current flow);

BD3: Blowdown or depressurize the first adsorbent bed from about 3 bar a to about 1.2 bar a. Gas desorbed is exhausted to the first stage of the acid gas compressor (counter-current flow);

R2: Re-pressurize the first adsorbent bed from about 1.2 bar a to about 19 bar a using gas withdrawn from yet another adsorbent bed undergoing step E2 step (counter-current flow);

R1: Re-pressurize the first adsorbent bed from about 19 bar a to about 35.5 bar a using gas withdrawn from yet another adsorbent bed undergoing step E1 (counter-current flow); and FR: Re-pressurize the first adsorbent bed from about 35.5 bar a to about 55 bar a with gas from the feed conduit (co-current flow).

The duration of each step in the cycle is as follows:
FD: Adsorb for 1.5 seconds;
H1: Hold for 0.25 seconds;
E1: Depressurize for 0.75 seconds;
E2: Depressurize for 0.75 seconds;
P: Purge for 0.75 seconds;
H2: Hold for 0.25 seconds;
BD1: Blow-down for 0.75 seconds;
BD2: Blow-down for 1.25 seconds;
BD3: Blow-down for 2.0 seconds;
H3: Hold for 0.25 seconds;
R2: Re-pressurize for 0.75 seconds;
R1: Re-pressurize for 0.75 seconds; and
FR: Re-pressurize for 0.50 seconds.

A total of 10.5 seconds is required to complete the cycle steps discussed above. In this example, the adsorption step duration is set by the diffusion speeds of $CO_2$ and methane, wherein the short length of the adsorption step permits the faster diffusing $CO_2$ molecules to reach equilibrium adsorption capacities within the adsorbent material before slower-diffusing methane can substantially diffuse into the adsorbent material. It is preferred to reduce the pressure in the adsorbent bed as quickly as possible after the adsorption step to reduce any further diffusion of methane into the adsorbent particle so that methane losses are reduced. Further, the total time for the regeneration steps is preferred to be as short as possible to maximize the productivity of an adsorbent bed. The total time interval for all of the equalization steps is less than ten times, preferably less than five times that of the adsorption step. Most preferably, the total time for all of the equalization steps is less than that of the adsorption step. It is also preferred that the total time for all of the re-pressurizing steps is less than ten times, preferably less than five times that of the adsorption step. It is most preferred that the total time for all of the re-pressurizing steps be less than that of the adsorption step.

The resulting performance for the RC-PSA system described in this example was predicted through simulation of the cycle using the parameters discussed above. A single RC-PSA unit with fourteen adsorbent beds can process 150 MSCFD of feed gas with 30% acid gas and 70% methane to produce 108 MSCFD of product gas with about 5.4% acid gas and the remainder methane. About 98% methane recovery was achieved in the RC-PSA system. An exhaust stream with around 94% acid gas was also produced for disposal. Conventional PSA systems do not provide the high recovery demonstrated in this RC-PSA system for processing natural gas at these conditions with this composition. Also, this system reduces the loss of heavy hydrocarbons compared to conventional separations technologies.

Example 2

This example describes a modified cycle for the RC-PSA system in Example 1. In this example, the RC-PSA system 700 in FIG. 7 is used to process the same feed gas as described in Example 1. The configuration of each adsorbent bed is the same as Example 1, including flow channel dimensions, adsorbent bed length, adsorbent material, mesopore filler, etc. However, the number of adsorbent beds has increased from fourteen to sixteen to accommodate the modified cycle, which utilizes three equalization steps instead of two equalization steps as in Example 1.

Figures 12A, 12B:
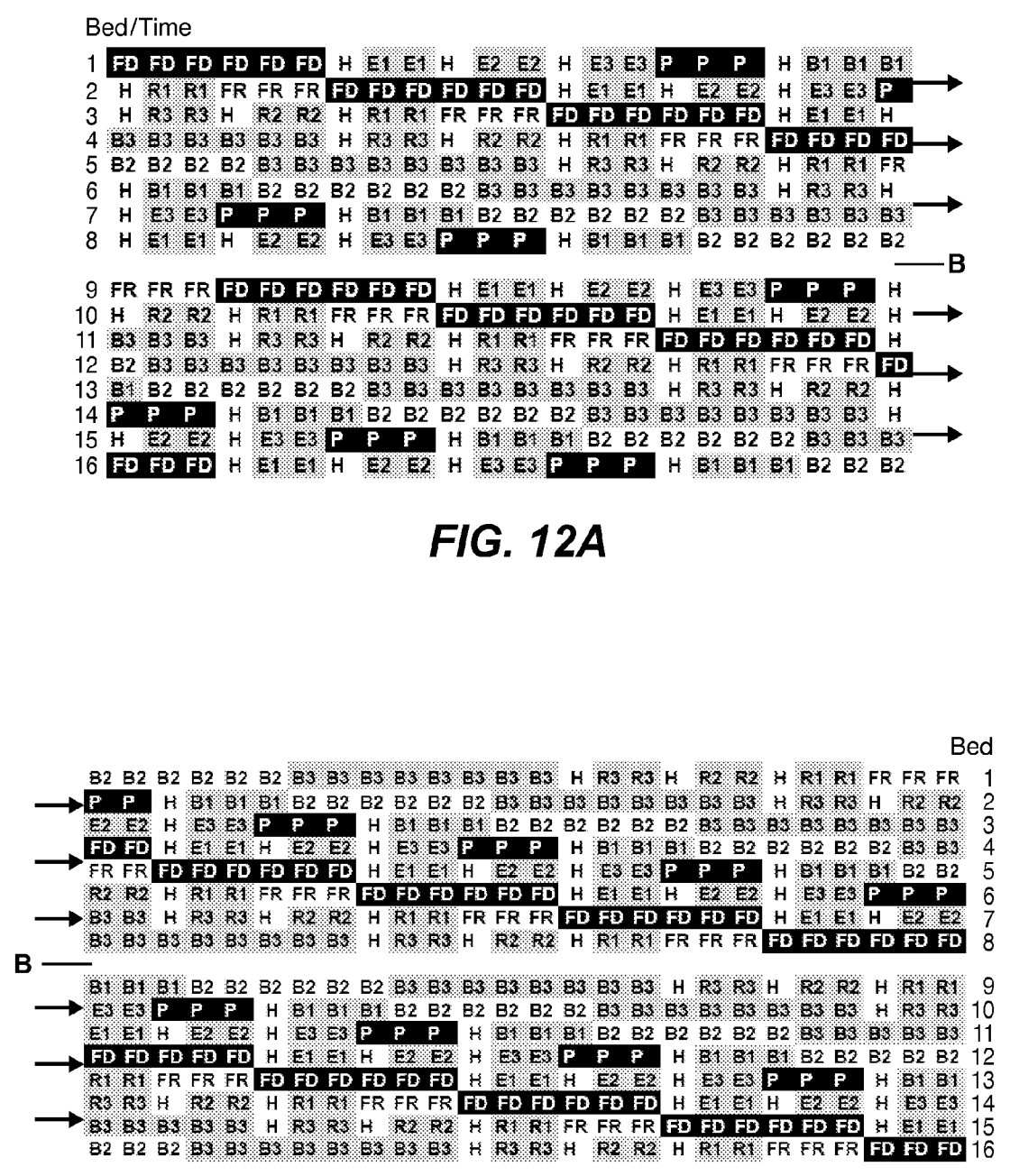

A cycle schedule for the sixteen adsorbent beds for this example is shown in FIGS. 12a and 12b. Notation for the specific steps is the same as in FIGS. 10 and 11, described in Example 1. In FIGS. 12a and 12b, two groups of adsorbent beds are shown with the adsorbent beds in the first group labeled 1 to 8 in the top portion of the sequence graph and adsorbent beds in the second group labeled 9 to 16 in the bottom portion of the sequence graph. FIG. 12a is a portion of the sequence that is continued in FIG. 12b, as indicated by reference character B. As in Example 1, continuous flows are provided for the feed, product, purge, and blow-down streams. Also, the timing of cycles for each adsorbent bed is synchronized such that bed-to-bed equalizations can be performed as an Example 1.

With three equalization steps in the cycle, an individual adsorbent bed may be depressurized to a lower pressure purging than is achievable with only two equalization steps. For example, the purge step in Example 1 is performed at 19 bar a after two equalization steps whereas the purge step for this example is performed at 12.5 bar a after three equalization steps. As a result, the total flow rate required for the purge step is lower because the same velocity is required, but a lower mass flow is required due to the lower pressure. Both the lower pressure and the lower flow rate reduces the size and power consumption of the associated compressor for the purge stream.

The pressure and flow direction for each of the steps in the cycle are as follows:

FD: Adsorption of $CO_2$ and production of purified methane at 55 bar a (co-current flow) from a first adsorbent bed;

E1: Depressurize the first adsorbent bed from about 55 bar a to about 39 bar a sending gas to another adsorbent bed to pressurize from about 26 bar a to about 39 bar a (co-current flow);

E2: Depressurize the first adsorbent bed from about 39 bar a to about 26 bar a sending gas to another adsorbent bed to pressurize from about 12.5 bar a to about 26 bar a (co-current flow);

E3: Depressurize the first adsorbent bed from about 26 bar a to about 12.5 bar a sending gas to another adsorbent bed to pressurize from about 1 bar a to about 12.5 bar a (co-current flow);

P: Purge the first adsorbent bed at about 12.5 bar a with a portion of the gas from step BD1 at 9 bar a, which is compressed to purge pressure. Gas displaced from the adsorbent bed during the purge step is compressed to 55 bar a and recycled to the feed conduit (co-current flow);

BD1: Blow-down or depressurize the first adsorbent bed from about 12.5 bar a to about 9 bar a. Gas desorbed is exhausted to the third stage of the acid gas compressor (counter-current flow);

BD2: Blow-down or depressurize the first adsorbent bed from about 9 bar a to about 3 bar a. Gas desorbed is exhausted to the second stage of the acid gas compressor (counter-current flow);

BD3: Blow-down or depressurize the first adsorbent bed from about 3 bar a to about 1 bar a. Gas desorbed is exhausted to the first stage of the acid gas compressor (counter-current flow);

R3: Re-pressurize the first adsorbent bed from about 1 bar a to about 12.5 bar a using gas withdrawn from yet another adsorbent bed undergoing step E3 step (counter-current flow);

R2: Re-pressurize the first adsorbent bed from about 12.5 bar a to about 26 bar a using gas withdrawn from yet another adsorbent bed undergoing step E2 (counter-current flow);

R1: Re-pressurize the first adsorbent bed from about 26 bar a to about 39 bar a using gas withdrawn from yet another adsorbent bed undergoing step E1 (counter-current flow); and FR: Re-pressurize the first adsorbent bed from about 39 bar a to about 55 bar a with gas from the feed conduit (co-current flow).

The duration of each step in the cycle is as follows:
FD: Adsorb for 1.5 seconds;
H1: Hold for 0.25 seconds;
E1: Depressurize for 0.5 seconds;
H2: Hold for 0.25 seconds;
E2: Depressurize for 0.5 seconds;
H3: Hold for 0.25 seconds;
E3: Depressurize for 0.5 seconds;
P: Purge for 0.75 seconds;
H4: Hold for 0.25 seconds;
B1: Blow-down for 0.75 seconds;
B2: Blow-down for 1.5 seconds;
B3: Blow-down for 2.0 seconds;
H5: Hold for 0.25 seconds;
R2: Re-pressurize for 0.5 seconds;
H6: Hold for 0.25 seconds;
R1: Re-pressurize for 0.5 seconds;
H7: Hold for 0.25 seconds;
R3: Re-pressurize for 0.5 seconds; and
FR: Re-pressurize for 0.75 seconds.

The additional equalization and re-pressurization steps along with the associated hold steps increase the total cycle time to 12 seconds. The adsorption step duration remains the same as in Example 1 based on the kinetics of the adsorbent material. Regeneration steps for this cycle require a slightly longer duration due to the additional equalization and re-pressurization steps. As an Example 1, it is preferred that the total time interval for all of the equalization steps is less than ten times, preferably less than five times that of the adsorption step. Most preferably the total time for all of the equalization steps is less than that of the adsorption step. It is also preferred that the total time for all of the re-pressurizing steps is less than ten times, preferably less than five times that of the adsorption step. It is most preferred that the total time for all of the re-pressurizing steps be less than that of the adsorption step.

Although the number of adsorbent beds increased from fourteen to sixteen for this example, the capacity of a single RC-PSA unit increased proportionally from 150 MSCFD in the Example 1 to about 170 MSCFD in this example. About 120 MSCFD of purified methane product with about 5.4% acid gas is produced, and the methane recovery is improved to about 98.6% for this example. The benefit of utilizing three equalization steps in this example is evident in the purge flow rate, which decreased from 20.6 MSCFD in Example 1 to 14.3 MSCFD in this example. The reduced flow rate along with the reduced pressure for the purge results in a significant reduction in the power consumption and size of the associated compression equipment.

Example 3

This example illustrates $CO_2$ and $H_2S$ removal from natural gas at high-pressure using the RC-PSA system 800 from FIG. 8, wherein over 99% methane recovery is predicted and high purity product stream is produced with less than 1.5% $CO_2$ and less than four ppm $H_2S$. With reference to the simplified process flow diagram in FIG. 8, two RC-PSA units 801 and 821 are utilized along with various compressors 808 and 814 to remove contaminants from a feed stream. In this example, the two RC-PSA systems are arranged in series, where the first RC-PSA unit 801 produces the product gas of the required purity and the second RC-PSA unit 821 recovers methane from the blow-down stream of 801 to improve the overall product recovery for the system 800. Each of the two RC-PSA units 801 and 821 include one or more adsorption beds connected via valves and piping.

The natural gas feed stream containing $CO_2$ and $H_2S$ enters the first RC-PSA unit 801 via conduit 802 and a purified product stream enriched in methane exits via conduit 803 at a slightly reduced pressure due to pressure drop across the adsorbent beds, valves and piping internal to the RC-PSA unit 801. Acid gas removed from the feed stream is desorbed at a low pressure and the exhaust gas exits the unit via conduit 807. To provide high product purity in RC-PSA unit 801, a portion of the product stream is removed via conduit 804 and reduced in pressure to be used as a product purge in the adsorbent beds 801. The low partial pressure of acid gas in the product stream creates a driving force that aids in desorption of acid gas from the adsorbent beds to enhance the product purity during the subsequent adsorption step. The outlet from the product purge step exits via conduit 806 and is combined with the exhaust in conduit 807 for processing in the second RC-PSA unit 821. In this example, the feed gas entering through conduit 802 contains 12% $CO_2$ and 100 ppm $H_2S$ and is at a pressure of 44 bar a. Product gas exiting via conduit 803 contains 1.3% $CO_2$ and about 4 ppm $H_2S$. Acid gas in conduit 806 and 807 is at a pressure of around 1.4 bar a.

To enhance the product recovery of the RC-PSA system 800, methane and other hydrocarbons contained in the exhaust stream of the first RC-PSA unit 801 are removed in the second RC-PSA unit 821. Acid gas and methane rejected from the first RC-PSA unit 801 enters the second RC-PSA unit 821 via conduit 809 after compression in compressor 808. Acid gas is adsorbed from the feed stream in RC-PSA unit 821 and a product stream enriched in methane exits via conduit 810 has a slightly lower pressure due to pressure drop across the adsorbent beds, valves and piping internal to the RC-PSA unit 821. Acid gas is rejected at a low pressure via conduit 811. A portion of the acid gas is removed via conduit 812 and compressed in compressor 814 to be used as a recovery purge that enters the RC-PSA unit 821 via conduit 815. This stream is enriched in acid gas, and is used to sweep methane from the flow channels and void spaces in the adsorbent layer to enhance recovery of the system. The outlet from this purge step exits the RC-PSA unit 821 via conduit 816 and is combined with the product from conduit 810, and the combined stream in conduit 817 contains the recovered hydrocarbons to be used for fuel gas or other purposes within the facility. The remainder off the acid gas is disposed of via conduit 813 by venting or compressing and re-injecting. In this example, the feed stream entering the second RC-PSA unit 821 has a pressure of 45 bar a and contains about 65% acid gas and 35% methane. Product gas contains about 92% methane and 8% acid gas. Acid gas exhaust leaves the unit at a pressure of around 1.4 bar a, and the recovery purge step is performed at around 11 bar a.

Figure 13A:
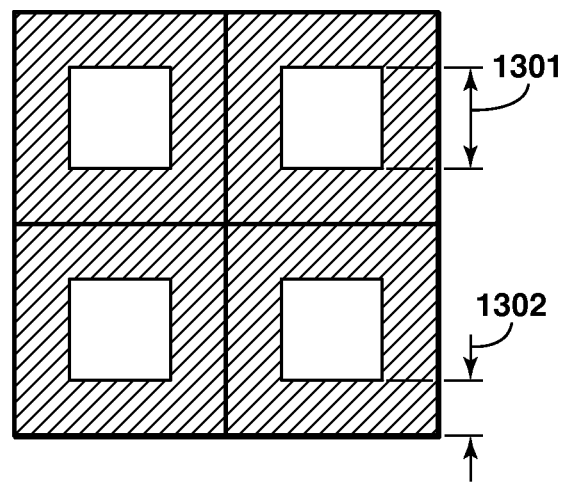
FIGS. 13a and 13b are schematic diagrams of the adsorbent structures and bed.

Each RC-PSA unit 801 is comprised of ten adsorbent beds, each of which is comprised of a structured contactor with a plurality of gas flow channels. In this example, the gas flow channels are substantially square as shown in FIG. 13*a*, with a height 1301 of 225 µm and a width of 225 µm. The total length of the gas flow channels is 1.1 m, and the total diameter of each adsorbent bed is 1.2 m. The structured contactor may be segmented along its length so that each segment has a plurality of flow channels and the gas passes sequentially from flow channels in one segment to flow channels in a separate segment. There may be from 1 to 10 segments along the length of the contactor. The total pressure drop along the length of the adsorbent bed during the adsorption step is around 1 bar.

Figure 13B:
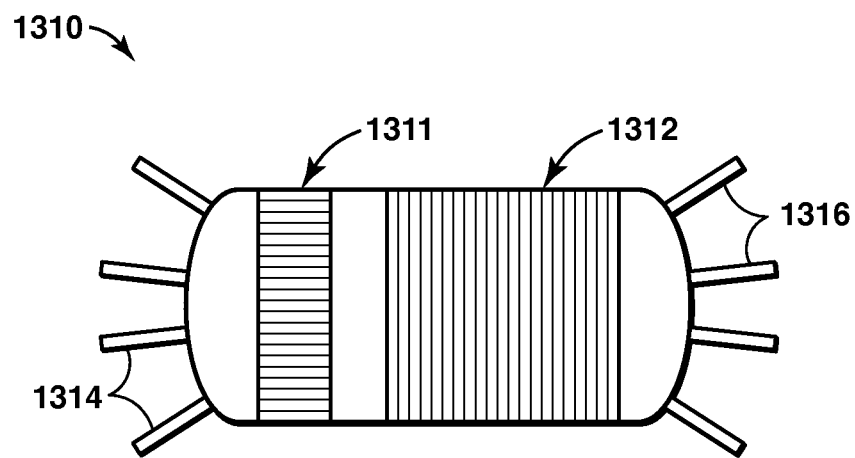

Gas flow channels in the structured adsorbent contactor are formed from a layer containing adsorbent material which may be on our part of at least a fraction of the structured contactor walls. The layer may also contain a mesopore filler material, which decreases the void space in the layer to less than about 20%. The average thickness of the layer is 150 µm, dimension 1302 in FIG. 13a. In this example, two different adsorbent materials are utilized in a composite bed to enable near complete removal of $H_2S$ to produce a high purity methane product. In the first segment of the adsorbent bed, comprising a length of 0.10 m, an amine functionalized adsorbent is utilized which selectively adsorbs $H_2S$. In the remaining segments of the adsorbent bed, comprising a length of 1 m, a zeolite such as DDR is utilized to adsorb $CO_2$. FIG. 13b is a schematic diagram of the composite bed 1310 showing the first segment 1311 with functionalized adsorbent and the second segments 1312 with DDR. Inlet and outlet conduits are shown schematically in 1314 and 1316, respectively.

The second RC-PSA unit 821 is comprised of ten adsorbent beds, which are identical to the adsorbent beds described above except for the total diameter, which is 0.7 m. All other dimensions and materials are the same as the adsorbent beds in 801.

However, in alternative embodiments, the adsorbent material may be mixed together or could be in the form of two separate adsorbent beds in the same vessels.

Figure 14A:
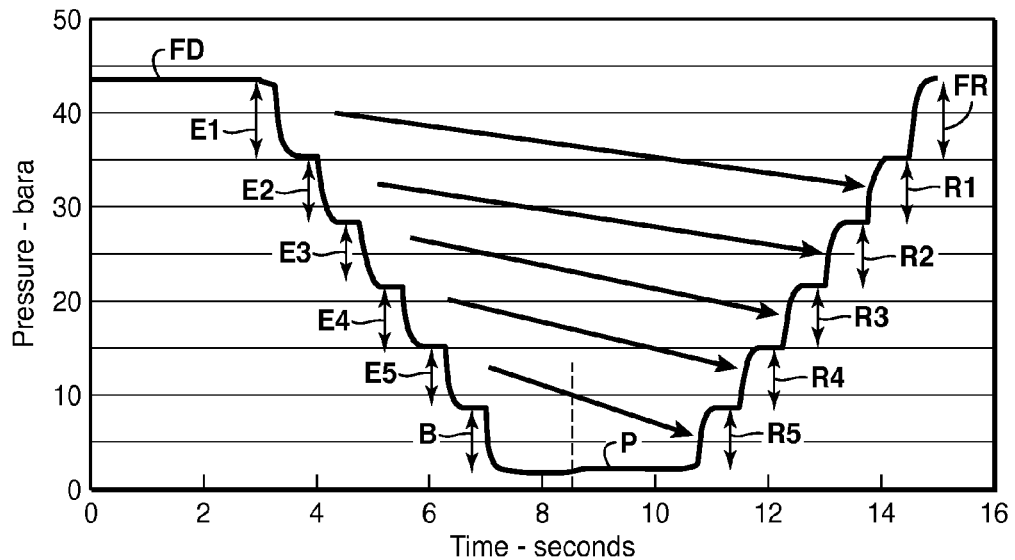
FIGS. 14a and 14b show the pressure versus time relationship for exemplary cycles for RC-PSA cycles described in FIG. 8.

The adsorption of contaminants and subsequent regeneration of the adsorbent bed is achieved through a series of steps in a rapid continuous cycle. Selection of the precise steps and cycle timing depends on several factors including feed composition, product specifications, contaminant disposition, and overall hydrocarbon recovery. For the first RC-PSA unit 801, the cycle steps for a single adsorbent bed are illustrated using the graph of pressure of the adsorbent bed versus time shown in FIG. 14a. In addition to the adsorption step (FD), five equalization steps (E1-E5) are followed by a single blow-down step (B), a product purge step (P), and five re-pressurization steps (R1-R5) along with a feed re-pressurization step (FR). The individual cycle steps in FIG. 14a are described in more detail as follows:

FD: Adsorption step, feeding natural gas at 44 bar a and producing purified methane (co-current flow) in the first adsorbent bed;

E1: Depressurize the first adsorbent bed from 44 bar a to about 35.9 bar a sending gas to another adsorbent bed to pressurize it from about 28.7 bar a to about 35.9 bar a (co-current flow);

E2: Depressurize the first adsorbent bed from about 35.9 bar a to about 28.7 bar a sending gas to another adsorbent bed to pressurize it from about 22 bar a to about 28.7 bar a (co-current flow);

E3: Depressurize the first adsorbent bed from about 28.7 bar a to about 22 bar a sending gas to another adsorbent bed to pressurize it from about 15.24 bar a to about 22 bar a (co-current flow);

E4: Depressurize the first adsorbent bed from about 22 bar a to about 15.24 bar a sending gas to another adsorbent bed to pressurize it from about 8.05 bar a to about 15.24 bar a (co-current flow);

E5: Depressurize the first adsorbent bed from about 15.24 bar a to about 8.05 bar a sending gas to another adsorbent bed to pressurize from about 1.4 bar a to about 8.05 bar a (co-current flow);

BD1: Blow-down or depressurize the first adsorbent bed from about 8.05 bar a to about 1.4 bar a. Gas exhausted is routed to a compressor, such as compressor 908 in FIG. 9, that feeds the second RC-PSA unit (counter-current flow);

P: Purge the first adsorbent bed at about 1.4 bar a with product gas at 2.5 bar a. The outlet from the purge is combined with the exhaust gas from the blow-down step and compressed to 45 bar a to be fed to the second RC-PSA unit;

R5: Re-pressurize the first adsorbent bed from about 1.4 bar a to about 8.1 bar a with gas from the E5 step of yet another adsorbent bed (counter-current flow);

R4: Re-pressurize the first adsorbent bed from about 8.1 bar a to about 15.2 bar a with gas from the E4 step of yet another adsorbent bed (counter-current flow);

R3: Re-pressurize the first adsorbent bed from about 15.2 bar a to about 22 bar a with gas from the E3 step of yet another adsorbent bed (counter-current flow);

R2: Re-pressurize the first adsorbent bed from about 22 bar a to about 28.7 bar a with gas from the E2 step of yet another adsorbent bed (counter-current flow);

R1: Re-pressurize the first adsorbent bed from about 28.7 bar a to about 35.9 bar a with gas from the E1 step of yet another adsorbent bed (counter-current flow); and FR: Re-pressurize the first adsorbent bed from about 35.9 bar a to about 44 bar a with feed gas (co-current flow).

A typical schedule for the cycle of the first RC-PSA unit 801 is as follows:

FD: Adsorb for 3 seconds;
H1: Hold for 0.25 seconds;
E1: Depressurize for 0.5 seconds;
H2: Hold for 0.25 seconds;
E2: Depressurize for 0.5 seconds;
H3: Hold for 0.25 seconds;
E3: Depressurize for 0.5 seconds;
H4: Hold for 0.25 seconds;
E4: Depressurize for 0.5 seconds;
H5: Hold for 0.25 seconds;
E5: Depressurize for 0.5 seconds;
H6: Hold for 0.25 seconds;
BD1: Blow-down for 1.25 seconds;
H7: Hold for 0.25 seconds;
P: Purge for 2 seconds;
H8: Hold for 0.25 seconds;
R5: Re-pressurize for 0.5 seconds;
H9: Hold for 0.25 seconds;
R4: Re-pressurize for 0.5 seconds;
H10: Hold for 0.25 seconds;
R3: Re-pressurize for 0.5 seconds;
H11: Hold for 0.25 seconds;
R2: Re-pressurize for 0.5 seconds;
H12: Hold for 0.25 seconds;
R1: Re-pressurize for 0.5 seconds;
H13: Hold for 0.25 seconds; and
FR: Re-pressurize for 0.5 seconds.

The total cycle time for the steps described above is 15 seconds for the first RC-PSA unit 801. The adsorption time duration for the first RC-PSA unit 801 in this example has been extended to 3 seconds as compared to 1.5 seconds for the previous examples because larger adsorbent crystal sizes are assumed in this example. As a result, the diffusion of methane and $CO_2$ into the zeolite crystals is slower and high kinetic selectivity for $CO_2$ over methane is still achieved within 3 seconds.

Figure 14B:
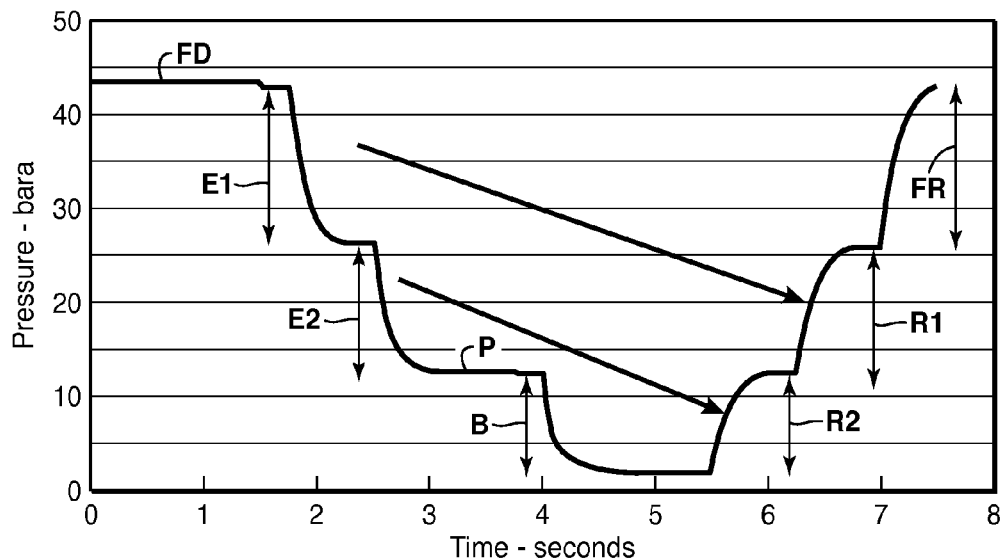

For the second RC-PSA unit 821, a different cycle is used as shown in FIG. 14*b*, which is a graph of the pressure versus time relationship for one adsorbent bed in the cycle. In this cycle, the adsorption step (FD) is followed by two equalization steps (E1-E2), a recovery purge step (P), a single blow-down step (B), two depressurization steps (R1-R2) and a feed depressurization step (FR). Further details of the cycle steps and FIG. 14*b* are described in the following:

FD: Adsorption step, feeding the compressed exhaust gas from the first RC-PSA system (co-current flow) to produce a methane rich stream;

E1: Depressurize the first adsorbent bed from 45 bar a to about 26.1 bar a sending gas to another adsorbent bed to pressurize it from about 12.7 bar a to about 26.1 bar a (co-current flow);

E2: Depressurize the first adsorbent bed from about 26.1 bar a to about 12.7 bar a sending gas to another adsorbent bed to pressurize it from about 1.4 bar a to about 12.7 bar a (co-current flow);

P: Purge the first adsorbent bed at about 11.7 bar a with gas from step BD1 from another adsorbent bed at 1.4 bar a which is compressed to 12.7 bar a;

BD1: Blow-down or depressurize the first adsorbent bed from about 11.7 bar a to about 1.4 bar a (counter-current flow). Gas desorbed is directed to a means for disposal (e.g., venting or compression for injection);

R2: Re-pressurize the first adsorbent bed from about 1.4 bar a to about 12.7 bar a with gas from the E2 step of yet another adsorbent bed (counter-current flow);

R1: Re-pressurize the first adsorbent bed from about 12.7 bar a to about 26.1 bar a with gas from the E1 step of yet another adsorbent bed (counter-current flow); and FR: Re-pressurize the first adsorbent bed from about 26.1 bar a to about 45 bar a with feed gas (co-current flow).

A typical schedule for the cycle of the second RC-PSA unit 821 is as follows:

FD: Adsorb for 1.5 seconds;
H1: Hold for 0.25 seconds;
E1: Depressurize for 0.5 seconds;
H2: Hold for 0.25 seconds;
E2: Depressurize for 0.5 seconds;
H3: Hold for 0.25 seconds;
P: Purge for 0.5 seconds;
H4: Hold for 0.25 seconds;
BD1: Blow-down for 1.25 seconds;
H5: Hold for 0.25 seconds;
R2: Re-pressurize for 0.5 seconds;
H6: Hold for 0.25 seconds;
R1: Re-pressurize for 0.5 seconds;
H7: Hold for 0.25 seconds; and
FR: Re-pressurize for 0.5 seconds.

The total cycle time for the steps described above is 7.5 seconds for the second RC-PSA unit 821. The adsorption time duration for this unit is 1.5 seconds as in previous examples.

For both the RC-PSA units 801 and 821, the timing for each of the adsorbent beds is synchronized so that the feed, product, blow-down, and purge flows are continuous. A cycle schedule for all 10 adsorbent beds in the first RC-PSA unit 801 is shown in FIGS. 15*a* and 15*b*. Notation for the specific steps is the same as in FIG. 14*a*, with the addition of a hold step noted as H. In FIGS. 15*a* and 15*b*, two groups of adsorbent beds are shown with the adsorbent beds in the first group labeled 1 to 5 in the top portion of the sequence graph and adsorbent beds in the second group labeled 6 to 10 in the bottom portion of the sequence graph. FIG. 15*a* is a portion of the sequence that is continued in FIG. 15*b*, as indicated by reference character C. At any given time, two adsorbent beds are performing the adsorption step wherein acid gas is removed from the feed stream to produce a purified methane product. The timing of the cycle for each adsorbent bed is staged so that continuous feed and product flow is achieved. For example, bed 2 in FIG. 15*a* begins the adsorption step (noted FD) immediately after bed 1 stops the adsorption step, and so forth. In a similar manner, a continuous flow is provided for the purge step and blow-down streams to the acid gas compressors. The timing of cycles between adsorbent beds is also synchronized such that the first equalization step E1 for one bed coincides with the re-pressurization step R1 for another bed so that the gas withdrawn during the depressurization step is used to re-pressurize another bed. For example, adsorbent bed 7 in FIG. 15*a* undergoes the equalization step E1 at the same time that adsorbent bed 2 is performing the re-pressurization step R1.

The cycle schedule for the second RC-PSA unit 821 is shown in FIG. 16, and has the same features as described above in FIGS. 15*a* and 15*b* including continuous feed, product, blow-down, and purge flows. Notation for the steps is the same as described for FIG. 14*b*, with the addition of a hold step noted as H in FIG. 16.

Performance of the RC-PSA system described in this example was predicted through simulation of the cycle using the parameters discussed above. The results are summarized in Table 1 below. The combination of features described in this embodiment such as the series PSA configuration, mesopore filler, and recovery purge results in a high product recovery of 99.4%. Furthermore, a high purity product with less than 1.5% $CO_2$ and 4 ppm of $H_2S$ is produced due in part to the combination of features such as a composite bed with selective $H_2S$ adsorbent and kinetically selective $CO_2$ adsorbent and inclusion of a product purge step.

TABLE 1

|  | First RCPSA | Second RCPSA |
| --- | --- | --- |
| Sales Gas Purity |  | 98.3 |
| CO2 in Sales Gas (%) |  | 1.3 |
| H2S in Sales Gas (ppm) |  | 3.6 |
| Sales Gas Recovery (%) |  | 99.4 |
| Skid Feed Flow Rate (MSCFD) |  | 70.1 |
| # Beds | 10 | 10 |
| Cycle Time (s) | 15 | 7.5 |

It should be noted that the resulting purity from this RC-PSA system is unexpected because $CO_2$ and $H_2S$ are removed at two very different extents in the process. $CO_2$ is removed from 12% to 1.5%, which is a factor of eight reduction. $H_2S$ is removed from 100 ppm 24 ppm, which is a factor of twenty-five reduction. This result is achieved through the use of the composite bed along with proper selection of cycle steps and flow directions. $H_2S$ from the feed gas is absorbed in the first segment of the composite bed while $CO_2$ is negligibly adsorbed in the first segment but strongly adsorbed in the second segment of the composite bed. During the desorption steps, $CO_2$ from the second segment flows in a counter-current direction past the first segment of the composite bed. Because there is substantially no $H_2S$ in the $CO_2$ desorbed from the second segment, this gas stream provides a partial pressure purge of the first segment, resulting in a very low amount of $H_2S$ in the first segment of the adsorbent bed, which allows high purity product gas substantially free of $H_2S$ to be produced in the subsequent adsorption step. This result can also be achieved if the $H_2S$ selective adsorbent is dispersed evenly with the $CO_2$ adsorbent along the entire length of the bed.

Example 4

This example describes the same RC-PSA system in Example 3 with two modifications: 1) equalization vessels are utilized instead of bed-to-bed equalizations, and 2) larger diameter adsorbent beds were used. As a result of these modifications, the productivity and performance of the RC-PSA system is improved.

The use of equalization vessels reduces the time required for each equalization step, thereby reducing the total cycle time. One independent pressure vessel is provided for each of the five equalization steps for each adsorbent bed in the system. These equalization vessels are connected directly to one or the adsorbent beds. Gases withdrawn from the adsorbent bed during the depressurization step are temporarily stored in the equalization tank and then used later in the cycle for re-pressurization of the same adsorbent bed. Because the distances for piping and valves is lessened with dedicated equalization vessels, the time intervals for equalization steps between an adsorbent bed and an equalization tank is typically shorter than the time required for equalization between two adsorbent beds, and therefore the total cycle time can be decreased, improving the productivity. The size and weight of the RC-PSA system is also reduced.

The adsorbent beds in this example are identical to those described in Example 3 including dimensions of the adsorbent beds and gas flow channels, adsorbent materials, and composite bed. The only exception is the diameter of the adsorbent bed in the second RC-PSA unit 821 is increased to 1.16 m.

The same series of cycle steps are utilized for each RC-PSA unit as in Example 3. However, the shorter cycle times resulting from the use of equalization vessels involves a different number of adsorbent beds for each RC-PSA unit. The first RC-PSA unit 801 requires sixteen adsorbent beds while the second RC-PSA unit 821 requires five adsorbent beds. The cycle schedule for the first RC-PSA unit 801 is shown in FIG. 17, and the cycle schedule for the second RC-PSA unit 821 is shown in FIG. 18. As in the previous examples, continuous feed and product flow is provided. However, the synchronization requirements between adsorbent beds is relaxed because the transfer of gas between adsorbent vessels is eliminated due to the use of equalization vessels. Thus, the first RC-PSA unit can be operated with four banks of for beds, with each bank executing the same cycle schedule as shown in FIG. 17.

The time intervals of the cycle steps for the first RC-PSA unit 801 is shown below in Table 2:

TABLE 2

| Step | dt | t | |
|---|---|---|---|
| H | 0.1 | 0.1 | 1 |
| E1 | 0.26 | 0.35 | 2 |
| H | 0.1 | 0.45 | 3 |
| E2 | 0.26 | 0.7 | 4 |
| H | 0.1 | 0.8 | 5 |
| E3 | 0.26 | 1.05 | 6 |
| H | 0.1 | 1.15 | 7 |
| E4 | 0.26 | 1.4 | 8 |
| H | 0.1 | 1.6 | 9 |

TABLE 2-continued

| Step | dt | t | |
|---|---|---|---|
| E5 | 0.26 | 1.75 | 10 |
| H | 0.1 | 1.85 | 11 |
| B | 1.26 | 3.1 | 12 |
| H | 0.1 | 3.2 | 13 |
| P | 2 | 6.2 | 14 |
| H | 0.1 | 6.3 | 15 |
| R5 | 0.26 | 5.86 | 16 |
| H | 0.1 | 6.86 | 17 |
| R4 | 0.26 | 6.8 | 18 |
| H | 0.1 | 8 | 19 |
| R3 | 0.26 | 8.25 | 20 |
| H | 0.1 | 8.36 | 21 |
| R2 | 0.26 | 8.8 | 22 |
| H | 0.1 | 8.7 | 23 |
| R1 | 0.26 | 8.86 | 24 |
| H | 0.1 | 7.06 | 25 |
| FR | 0.26 | 7.3 | 26 |
| FD | 3.00 | 10.3 | 27 |
| Total | 10.3 | | |

The total cycle time for the first RC-PSA unit 801 is 10.3 seconds. The total cycle time for the second RC-PSA unit 821 is 6.7 seconds, as shown below in Table 3 of the time intervals of the cycle steps:

TABLE 3

| Step | dt | t | |
|---|---|---|---|
| H | 0.1 | 0.1 | 1 |
| E1 | 0.25 | 0.35 | 2 |
| H | 0.1 | 0.45 | 3 |
| E2 | 0.25 | 0.7 | 4 |
| H | 0.1 | 0.8 | 5 |
| P | 0.25 | 1.3 | 12 |
| H | 0.1 | 1.4 | 13 |
| B | 1.25 | 2.65 | 14 |
| H | 0.1 | 2.75 | 15 |
| R2 | 0.25 | 3 | 22 |
| H | 0.1 | 3.1 | 23 |
| R1 | 0.25 | 3.35 | 24 |
| H | 0.1 | 3.45 | 25 |
| FR | 0.25 | 3.7 | 26 |
| FD | 3.00 | 6.7 | 27 |
| Total | 6.7 | | |

Performance of the RC-PSA system described in this example was predicted through simulation of the cycle using the parameters discussed above. The results are summarized in Table 4 below. The combination of features described in this embodiment such as the series PSA configuration, mesopore filler, and recovery purge results in a high product recovery of 99.4%. Furthermore, a high purity product with less than 1.5% $CO_2$ and 4 ppm of $H_2S$ is produced due in part to the combination of features such as a composite bed with selective $H_2S$ adsorbent and kinetically selective $CO_2$ adsorbent and inclusion of a product purge step.

The resulting performance of the RC-PSA system in this example is summarized in Table 4 below. As in the previous example, a methane recovery over 99% was achieved, while producing high purity product gas with 1.5% $CO_2$ and around 1 ppm $H_2S$. The capacity of the RC-PSA system for this example is 170 MSCFD, which is more than twice the capacity of the similar system in Example 3. The increased productivity for this example is due to the use of equalization tanks. For a large-scale gas processing facility, the improvements in this example may result in significant reductions in the cost and size of equipment for acid gas removal.

TABLE 4

|  | First RCPSA | Second RCPSA |
| --- | --- | --- |
| Sales Gas Purity |  | 98.3 |
| CO2 in Sales Gas (%) |  | 1.5 |
| H2S in Sales Gas (ppm) |  | 1.1 |
| Sales Gas Recovery (%) |  | 99.3 |
| Skid Feed Flow Rate (MSCFD) |  | 170.1 |
| # Beds | 16 | 5 |
| Cycle Time (s) | 10.3 | 6.7 |

Example 5

The natural gas feed stream described in Examples 3 and 4 may be processed with RC-PSA systems utilizing different combinations of the features described in this invention. One possible embodiment is described in this example, wherein a single RC-PSA unit is used to produce high purity methane with less than 1.5% $CO_2$ and less than 4 ppm $H_2S$ while achieving high methane recovery. High product purity and high methane recovery are achieved using vacuum regeneration in combination with other features such as recovery purge, composite bed, mesopore filler, and dual adsorbent materials. FIG. 9 is a simplified process flow diagram for the RC-PSA system 900, in which the RC-PSA unit 910 is in fluid communication with various conduits 901-905 and associated compressors 906a-906b. The system 900 is interconnected to manage the flow of fluids through the system to perform various cycle steps which are described below.

In this example, a feed stream is provided to the RC-PSA system 910 via conduit 903, containing natural gas from conduit 901 which may be combined with a recycle stream from conduit 902. A purified product stream rich in methane exits the RC-PSA system 910 via conduit 904 at a slightly reduced pressure due to pressure drop across the adsorbent beds, valves and piping internal to the RC-PSA system 910. Feed gas in the inlet conduit 901 contains 12% $CO_2$ and 100 ppm $H_2S$ and has a pressure of about 85 bar. The product stream in conduit 904 is purified to 1.5% $CO_2$ and less than 1 ppm $H_2S$ in the RC-PSA unit 910. Acid gas is desorbed from the adsorbent beds and exits the RC-PSA unit 910 via a conduit connected to a compressor 906a which provides a vacuum pressure at the compressor suction of around 0.5 bar a. Acid gas is compressed in 906a to around 20 bar a, and a portion of the stream is removed via conduit 905 to be used for the recovery purge in the RC-PSA system 910. This stream is rich in acid gas and is used to sweep methane from the flow channels and void spaces in the adsorbent layer of the adsorbent beds, thereby increasing the product recovery of the RC-PSA system. The outlet of this purge is collected and compressed in compressor 906b. The purge outlet stream is rich in methane and may be used for various purposes such as fuel gas. In this example, at least a portion may be recycled back to the inlet of the RC-PSA unit 910 via conduit 902 and the remainder is used elsewhere in the facility. The portion of the acid gas stream not used for the recovery purge is further compressed and sent for disposal by reinjection or other methods.

The RC-PSA unit 910 is comprised of twelve adsorbent beds, each of which is comprised of a structured contactor with a plurality of gas flow channels. In this example, the gas flow channels are square as shown in FIG. 13a, with a height 1301 of 225 μm and a width of 225 μm. The total length of the gas flow channels is 1.1 m, and the total diameter of each adsorbent bed is 1.2 m. The structured contactor maybe segmented along its length so that each segment has a plurality of flow channels and the gas passes sequentially from flow channels in one segment to flow channels in a separate segment. There may be from 1 to 10 segments along the length of the contactor. The total pressure drop along the length of the adsorbent bed during the adsorption step is around 1 bar.

Gas flow channels in the structured adsorbent contactor are formed from a layer containing adsorbent material which may be on our part of at least a fraction of the structured contactor walls. The layer may also contain a mesopore filler material which decreases the void space in the layer to less than about 20%. The average thickness of the layer is 150 μm, dimension 1302 in FIG. 13a. In this example, two different adsorbent materials are utilized in a composite bed to enable near complete removal of $H_2S$ to produce a high purity methane product. In the first segment of the adsorbent bed, comprising a length of 0.10 m, an amine functionalized adsorbent is utilized which selectively adsorbs $H_2S$. In the remaining segments of the adsorbent bed, comprising a length of 1 m, a zeolite such as DDR is utilized to adsorb $CO_2$. FIG. 13b is a schematic diagram of the composite bed 1310 showing the first segment 1311 with functionalized adsorbent and the second segments 1312 with DDR. Inlet and outlet conduits are shown schematically in 1314 and 1316, respectively.

Figure 19:
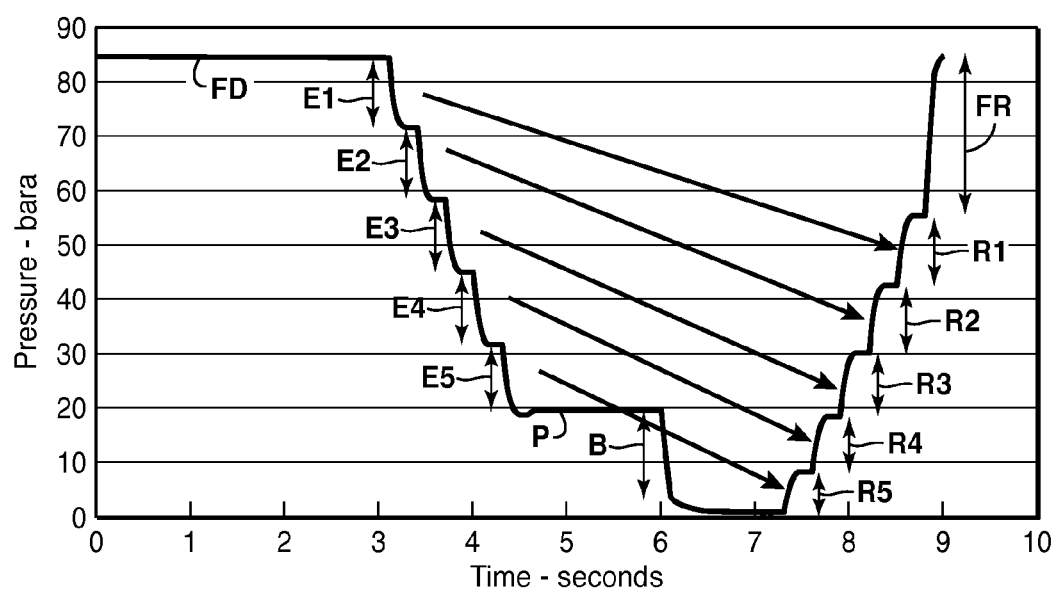
FIG. 19 shows the pressure versus time relationship for an exemplary vacuum RC-PSA cycle described in FIG. 9.

The adsorption of contaminants and subsequent regeneration of the adsorbent bed is achieved through a series of steps in a rapid continuous cycle. Selection of the precise steps and cycle timing depends on several factors including feed composition, product specifications, contaminant disposition, and overall hydrocarbon recovery. For the RC-PSA unit 910, the cycle steps for a single adsorbent bed are illustrated using the graph of pressure of the adsorbent bed versus time shown in FIG. 19. In addition to the adsorption step (FD), five equalization steps (E1-E5) are followed by a recovery purge step (P), a single blowdown step (B), five re-pressurization steps (R1-R5), and a feed depressurization step (FR). The individual cycle steps in FIG. 19 are described in more detail as follows:

FD: Adsorption of acid gas from natural gas at 85 bar a and production of purified methane (co-current flow) from the adsorbent bed;

E1: Depressurize the adsorbent bed from 85 bar a to about 73 bar a sending gas to an equalization tank M1;

E2: Depressurize the adsorbent bed about 73 bar a to 59 bar a sending gas to equalization tank M2;

E3: Depressurize the adsorbent bed about 59 bar a to about 45 bar a sending gas to equalization tank M3;

E4: Depressurize the adsorbent bed about 45 bar a to about 36 bar a sending gas to equalization tank M4;

E5: Depressurize the adsorbent bed about 36 bar a to about 20 bar a sending gas equalization tank M5;

P: Purge the adsorbent bed at about 20 bar a with gas from step BD1 at 1.4 bar a which is compressed to 21 bar a. Gas displaced from the adsorbent bed in this step is collected and compressed for various uses including fuel gas or recycle to the feed of the RC-PSA unit;

BD1: Blow-down or depressurize the adsorbent bed from about 20 bar a to about 0.5 bar a. Gas exhausted is routed to the first stage of a compressor. A portion of the stream is utilized for the required purge after being compressed to around 21 bar a;

R5: Re-pressurize the first adsorbent bed from about 0.5 bar a to about 20 bar a with gas from M5;

R4: Re-pressurize the first adsorbent bed from about 20 bar a to about 36 bar a with gas from M4;

R3: Re-pressurize the first adsorbent bed from about 36 bar a to about 45 bar a with gas from M3;

R2: Re-pressurize the first adsorbent bed from about 45 bar a to about 59 bar a with gas from M2;
R1: Re-pressurize the first adsorbent bed from about 59 bar a to about 73 bar a with gas from M1; and
FR: Re-pressurize the first adsorbent bed from about 73 bar a to about 85 bar a with feed gas.

A typical schedule for the cycle in this example is as follows:
FD: Adsorb for 3 seconds;
H1: Hold for 0.1 seconds;
E1: Depressurize for 0.2 seconds;
H2: Hold for 0.1 seconds;
E2: Depressurize for 0.2 seconds;
H3: Hold for 0.1 seconds;
E3: Depressurize for 0.2 seconds;
H4: Hold for 0.1 seconds;
E4: Depressurize for 0.2 seconds;
H5: Hold for 0.1 seconds;
E5: Depressurize for 0.2 seconds;
H6: Hold for 0.1 seconds;
P: Purge for 1.3 seconds;
H7: Hold for 0.1 seconds;
BD1: Blow-down for 1.2 seconds;
H8: Hold for 0.1 seconds;
R5: Repressurize for 0.2 seconds;
H9: Hold for 0.1 seconds;
R4: Repressurize for 0.2 seconds;
H10: Hold for 0.1 seconds;
R3: Repressurize for 0.2 seconds;
H11: Hold for 0.1 seconds;
R2: Repressurize for 0.2 seconds;
H12: Hold for 0.1 seconds;
R1: Repressurize for 0.2 seconds;
H13: Hold for 0.1 seconds; and
FR: Repressurize for 0.2 seconds.

The total cycle time for the steps described above is 9 seconds. Using the equalization vessels, the duration of the equalization steps is reduced compared to previous examples and therefore the total cycle time is reduced. As a result, the productivity of the adsorbent beds is increased because a larger portion of the total cycle time is spent on adsorption. Therefore fewer adsorbent beds are required for continuous feed and product flows. In this example, only three adsorbent beds are required for continuous flow since each bed is on adsorption for one third of the time. The entire RC-PSA unit 910 can be operated with four sets of three beds operating with the same cycle schedule as shown in FIG. 20. Meditation for the steps is the same as described for FIG. 19, with the addition of the hold step noted as H in FIG. 16. With this configuration, four adsorbent beds are on the adsorption step at any given time. Because equalization vessels are used, each adsorbent bed operates independently and the timing of cycles for different adsorbent beds are not synchronized to allow equalization between adsorbent beds. Synchronization of adsorbent beds is only necessary for providing continuous feed and product flow.

The performance of the RC-PSA system described in this example is predicted through simulation of the cycle using the parameters discussed above. The results are shown in Table 5 below. The combination of features in this embodiment results in a high purity product stream with 1.5% $CO_2$ and less than one ppm $H_2S$ while achieving high product recovery of over 99%. By combining vacuum regeneration with other features such as the recovery purge, mesopore filler, and equalization vessels, the RC-PSA system described in this example achieves similar purity and recovery to the RC-PSA systems described in a Examples 3 and 4, but the productivity is increased to 193 MSCFD and the number of adsorbent beds is reduced significantly. As a result, the cost and size of the acid gas removal equipment is significantly lower than that of a conventional PSA or other technology with the same product purity.

TABLE 5

|  | Vacuum RCPSA |
| --- | --- |
| Sales Gas Purity (%) | 98.4 |
| CO2 in Sales Gas (%) | 1.5 |
| H2S in Sales Gas (ppm) | 0.3 |
| Sales Gas Recovery (%) | 99.6 |
| Skid Feed Flow Rate (MSCFD) | 192.6 |
| # Beds | 12 |
| Cycle Time (s) | 9.0 |

Several features in this example enable the nonobvious results for the RC-PSA system. As noted previously, $CO_2$ and $H_2S$ are removed to very different extents in the process. $CO_2$ is removed from 12% to 1.5%, which is a factor of 8 reduction. $H_2S$ is removed from 100 ppm to 1 ppm, which is a factor of 100 reduction. This result is achieved through the use of the composite bed along with proper selection of cycle steps and flow directions. $H_2S$ from the feed gas is absorbed in the first segment of the composite bed while $CO_2$ is negligibly adsorbed in the first segment but strongly adsorbed in the second segment of the composite bed. During the desorption steps, $CO_2$ from the second segment flows in a countercurrent direction past the first segment of the composite bed. Since there is substantially no $H_2S$ in the $CO_2$ desorbed from the second segment, this gas stream provides a partial pressure purge of the first segment, resulting in a very low amount of $H_2S$ in the first segment of the adsorbent bed, which allows high purity product gas substantially free of $H_2S$ to be produced in the subsequent adsorption step. The same effect can be obtained in a composite bed that contains a mixture of the $CO_2$ and $H_2S$ selective adsorbents. However a larger ratio of $H_2S$ to $CO_2$ selective adsorbent is required compared to the segmented composite bed to remove $H_2S$ to the same extent. For Example 5, the ratio of $H_2S$ to $CO_2$ selective adsorbent is 1:9 for the segmented composite bed and is 2:8 for the composite bed with the $H_2S$ and $CO_2$ selective adsorbents mixed together to reduce $H_2S$ in the product to 1 ppm. $H_2S$ from the feed gas is adsorbed substantially by the $H_2S$ selective adsorbent near the feed end of the composite bed. $CO_2$ from the feed gas is adsorbed substantially by the $CO_2$ selective adsorbent and the $CO_2$ front moves past the $H_2S$ front in the composite bed. During the desorption steps, $CO_2$ desorbs in a countercurrent direction and provides a partial pressure purge for the desorption of $H_2S$ near the feed end of the adsorbent bed.

Also, the blow-down may be performed from both the feed and the product sides of the composite adsorbent bed to reduce the blow-down time and improve product recovery and purity.

Further optimization of the RC-PSA system could be envisioned to improve the performance. For example, the recovery purge pressure may be lowered by increasing the volume of equalization vessels or increasing the number of equalization steps. The purge pressure could be lowered to the minimum level possible before any significant quantity of desorption of the contaminants occurs from the adsorbent bed. Lowering the pressure of the purge stream decreases the flow rate required since a fixed volume must be swept in the purge step, and a lower pressure results in a lower mass flow. The combination of lower pressure and lower mass flow may result in significant reduction in the cost, size, and power consumption of associated compression equipment.

Another optimization is the use of multiple blow-down steps with pressure levels selected to minimize the overall acid gas compression power consumption. As described in Examples 1 and 2, the absolute pressures for each blowdown step are in ratios of three to correspond with operating pressure ratios for acid gas compressors. The use of multiple blowdown steps with the vacuum regeneration is especially useful because it reduces the size of the vacuum compressor stage. In this example, only a portion of the acid gas may be exhausted at 0.5 bar a and the remainder may be exhausted at 1.5 bar a and 4.5 bar a. The associated power consumption for acid gas compression is reduced and the size of the vacuum compressor and associated piping is significantly reduced as well.

Examples 3 through 5 could be used for a wider range of conditions to produce high purity gas with high product recovery.

In one or more embodiments, the system may be utilized to remove one or more components of the acid gas ($CO_2$ and $H_2S$) from a feed stream if the contaminants exceed a contaminate threshold. For example, for a feed stream, such as natural gas, at a pressure greater than 350 psig (2413 kPag), the feed stream may contain contaminants above a contaminant threshold. Examples of the contaminants may include $CO_2$ in the range of 1 to 80 mole %, and less than 1 mole % $H_2S$, preferably less than 1 mole %, preferably less than 0.5 mole % H2S and even more preferably less than 0.075 mole % H2S. A high purity product gas is produced, which contains less than 4 mole % CO2 and less than 10 ppm H2S, preferably less than 4 ppm H2S, even more preferably less than 1 ppm H2S. A high methane recovery of more than 90%, preferably more than 95% and even more preferably more than 97% is obtained during the separation.

In one or more embodiments, the system may be utilized to remove one or more components of the acid gas ($CO_2$ and $H_2S$) from a feed stream at higher pressures. For instance, the feed pressure may be a pressure greater than 350 psig (2413 kPag), greater than 500 psig (3447 kPag), or greater than 600 psig. Other example feed pressures may include pressures greater than 20 bar-a, greater than 30 bar-a, or greater than 40 bar-a.

Figure 21:
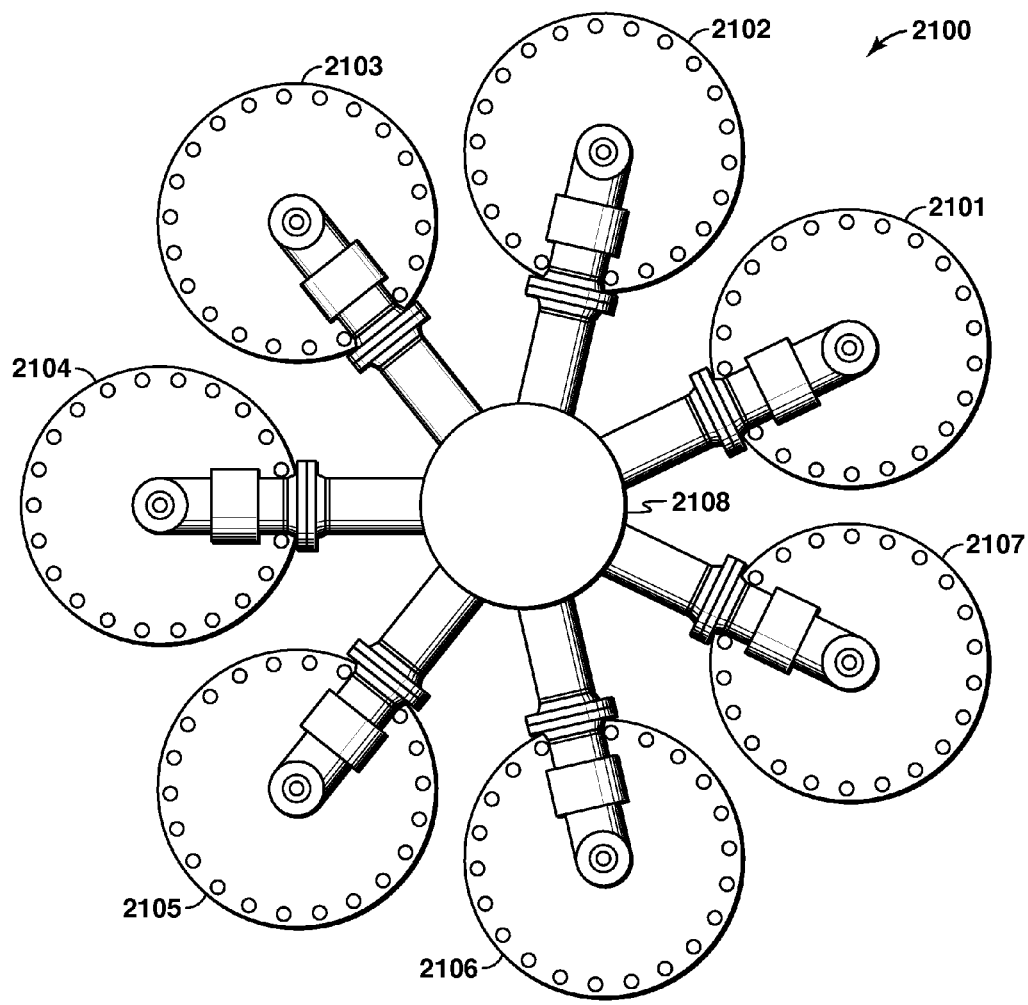
FIG. 21 is an illustration of an elevation view of an exemplary hydrocarbon treating apparatus comprised of a swing adsorption system with fourteen adsorbent bed assemblies arranged in two levels of seven beds equally spaced around the central valve and flow distribution assembly.
Figure 22:
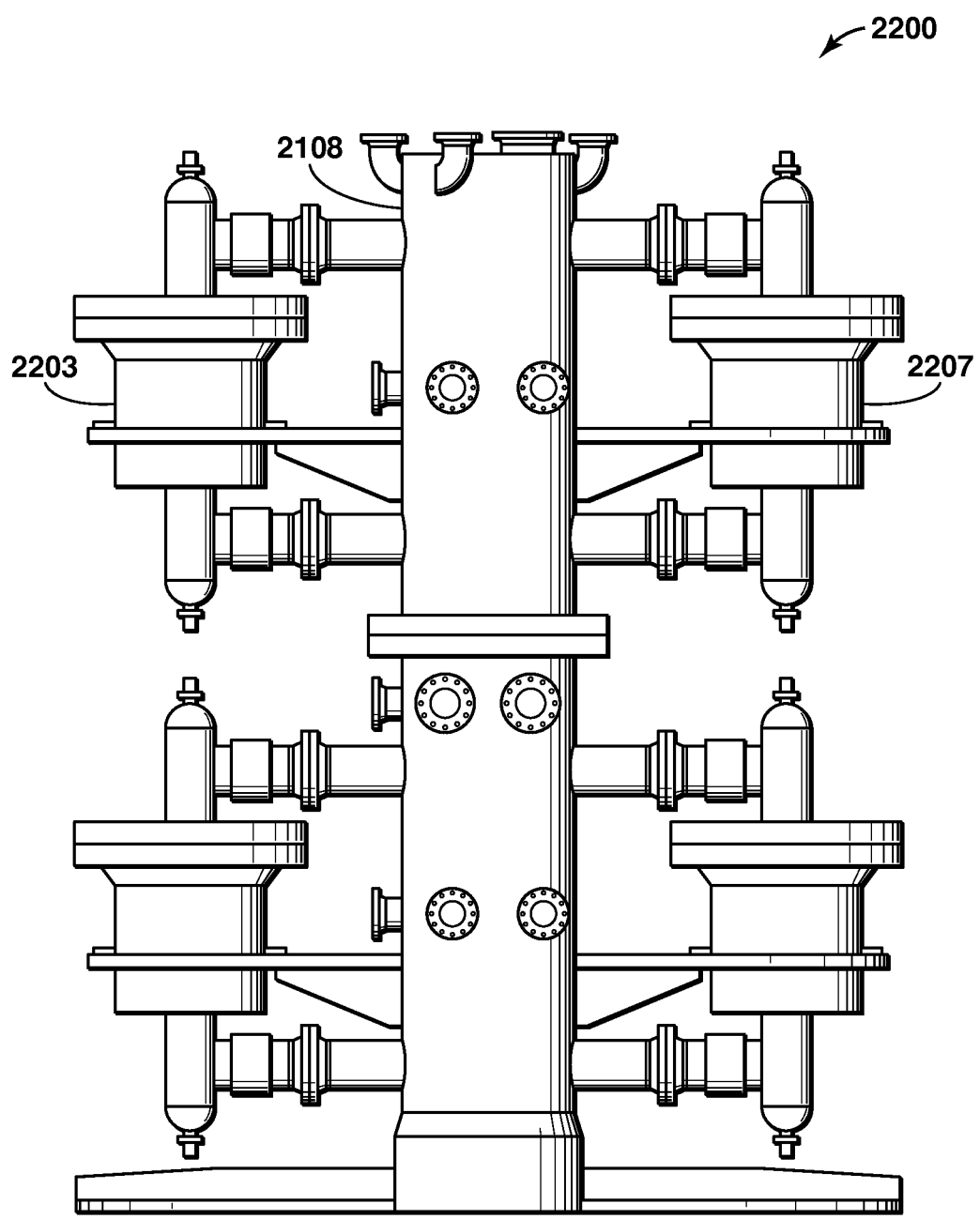
FIG. 22 is an illustration of a plan view of an exemplary hydrocarbon treating apparatus comprised of a swing adsorption system with fourteen adsorbent bed assemblies arranged in two levels of seven beds equally spaced around the central valve and flow distribution assembly.

An exemplary hydrocarbon treating apparatus is shown in FIGS. 21 and 22. FIG. 21 is a top view of the swing adsorption system 2100, while FIG. 22 is a partial side view of the swing adsorption system 2200 with certain adsorbent bed assemblies omitted for simplicity. This apparatus is a compact swing adsorption system 2100 with fourteen adsorbent bed assemblies. The fourteen adsorbent bed assemblies are stacked two layers with the top adsorbent bed assemblies 2101-2107 being illustrated in FIG. 21. A rotary valve assembly 2108 is concentrically located in a cylindrical housing with a rotary valve, which is positioned equidistant to the enjoined adsorbent bed assemblies. The cylindrical housing further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the vessel heads. The gaseous stream has bi-directional travel between the ports of either of the reciprocating or rotary valves through a fixed conduit. The transfer duration of subsequent gaseous streams is limited and directed by the predetermined adsorption cycle.

Another feature of the apparatus shown in FIGS. 21 and 22 relates to a method of coordinating the activation mechanism of the reciprocating valve to either open or close at several predetermined physical locations on the rotary valve itself. In the present embodiment, a reliable and repeatable means of replicating precise operable coordination between the open or closed ports of the respective valves is provided for the adsorption cycle. This embodiment uses a traveling magnet assigned as a transmitter location, which is aligned to a fixed magnetic assigned as a receiving location. A generated flux signal between the magnets activates a specified mechanized driver of a given reciprocating valve for a specified duration. The art of generating and reading the change in a magnetic flux signal is scientifically recognized as the Hall Effect. The hydrocarbon treating apparatus shown in FIGS. 21 and 22 can be implemented in many different configurations.

Figure 23:
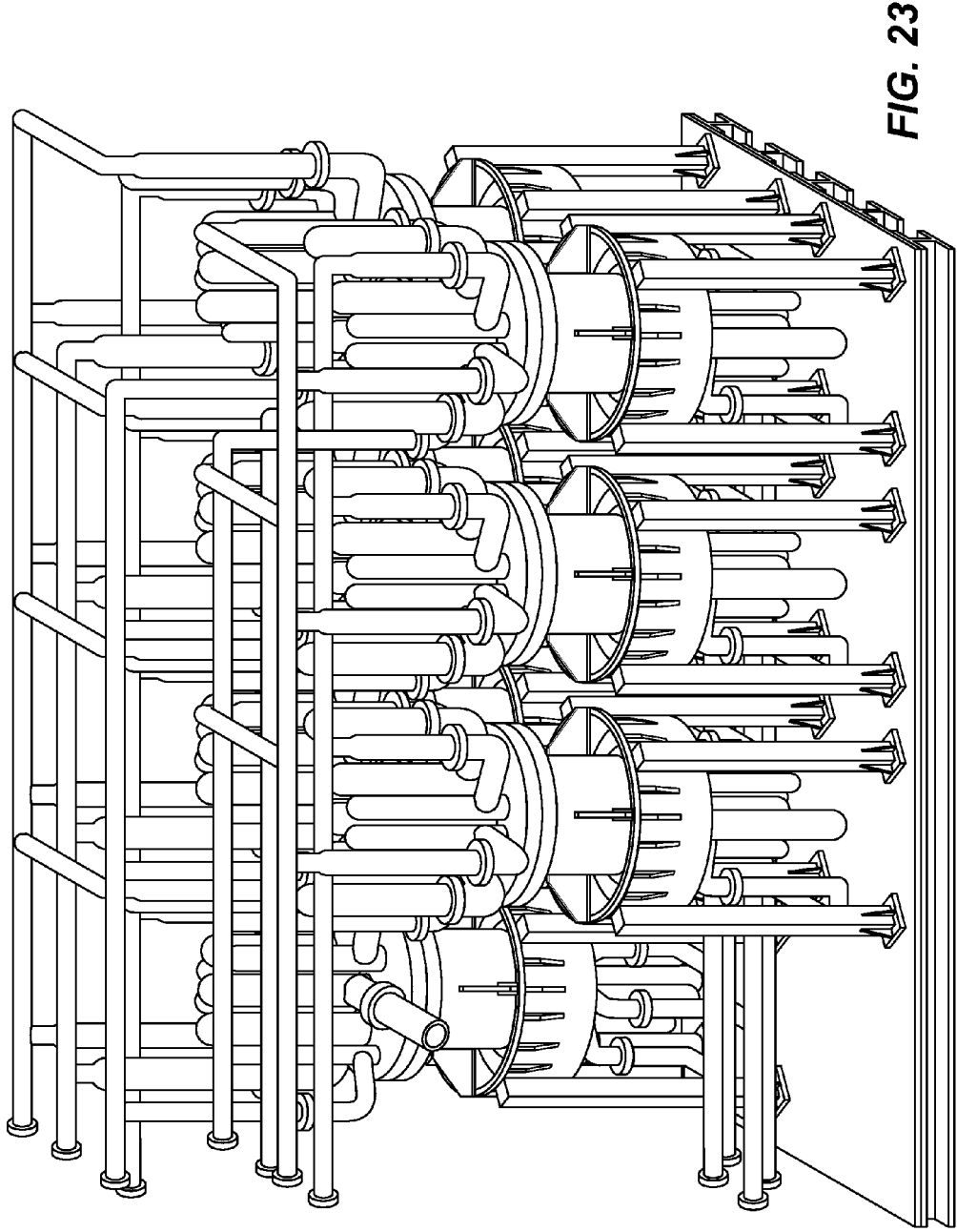
FIG. 23 is a three-dimensional diagram of another exemplary hydrocarbon treating apparatus comprised of a swing adsorption system with seven adsorbent bed assemblies arranged in two rows.

One possible alternative embodiment is shown in FIGS. 23, 24A, 24B, 24C, 25, 26A, 26B and 26C. In this embodiment, the fourteen individual adsorbent bed assemblies may be arranged in two skids, each of the skids containing seven of the individual adsorbent bed assemblies arranged in two rows. One of the exemplary skids is shown in FIG. 23. Multiple reciprocating (or poppet) valves are arranged on the top and bottom of each vessel and connected via piping and headers above and below the adsorbent bed assemblies.

Figure 24A:
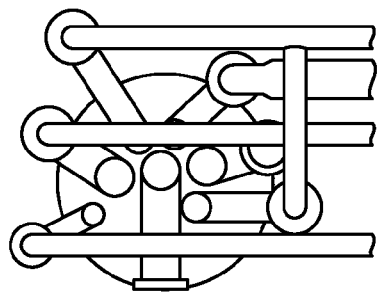
FIGS. 24A, 24B, and 24C are top, side, and bottom views, respectively, of an individual adsorbent bed assembly from the exemplary hydrocarbon treating apparatus in FIG. 23.
Figure 24B:
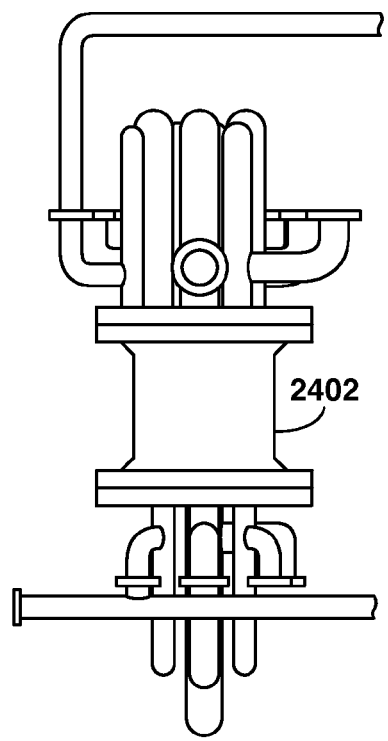
Figure 24C:
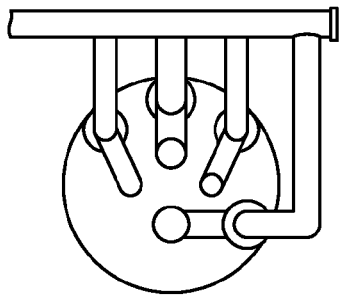

An individual adsorbent bed assembly is shown in FIGS. 24A-24C. As shown in the side view of FIG. 24B, various feed piping may pass the gaseous feed stream to the adsorbent bed assembly 2402 and the product stream may be removed via the bottom piping. The feed gas enters and exhaust gas exits through the piping and valves on the top of the vessel as shown in the top view of FIG. 24A. Product gas exits the adsorbent vessel through one of the valves and piping systems on the bottom of the vessel as shown in the bottom view in FIG. 24C. Other equalization and purge valves and piping are also included in FIGS. 24A-24C.

Figure 25:
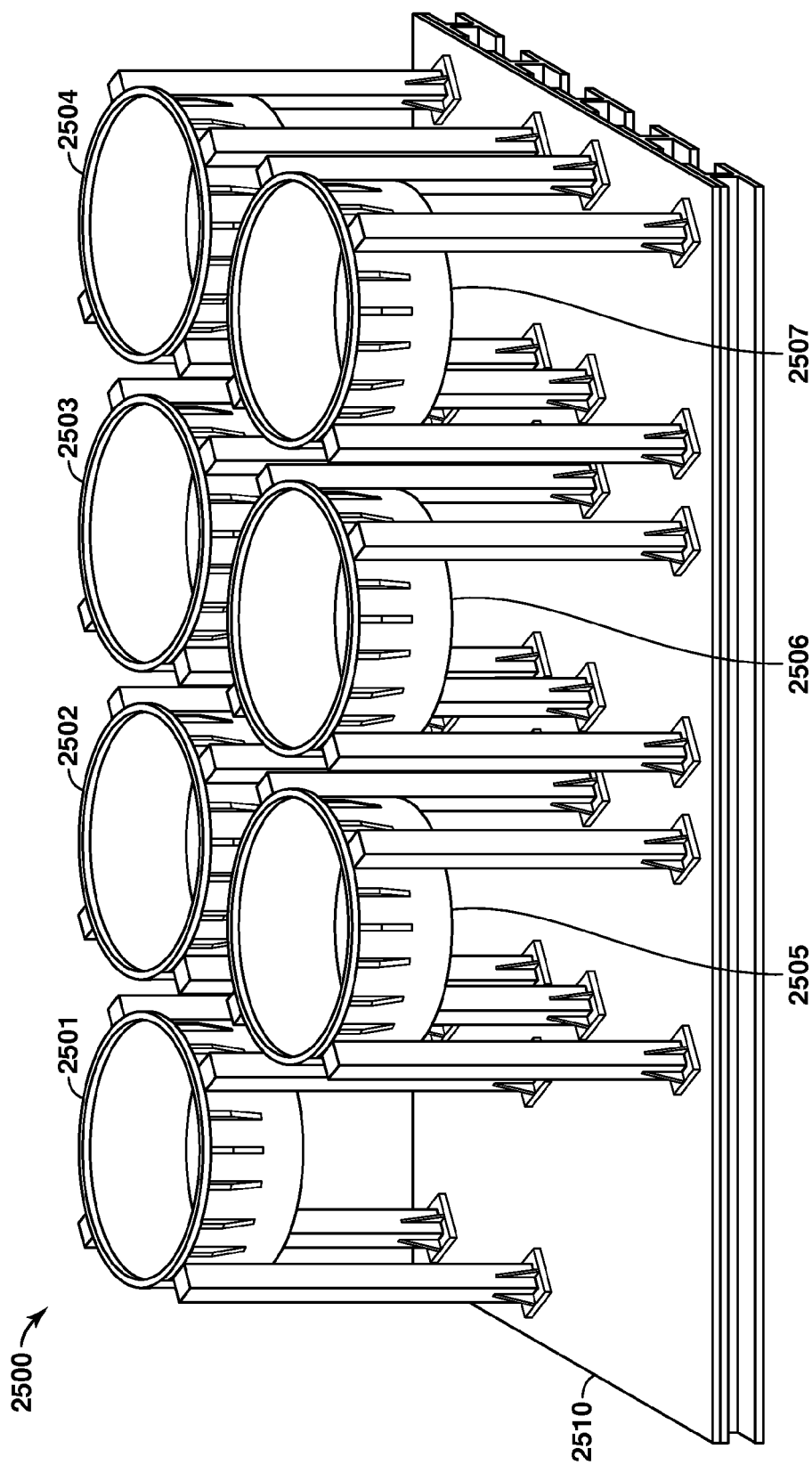
FIG. 25 is a three-dimensional diagram of individual adsorbent bed support structures attached to the skid base for the exemplary hydrocarbon treating apparatus of FIG. 23.

Each adsorbent bed assembly can be first fitted with the requisite reciprocating valves and then placed in the bed support structure 2501-2507 mounted on the skid 2510, which is shown in FIG. 25. Once the seven adsorbent bed assemblies are set in their respective support structure 2501-2507, the bed assemblies can be interconnected via piping and headers. The bed support structures 2501-2507 may be configured to permit movement to allow for thermal expansion or contraction of the piping system associated with the bed assembly. While the individual bed support structures 2501-2507 are fixed to the skid base 2510, the adsorbent bed assemblies, which are noted in other figures, may be disposed into the bed support structure 2501-2507 without being rigidly attached or securely fixed. Therefore, the entire adsorbent bed assembly can move freely within the bed support structure to accommodate thermal expansion or contraction of the piping and minimize stresses on the piping and valves.

Figure 26A:
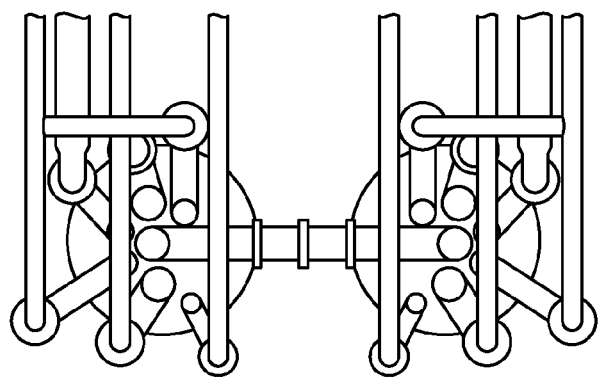
FIGS. 26A, 26B, and 26C are top, side, and bottom views, respectively, of a pair of individual adsorbent bed assemblies with interconnecting piping and bed support structures for the exemplary hydrocarbon treating apparatus in FIG. 23.
Figure 26B:
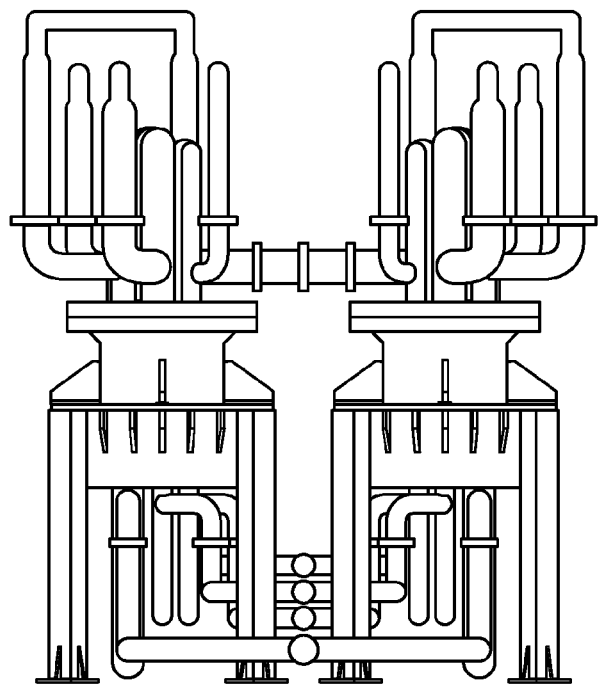
Figure 26C:
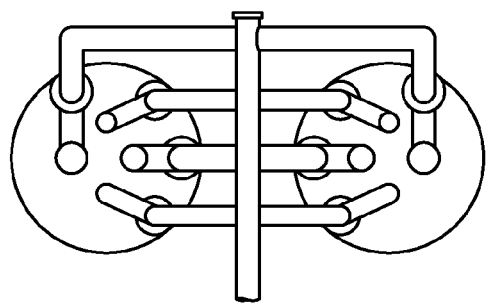

FIGS. 26A-26C provides different views of two bed assemblies. For instance, a top view of two interconnected beds is shown in FIG. 26A, a bottom view of two interconnected bed assemblies is shown in FIG. 26C, and a side view of the interconnected bed assemblies in the support structure is shown in FIG. 26B.

Figure 27:
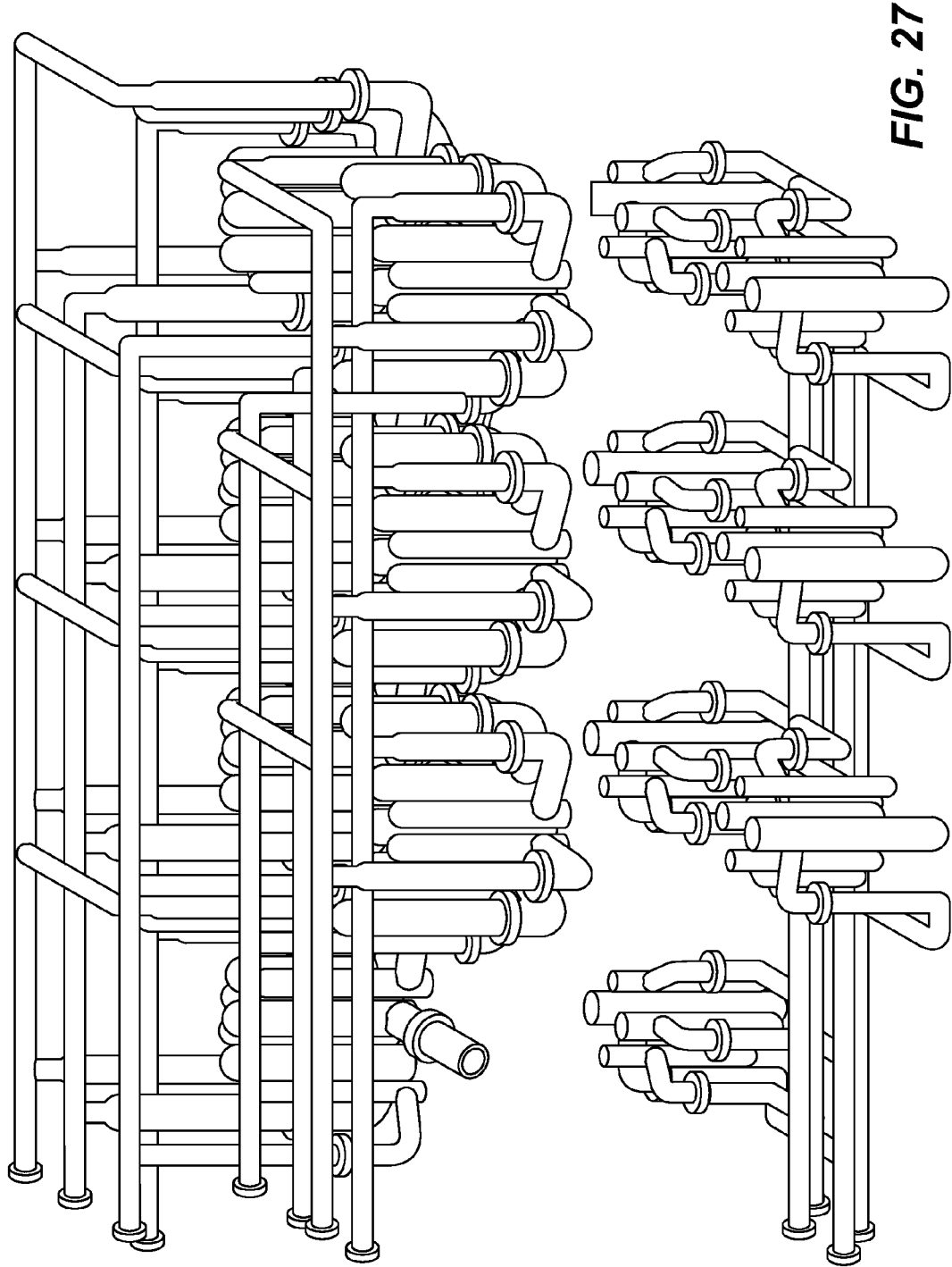
FIG. 27 is a three-dimensional diagram of the valves and piping network for the seven interconnected adsorbent beds of the exemplary hydrocarbon treating apparatus of FIG. 23.

The piping, valves, and headers for a complete skid as connected are shown in FIG. 27 without the adsorbent bed assemblies or support structure to illustrate the piping network. The top piping and headers 2701 are shown relative to the bottom piping and headers 2702 in this embodiment. The piping can be designed to be self-supporting, or additional structure can be provided to support the piping network within the skid.

Concepts

Processes provided above are useful in swing adsorption separation techniques. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide may be selectively adsorbed by the adsorbent, and the gas exiting the vessel may enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space can be reduced by filling the mesopores and macropores between the particles to reduce the open volume while allowing rapid gas transport throughout the adsorbent layer. This filling of the non-sweepable void space, which may be referred to as mesopore filling, is desired to reduce to acceptable levels the quantity of desired product, lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way would be by filling the void space with inert solids of smaller and smaller sizes, or by filling the void space with a replenishable liquid through which the desired gases rapidly diffuse (such as water, solvents, or oil). Preferably, the void space within the adsorbent wall is reduced to less than 40 volume percent (vol. %), preferably to less than 30 vol. %, more preferably to less than 20 vol. %; even more preferably to less than 10 vol. % and most preferably less than about 5 vol % of the open pore volume;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to unfunctionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal of $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis (2-hydroxyethyl) ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl) carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N—R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor provides the benefits of rapid adsorption kinetics through minimization of gas film resistance and high gas solid communication. A preferred adsorber design generates a sharp adsorption front.

It is preferred to have very rapid gas to adsorbent kinetics, i.e. the length through which the target species (e.g., a target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing a parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half (½) the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design;

Concept N: A means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature control designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimensions is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or more embodiments, it is advantageous to keep the ratio of non-adsorbing thermal mass in the adsorbent bed to adsorbent as low as possible. This ratio may preferably be less than 20, more preferably less than 10, and most preferred less than 5. In this manner, the sensible heat of the system that is swung in each cycle may be kept to a minimum.

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there may be no break-through of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this allows more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments are provided in the following Embodiments A-M:

Embodiment A

A swing adsorption process of removing one or more contaminants from a natural gas stream comprising the step of:

a) subjecting a natural gas stream comprising methane and one or more contaminants to an adsorption step by introducing it into the feed input end of an adsorbent bed comprised of an adsorbent material selective for adsorbing at least one contaminant, which adsorbent bed having a feed input end and a product output end and which adsorbent bed is operated at a first pressure and at a first temperature wherein at least a portion of the at least one contaminant is adsorbed by the adsorbent bed and wherein a gaseous product rich in methane and depleted in the at least one contaminant exits the product output end of said adsorbent bed.

Embodiment B

The swing adsorption process of removing one or more contaminants from a natural gas stream of Embodiment A, wherein the contaminant is an acid gas.

Embodiment C

The swing adsorption process of removing one or more contaminants from a natural gas stream of Embodiment A, wherein the contaminant is $CO_2$.

Embodiment D

The swing adsorption process of removing one or more contaminants from a natural gas stream of any of Embodiments A-C, wherein said adsorbent material is porous and contains an effective amount of non-adsorbent mesopore filler material.

Embodiment E

The swing adsorption process of removing one or more contaminants from a natural gas stream of any of Embodiments A-D, wherein the adsorption step is performed for a period of less than about 60 seconds, or less than about 50 seconds, less than about 40 seconds, less than about 30 seconds, less than about 20 seconds, less than about 10 seconds, less than about 5 seconds.

Embodiment F

The swing adsorption process of removing one or more contaminants from a natural gas stream of any of Embodiments A-E, further comprising the steps:
b) stopping the introduction of said natural gas stream to said adsorbent bed before breakthrough of said target species from the product output end of said adsorbent bed;
c) subjecting said adsorption bed to one or more equalization steps wherein the pressure of said bed is reduced with each one or more equalization steps;
d) conducting a high pressure gaseous stream rich in the one or more contaminants through said adsorbent bed to remove hydrocarbons from the bed;
e) subjecting the purged adsorbent bed to one or more blow-down steps wherein the pressure of the bed is reduced by a predetermined amount with each one or more blow-down steps;
f) subjecting said adsorption bed to one or more equalization steps wherein the pressure of said bed is increased with each one or more equalization steps; and
g) repressurizing said adsorbent bed to feed pressure using feed.

Embodiment G

The swing adsorption process of removing one or more contaminants from a natural gas stream of Embodiment F, wherein the one or more equalization steps of step (c) are 2 to 20 steps or 2 to 15 steps or 2 to 10 steps or 2 to 5 steps and the pressure is reduced by a predetermined amount with each successive step.

Embodiment H

The swing adsorption process of removing one or more contaminants from a natural gas stream of Embodiment F or G, wherein the one or more blow-down steps are 2 to 20 steps or 2 to 15 steps or 2 to 10 steps or 2 to 5 steps and the pressure is reduced by a predetermined amount with each successive step.

Embodiment I

The swing adsorption process of removing one or more contaminants from a natural gas stream of any of Embodiments F-H, wherein the one or more equalization steps of step (f) are 2 to 20 steps or 2 to 15 steps or 2 to 10 steps or 2 to 5 steps and the pressure is increased by a predetermined amount with each successive step.

Embodiment J

The swing adsorption process of removing one or more contaminants from a natural gas stream of any of Embodiments A-I, further comprising the step of:
recovering at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment K

The swing adsorption process of removing one or more contaminants from a natural gas stream of any of Embodiments A-J, wherein one or more additional steps utilize a kinetic swing adsorption process selected from the group consisting of: pressure swing adsorption (PSA), thermal swing adsorption (TSA), calcination, partial pressure swing or displacement purge adsorption (PPSA), and combinations of these processes.

Embodiment L

The swing adsorption process of removing one or more contaminants from a natural gas stream of Embodiment K, wherein one or more swing adsorption process utilizes rapid cycles.

Embodiment M

The swing adsorption process of removing one or more contaminants from a natural gas stream of any of Embodiments A-L, wherein a gaseous feed stream is processed to achieve: (a) a desired dew point, (b) a desired level of detoxification, (c) a desired corrosion protection composition, (d) a desired dehydration level, (e) a desired gas heating value, (f) a desired purification level, or (g) combinations thereof.

Additional embodiments are provided in the following paragraphs 2-54:
2. A cyclical swing adsorption process for removing contaminants from a gaseous feed stream, the process comprising: a) passing a gaseous feed stream at a feed pressure through an adsorbent bed for an adsorption time interval greater than 0.1 or 1 second and less than 60 seconds to separate one or more contaminants from the gaseous feed stream to form a product stream; b) interrupting the flow of the gaseous feed stream; c) performing a plurality of depressurization steps, wherein each depressurization step reduces the pressure within the adsorbent bed from a depressurization initial pressure to a depressurization final pressure;
d) passing a purge stream into the adsorbent bed to remove hydrocarbons from the adsorbent bed; e) subjecting the purged adsorbent bed to one or more blow-down steps, wherein each blow-down step reduces the pressure within the adsorbent bed from a blow-down initial pressure to a blow-down final pressure; f) performing a plurality of re-pressurization steps, wherein each re-pressurization step increases the pressure within the swing adsorption vessel from re-pressurization initial pressure to a re-pressurization final pressure; and g) repeating the steps a) to f) for at least one additional cycle.

3. The cyclical swing adsorption process of paragraph 2, wherein the feed stream is a hydrocarbon containing stream having >1 volume percent hydrocarbons based on the total volume of the feed stream.

4. The cyclical swing adsorption process of any one of paragraphs 2 to 3, wherein the feed stream comprises hydrocarbons and $CO_2$, wherein the $CO_2$ is in the range of 1 to 80 mole % and the hydrocarbons are in the range of 20 to 99 mole %.

5. The cyclical swing adsorption process of any one of paragraphs 2 to 4, wherein the adsorbent bed comprises an adsorbent material contains a mesopore filler that reduces the non-sweepable void space between adsorbent particles to less than 30% by volume in pores with diameters greater than 20 angstroms and less than 1 micron.

6. The cyclical swing adsorption process of any one of paragraphs 2 to 4, wherein the adsorbent bed comprises an adsorbent material contains a mesopore filler that reduces the non-sweepable void space between adsorbent particles to less than 20% by volume in pores with diameters greater than 20 angstroms and less than 1 micron.

7. The cyclical swing adsorption process of any one of paragraphs 2 to 4, wherein the adsorbent bed comprises an adsorbent material contains a mesopore filler that reduces the non-sweepable void space between adsorbent particles to less than 10% by volume in pores with diameters greater than 20 angstroms and less than 1 micron.

8. The cyclical swing adsorption process of any one of paragraphs 2 to 5, wherein the adsorption bed comprises a first adsorbent material selective to $CO_2$ and a second adsorbent material selective to $H_2S$.

9. The cyclical swing adsorption process of any one of paragraphs 2 to 8, wherein the adsorption time interval is greater than 2 seconds and less than 50 seconds.

10. The cyclical swing adsorption process of any one of paragraphs 2 to 8, wherein the adsorption time interval is greater than 2 seconds and less than 10 seconds.

11. The cyclical swing adsorption process of any one of paragraphs 2 to 10, wherein the purge stream comprises less than 40 mole percent methane.

12. The cyclical swing adsorption process of any one of paragraphs 2 to 11, wherein the adsorbent bed comprises an adsorbent material having a ratio of single component diffusion coefficients of $CO_2$ and methane is greater than 10.

13. The cyclical swing adsorption process of any one of paragraphs 2 to 11, wherein the adsorbent bed comprises an adsorbent material having a ratio of single component diffusion coefficients of $CO_2$ and methane is greater than 100.

14. The cyclical swing adsorption process of any one of paragraphs 2 to 11, wherein the adsorbent bed comprises a structured contactor having a plurality of channels through the structured contactor.

15. The cyclical swing adsorption process of any one of paragraphs 2 to 14, wherein the feed pressure is greater than 350 psig.

16. The cyclical swing adsorption process of any one of paragraphs 2 to 14, wherein the feed pressure is greater than 500 psig.

17. The cyclical swing adsorption process of any one of paragraphs 2 to 16, wherein the process recovers greater than 90% of the desired product based on a ratio of the desired product in the product stream divided by the desired product in the gaseous feed stream.

18. The cyclical swing adsorption process of any one of paragraphs 2 to 16, wherein the process recovers greater than 95% of the desired product based on a ratio of the desired product in the product stream divided by the desired product in the gaseous feed stream.

19. The cyclical swing adsorption process of any one of paragraphs 2 to 16, wherein the process recovers greater than 97% of the desired product based on a ratio of the desired product in the product stream divided by the desired product in the gaseous feed stream.

20. The cyclical swing adsorption process of any one of paragraphs 2 to 19, wherein each of the depressurization steps comprising passing a portion of the feed stream in the adsorbent bed to an equalization tank and then during one of the re-pressurization steps passing at least a fraction of the portion to the adsorbent bed from the equalization tank.

21. The cyclical swing adsorption process of any one of paragraphs 2 to 16, further comprising passing a second purge through the adsorbent bed after the one or more blow-down steps and prior to the repeating the steps a-f.

22. The cyclical swing adsorption process of any one of paragraphs 2 to 21, wherein the gaseous feed stream comprising one or more contaminants above a contaminant threshold, wherein the one or more contaminants comprise one or more of 1 to 80 mole percent $CO_2$, less than 1 mole percent $H_2S$, and any combination thereof, and wherein the contaminant threshold comprises one or more of less than 10 parts per million $H_2S$; less than 4 mole percent $CO_2$, and any combination thereof; and the product stream has contaminants less than the contaminant threshold.

23. A cyclical pressure swing adsorption process for removing contaminant from a gaseous feed stream, the process comprising:
introducing a gaseous feed stream comprising a desired product and one or more contaminants above a contaminant threshold, wherein the one or more contaminants comprise one or more of 1 to 80 mole percent $CO_2$, less than 1 mole percent $H_2S$, and any combination thereof, and wherein the contaminant threshold comprises one or more of less than 10 parts per million $H_2S$; less than 4 mole percent $CO_2$, and any combination thereof;
subjecting the gaseous feed stream to a pressure swing adsorption process within an adsorbent for an adsorption time interval greater than 1 second and less than 60 seconds to separate the one or more contaminants from the gaseous feed stream to form a product stream, wherein the pressure swing adsorption process recovers greater than 90% of the desired product based on a ratio of the desired product in the product stream divided by the desired product in the gaseous feed stream;
conducting away from the adsorbent bed a product stream having contaminants below the contaminant threshold.

24. The cyclical pressure swing adsorption process of paragraph 23, wherein the adsorbent bed comprises two or more adsorbent materials, wherein each adsorbent material is configured to target a different one of the one or more contaminants.

25. The cyclical pressure swing adsorption process of any one of paragraphs 23 and 24,
wherein the swing adsorption process comprising the steps of:
a) passing a gaseous feed stream at a feed pressure through an adsorbent bed;
b) interrupting the flow of the gaseous feed stream;
c) performing a plurality of depressurization steps, wherein each depressurization step reduces the pressure within the swing adsorption vessel from a depressurization initial pressure to a depressurization final pressure;
d) performing a plurality of re-pressurization steps, wherein each re-pressurization step increases the pressure within the swing adsorption vessel from re-pressurization initial pressure to a re-pressurization final pressure; and
e) repeating the steps a) to d) for at least one additional cycle.

26. The cyclical pressure swing adsorption process of paragraph 25, wherein the swing adsorption process comprising the further steps between steps c) and d) of passing a purge stream into the adsorbent bed to purge the desired product along with one or more contaminants from the adsorbent bed.

27. The cyclical pressure swing adsorption process of paragraph 26, wherein the additional purge stream comprises greater than 80 vol. % $CO_2$ based on the total volume of the purge stream.

28. The cyclical pressure swing adsorption process of paragraph 26, wherein the additional purge stream comprises greater than 80 vol. % $N_2$ based on the total volume of the purge stream.

29. The cyclical pressure swing adsorption process of any one of paragraphs 24 and 28, wherein the swing adsorption process comprising the further steps between steps c) and d) of:
performing a plurality of blow-down steps to produce an exhaust stream, where each blow-down step reduces the pressure that the adsorbent bed is exposed to from the blow-down initial pressure to the blow-down final pressure; and
passing an additional purge stream into the adsorbent bed to purge the one or more contaminants.

30. The cyclical pressure swing adsorption process of paragraph 29, wherein the additional purge stream comprises greater than 80 vol. % desired product based on the total volume of the additional purge stream.

31. The cyclical pressure swing adsorption process of paragraph 29, wherein the additional purge stream comprises greater than 80 vol. % $N_2$ based on the total volume of the additional purge stream.

32. The cyclical pressure swing adsorption process of any one of paragraphs 29 to 31, wherein the performing the plurality of blow-down steps comprises flowing the exhaust stream in a first direction during one of the plurality of blow-down steps; and flowing the exhaust stream in a second direction during another of the plurality of blow-down steps.

33. The cyclical pressure swing adsorption process of any one of paragraphs 29 to 31, wherein the performing the plurality of blow-down steps comprises flowing the exhaust stream in a first direction and a second direction during at least one of the plurality of blow-down steps.

34. The cyclical pressure swing adsorption process of any one of paragraphs 23 to 33, wherein the cycle of steps a) through d) is performed in a time interval less than about 20 seconds.

35. The cyclical pressure swing adsorption process of any one of paragraphs 23 to 34, wherein the pressure during the adsorption of the one or more contaminants is greater than 350 psig (2413 kPag).

36. The cyclical pressure swing adsorption process of any one of paragraphs 23 to 34, wherein the pressure during the adsorption of the one or more contaminants is greater than 500 psig (3447 kPag).

37. The cyclical pressure swing adsorption process of any one of paragraphs 23 to 36, wherein subjecting the gaseous feed stream to the pressure swing adsorption process is a single pass process.

38. The cyclical pressure swing adsorption process of any one of paragraphs 23 to 37, wherein subjecting the gaseous feed stream to the pressure swing adsorption process comprises recycling one or more the contaminants through the pressure swing adsorption vessel.

39. The cyclical pressure swing adsorption process of any one of paragraphs 23 to 38, wherein the pressure swing adsorption unit comprises two or more adsorbent materials, wherein each adsorbent material is configured to target a different one of the one or more contaminants.

40. The cyclical pressure swing adsorption process of any one of paragraphs 23 to 39, wherein the pressure prior to step d) for the cycle is in the range of 0.25 bar a and 10 bar a.

41. The cyclical pressure swing adsorption process of any one of paragraphs 23 to 40, wherein the adsorbent bed comprises an adsorbent material formed into a layer 42. The cyclical swing adsorption process of any one of paragraphs 23 to 41, wherein the process recovers greater than 95% of the desired product based on a ratio of the desired product in the product stream divided by the desired product in the gaseous feed stream.

43. The cyclical swing adsorption process of any one of paragraphs 23 to 41, wherein the process recovers greater than 97% of the desired product based on a ratio of the desired product in the product stream divided by the desired product in the gaseous feed stream.

44. The cyclical swing adsorption process of any one of paragraphs 23 to 43, wherein the total cycle time for completing all of the steps in the cycle is less than 30 seconds.

45. The cyclical swing adsorption process of any one of paragraphs 23 to 43, wherein the total cycle time for completing all of the steps in the cycle is less than 15 seconds.

46. The cyclical swing adsorption process of any one of paragraphs 23 to 45, wherein
contaminant threshold comprises less than 4 parts per million $H_2S$.

47. The cyclical swing adsorption process of any one of paragraphs 23 to 45, wherein
contaminant threshold comprises less than 2 mole percent $CO_2$.

48. The cyclical swing adsorption process of any one of paragraphs 23 to 47, wherein the adsorbent bed comprises an adsorbent material having a ratio of single component diffusion coefficients of $CO_2$ and methane is greater than 10.

49. The cyclical swing adsorption process of any one of paragraphs 23 to 47, wherein the adsorbent bed comprises an adsorbent material having a ratio of single component diffusion coefficients of $CO_2$ and methane is greater than 100.

50. The cyclical swing adsorption process of any one of paragraphs 23 to 49, wherein the adsorbent bed comprises an adsorbent material contains a mesopore filler that reduces the non-sweepable void space between adsorbent particles to less than 30% by volume in pores with diameters greater than 20 angstroms and less than 1 micron.

51. The cyclical swing adsorption process of any one of paragraphs 23 to 49, wherein the adsorbent bed comprises an adsorbent material contains a mesopore filler that reduces the non-sweepable void space between adsorbent particles to less than 20% by volume in pores with diameters greater than 20 angstroms and less than 1 micron.

52. The cyclical swing adsorption process of any one of paragraphs 23 to 51, further comprising passing the stream from one or more of the blow-down steps and depressurization steps through an adsorbent bed of a second RC-PSA system to remove hydrocarbons from the stream.

53. The cyclical swing adsorption process of any one of paragraphs 23 to 52, wherein the adsorbent bed comprises a structured contactor having a plurality of channels through the structured contactor.

54. The cyclical swing adsorption process of any one of paragraphs 23 to 53, wherein each of the depressurization steps comprising passing a portion of the feed stream in the adsorbent bed to an equalization tank and then during one of the re-pressurization steps passing at least a fraction of the portion to the adsorbent bed from the equalization tank.

In view of the many possible embodiments to which the principles of the disclosed invention may be applied, it should be recognized that the illustrative embodiments are only preferred examples of the invention and should not be taken as limiting the scope of the invention.

What is claimed is:

1. A swing adsorption process for removing $CO_2$ from natural gas streams, which process comprising:
    a) subjecting a natural gas stream comprising methane and $CO_2$ to an adsorption step by introducing it into the feed input end of an adsorbent bed comprised of an adsorbent material selective for adsorbing $CO_2$, which adsorbent bed having a feed input end and a product output end and which adsorbent bed is operated at a first pressure and at a first temperature wherein at least a portion of said $CO_2$ is adsorbed by the adsorbent bed and wherein a gaseous product rich in methane and depleted in $CO_2$ exits the product output end of said adsorbent bed, wherein said adsorbent material is porous and contains an effective amount of non-adsorbent mesopore filler material, and wherein the adsorption step is performed for a period of less than 10 seconds;
    b) stopping the introduction of said natural gas stream to said adsorbent bed before breakthrough of said target species from the product output end of said adsorbent bed;
    c) subjecting said adsorption bed to successive 1 to 10 equalization steps wherein the pressure of said bed is reduced by a predetermined amount with each successive step;
    d) conducting a high pressure gaseous stream rich in $CO_2$ through said adsorbent bed to remove hydrocarbons from the bed;
    e) subjecting the purged adsorbent bed to multiple successive blow-down steps wherein the pressure of the bed is reduced by a predetermined amount with each successive blow-down step;
    f) subjecting said adsorption bed to successive 1 to 10 equalization steps wherein the pressure of said bed is increased by a predetermined amount with each successive step; and
    g) repressurizing said adsorbent bed to feed pressure using feed.

2. A cyclical swing adsorption process for removing contaminants from a gaseous feed stream, the process comprising:
    a) passing a gaseous feed stream at a feed pressure through an adsorbent bed for an adsorption time interval greater than 1 second and less than 60 seconds to separate one or more contaminants from the gaseous feed stream to form a product stream;
    b) interrupting the flow of the gaseous feed stream;
    c) performing a plurality of depressurization steps, wherein each depressurization step reduces the pressure within the adsorbent bed from a depressurization initial pressure to a depressurization final pressure;
    d) passing a purge stream into the adsorbent bed to remove hydrocarbons from the adsorbent bed;
    e) subjecting the purged adsorbent bed to one or more blow-down steps, wherein each blow-down step reduces the pressure within the adsorbent bed from a blow-down initial pressure to a blow-down final pressure;
    f) performing a plurality of re-pressurization steps, wherein each re-pressurization step increases the pressure within the swing adsorption bed from re-pressurization initial pressure to a re-pressurization final pressure; and
    g) repeating the steps a) to f) for at least one additional cycle.

3. The cyclical swing adsorption process of claim 2, wherein the feed stream is a hydrocarbon containing stream having >1 volume percent hydrocarbons based on the total volume of the feed stream.

4. The cyclical swing adsorption process of claim 2, wherein the feed stream comprises hydrocarbons and $CO_2$, wherein the $CO_2$ is in the range of 1 to 80 mole % and the hydrocarbons are in the range of 20 to 99 mole %.

5. The cyclical swing adsorption process of claim 2, wherein the adsorbent bed comprises an adsorbent material contains a mesopore filler that reduces the non-sweepable void space between adsorbent particles to less than 30% by volume in pores with diameters greater than 20 angstroms and less than 1 micron.

6. The cyclical swing adsorption process of claim 2, wherein the adsorbent bed comprises an adsorbent material contains a mesopore filler that reduces the non-sweepable void space between adsorbent particles to less than 20% by volume in pores with diameters greater than 20 angstroms and less than 1 micron.

7. The cyclical swing adsorption process of claim 2, wherein the adsorbent bed comprises an adsorbent material contains a mesopore filler that reduces the non-sweepable void space between adsorbent particles to less than 10% by volume in pores with diameters greater than 20 angstroms and less than 1 micron.

8. The cyclical swing adsorption process of claim 2, wherein the adsorption bed comprises a first adsorbent material selective to $CO_2$ and a second adsorbent material selective to $H_2S$.

9. The cyclical swing adsorption process of claim 2, wherein the adsorption time interval is greater than 2 seconds and less than 50 seconds.

10. The cyclical swing adsorption process of claim 2, wherein the adsorption time interval is greater than 2 seconds and less than 10 seconds.

11. The cyclical swing adsorption process of claim 2, wherein the purge stream comprises less than 40 mole percent methane.

12. The cyclical swing adsorption process of claim 2, wherein the adsorbent bed comprises an adsorbent material having a ratio of single component diffusion coefficients of $CO_2$ and methane is greater than 10.

13. The cyclical swing adsorption process of claim 2, wherein the adsorbent bed comprises an adsorbent material having a ratio of single component diffusion coefficients of $CO_2$ and methane is greater than 100.

14. The cyclical swing adsorption process of claim 2, wherein the adsorbent bed comprises a structured contactor having a plurality of channels through the structured contactor.

15. The cyclical swing adsorption process of claim 2, wherein the feed pressure is greater than 350 psig.

16. The cyclical swing adsorption process of claim 2, wherein the feed pressure is greater than 500 psig.

17. The cyclical swing adsorption process of claim 2, wherein the process recovers greater than 90% of the desired product based on a ratio of the desired product in the product stream divided by the desired product in the gaseous feed stream.

18. The cyclical swing adsorption process of claim 2, wherein the process recovers greater than 95% of the desired product based on a ratio of the desired product in the product stream divided by the desired product in the gaseous feed stream.

19. The cyclical swing adsorption process of claim 2, wherein the process recovers greater than 97% of the desired product based on a ratio of the desired product in the product stream divided by the desired product in the gaseous feed stream.

20. The cyclical swing adsorption process of claim 2, wherein each of the depressurization steps comprising passing a portion of the feed stream in the adsorbent bed to an equalization tank and then during one of the re-pressurization steps passing at least a fraction of the portion to the adsorbent bed from the equalization tank.

21. The cyclical swing adsorption process of claim 2, further comprising passing a second purge through the adsorbent bed after the one or more blow-down steps and prior to the repeating the steps a-f.

22. The cyclical swing adsorption process of claim 2, wherein the gaseous feed stream comprising one or more contaminants above a contaminant threshold, wherein the one or more contaminants comprise one or more of 1 to 80 mole percent $CO_2$, less than 1 mole percent $H_2S$, and any combination thereof, and wherein the contaminant threshold comprises one or more of less than 10 parts per million $H_2S$; less than 4 mole percent $CO_2$, and any combination thereof; and the product stream has contaminants less than the contaminant threshold.

23. A cyclical pressure swing adsorption process for removing contaminant from a gaseous feed stream, the process comprising:
introducing a gaseous feed stream comprising a desired product and one or more contaminants above a contaminant threshold, wherein the one or more contaminants comprise one or more of 1 to 80 mole percent $CO_2$, less than 1 mole percent $H_2S$, and any combination thereof, and wherein the contaminant threshold comprises one or more of less than 10 parts per million $H_2S$; less than 4 mole percent $CO_2$, and any combination thereof;
subjecting the gaseous feed stream to a pressure swing adsorption process within an adsorbent bed for an adsorption time interval greater than 1 second and less than 60 seconds to separate the one or more contaminants from the gaseous feed stream to form a product stream, wherein the pressure swing adsorption process recovers greater than 90% of the desired product based on a ratio of the desired product in the product stream divided by the desired product in the gaseous feed stream;
conducting away from the adsorbent bed a product stream having contaminants below the contaminant threshold.

24. The cyclical pressure swing adsorption process of claim 23, wherein the adsorbent bed comprises two or more adsorbent materials, wherein each adsorbent material is configured to target a different one of the one or more contaminants.

25. The cyclical pressure swing adsorption process of claim 23, wherein the swing adsorption process comprising the steps of:
a) passing a gaseous feed stream at a feed pressure through an adsorbent bed;
b) interrupting the flow of the gaseous feed stream;
c) performing a plurality of depressurization steps, wherein each depressurization step reduces the pressure within the absorbent bed from a depressurization initial pressure to a depressurization final pressure;
d) performing a plurality of re-pressurization steps, wherein each re-pressurization step increases the pressure within the absorbent bed from re-pressurization initial pressure to a re-pressurization final pressure; and
e) repeating the steps a) to d) for at least one additional cycle.

26. The cyclical pressure swing adsorption process of claim 25, wherein the swing adsorption process comprising the further steps between steps c) and d) of passing a purge stream into the adsorbent bed to purge the desired product along with one or more contaminants from the adsorbent bed.

27. The cyclical pressure swing adsorption process of claim 26, wherein the additional purge stream comprises greater than 80 vol. % $CO_2$ based on the total volume of the purge stream.

28. The cyclical pressure swing adsorption process of claim 26, wherein the additional purge stream comprises greater than 80 vol. % $N_2$ based on the total volume of the purge stream.

29. The cyclical pressure swing adsorption process of claim 24, wherein the swing adsorption process comprising the further steps between steps c) and d) of:
performing a plurality of blow-down steps to produce an exhaust stream, where each blow-down step reduces the pressure that the adsorbent bed is exposed to from the blow-down initial pressure to the blow-down final pressure; and
passing an additional purge stream into the adsorbent bed to purge the one or more contaminants.

30. The cyclical pressure swing adsorption process of claim 29, wherein the additional purge stream comprises greater than 80 vol. % desired product based on the total volume of the additional purge stream.

31. The cyclical pressure swing adsorption process of claim 29, wherein the additional purge stream comprises greater than 80 vol. % $N_2$ based on the total volume of the additional purge stream.

32. The cyclical pressure swing adsorption process of claim 29, wherein the performing the plurality of blow-down steps comprises flowing the exhaust stream in a first direction during one of the plurality of blow-down steps; and flowing the exhaust stream in a second direction during another of the plurality of blow-down steps.

33. The cyclical pressure swing adsorption process of claim 29, wherein the performing the plurality of blow-down steps comprises flowing the exhaust stream in a first direction and a second direction during at least one of the plurality of blow-down steps.

34. The cyclical pressure swing adsorption process of claim 23, wherein the cycle of steps a) through d) is performed in a time interval less than about 20 seconds.

35. The cyclical pressure swing adsorption process of claim 23, wherein the pressure during the adsorption of the one or more contaminants is greater than 350 psig (2413 kPag).

36. The cyclical pressure swing adsorption process of claim 23, wherein the pressure during the adsorption of the one or more contaminants is greater than 500 psig (3447 kPag).

37. The cyclical pressure swing adsorption process of claim 23, wherein subjecting the gaseous feed stream to the pressure swing adsorption process is a single pass process.

38. The cyclical pressure swing adsorption process of claim 23, wherein subjecting the gaseous feed stream to the pressure swing adsorption process comprises recycling one or more the contaminants through the pressure swing adsorption vessel.

39. The cyclical pressure swing adsorption process of claim 23, wherein the pressure swing adsorption bed comprises two or more adsorbent materials, wherein each adsorbent material is configured to target a different one of the one or more contaminants.

40. The cyclical pressure swing adsorption process of claim 23, wherein the pressure prior to step d) for the cycle is in the range of 0.25 bar a and 10 bar a.

41. The cyclical pressure swing adsorption process of claim 23, wherein the adsorbent bed comprises an adsorbent material formed into a layer.

42. The cyclical swing adsorption process of claim 23, wherein the process recovers greater than 95% of the desired product based on a ratio of the desired product in the product stream divided by the desired product in the gaseous feed stream.

43. The cyclical swing adsorption process of claim 23 wherein the process recovers greater than 97% of the desired product based on a ratio of the desired product in the product stream divided by the desired product in the gaseous feed stream.

44. The cyclical swing adsorption process of claim 23, wherein the total cycle time for completing all of the steps in the cycle is less than 30 seconds.

45. The cyclical swing adsorption process of claim 23, wherein the total cycle time for completing all of the steps in the cycle is less than 15 seconds.

46. The cyclical swing adsorption process of claim 23, wherein contaminant threshold comprises less than 4 parts per million $H_2S$.

47. The cyclical swing adsorption process of claim 23, wherein contaminant threshold comprises less than 2 mole percent $CO_2$.

48. The cyclical swing adsorption process of claim 23, wherein the adsorbent bed comprises an adsorbent material having a ratio of single component diffusion coefficients of $CO_2$ and methane is greater than 10.

49. The cyclical swing adsorption process of claim 23, wherein the adsorbent bed comprises an adsorbent material having a ratio of single component diffusion coefficients of $CO_2$ and methane is greater than 100.

50. The cyclical swing adsorption process of claim 23, wherein the adsorbent bed comprises an adsorbent material contains a mesopore filler that reduces the non-sweepable void space between adsorbent particles to less than 30% by volume in pores with diameters greater than 20 angstroms and less than 1 micron.

51. The cyclical swing adsorption process of claim 23, wherein the adsorbent bed comprises an adsorbent material contains a mesopore filler that reduces the non-sweepable void space between adsorbent particles to less than 20% by volume in pores with diameters greater than 20 angstroms and less than 1 micron.

52. the cyclical swing adsorption process of claim 23, further comprising passing the stream from one or more of the blow-down steps and depressurization steps through an adsorbent bed of a second pressure swing adsorption process to remove hydrocarbons from the stream.

53. The cyclical swing adsorption process of claim 23, wherein the adsorbent bed comprises a structured contactor having a plurality of channels through the structured contactor.

54. The cyclical swing adsorption process of claim 25, wherein each of the depressurization steps comprising passing a portion of the feed stream in the adsorbent bed to an equalization tank and then during one of the re-pressurization steps passing at least a fraction of the portion to the adsorbent bed from the equalization tank.

* * * * *